(12) United States Patent
Kurita et al.

(10) Patent No.: US 10,097,782 B2
(45) Date of Patent: Oct. 9, 2018

(54) SIGNAL PROCESSING DEVICE AND SIGNAL PROCESSING METHOD

(71) Applicant: SONY SEMICONDUCTOR SOLUTIONS CORPORATION, Kanagawa (JP)

(72) Inventors: Teppei Kurita, Kanagawa (JP); Tomoo Mitsunaga, Kanagawa (JP); Toru Nishi, Kanagawa (JP); Yasushi Saito, Saitama (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/520,714

(22) PCT Filed: Aug. 7, 2015

(86) PCT No.: PCT/JP2015/072574
§ 371 (c)(1),
(2) Date: Apr. 20, 2017

(87) PCT Pub. No.: WO2016/067710
PCT Pub. Date: May 6, 2016

(65) Prior Publication Data
US 2017/0318249 A1    Nov. 2, 2017

(30) Foreign Application Priority Data

Oct. 31, 2014  (JP) ................................. 2014-222769

(51) Int. Cl.
*H04N 5/378*  (2011.01)
*H04N 5/351*  (2011.01)
(Continued)

(52) U.S. Cl.
CPC ............. *H04N 5/378* (2013.01); *H04N 5/351* (2013.01); *H04N 9/045* (2013.01); *H04N 9/07* (2013.01)

(58) Field of Classification Search
CPC ........ H04N 5/378; H04N 5/351; H04N 9/045; H04N 9/07; H01L 27/14621
See application file for complete search history.

(56) References Cited

U.S. PATENT DOCUMENTS

2008/0316326 A1*  12/2008  Wada ..................... H04N 9/045
                                                                    348/222.1
2010/0141812 A1*   6/2010  Hirota .................... H04N 9/045
                                                                    348/279
(Continued)

FOREIGN PATENT DOCUMENTS

CN  101753863 A  6/2010
CN  104272727 A  1/2015
(Continued)

OTHER PUBLICATIONS

International Search Report and Written Opinion of PCT Application No. PCT/JP2015/072574, dated Oct. 20, 2015, 8 pages of English Translation and 7 pages of ISRWO.

(Continued)

Primary Examiner — Nhan T Tran
(74) Attorney, Agent, or Firm — Chip Law Group

(57) ABSTRACT

Provided is a signal processing device, including a pixel array unit configured to include first pixels, second pixels, third pixels, and fourth pixels which have different spectral sensitivity characteristics and are arranged in a matrix form; and a pixel signal reading unit configured to read pixel signals obtained from the plurality of pixels arranged in the pixel array unit. The first pixels are adjacent to the second pixels in a row direction and a column direction, the second pixels are arranged at a two-pixel pitch in the row direction and the column direction, the third pixels are adjacent to the
(Continued)

second pixels in one diagonal direction, the fourth pixels are adjacent to the second pixels in the other diagonal direction, and the pixel signal reading unit adds and reads the pixel signals obtained from the plurality of first pixels.

13 Claims, 32 Drawing Sheets

(51) Int. Cl.
*H04N 9/04* (2006.01)
*H04N 9/07* (2006.01)

(56) References Cited

U.S. PATENT DOCUMENTS

| | | | |
|---|---|---|---|
| 2015/0138407 A1* | 5/2015 | Kawaguchi | H04N 5/378 348/281 |
| 2017/0150071 A1* | 5/2017 | Otsubo | H01L 27/14621 |

FOREIGN PATENT DOCUMENTS

| | | |
|---|---|---|
| EP | 2194721 A2 | 6/2010 |
| JP | 2004-304706 A | 10/2004 |
| JP | 2010-136225 A | 6/2010 |
| KR | 10-2010-0066396 A | 6/2010 |
| KR | 10-2015-0013454 A | 2/2015 |
| WO | 2013/172205 A1 | 11/2013 |

OTHER PUBLICATIONS

International Preliminary Report on Patentability of PCT Application No. PCT/JP2015/072574, dated May 11, 2017, 9 pages of English Translation and 4 pages of IPRP.

* cited by examiner

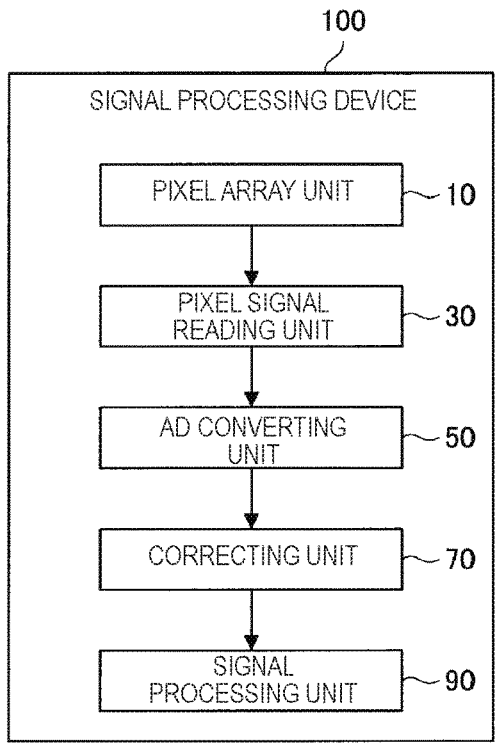

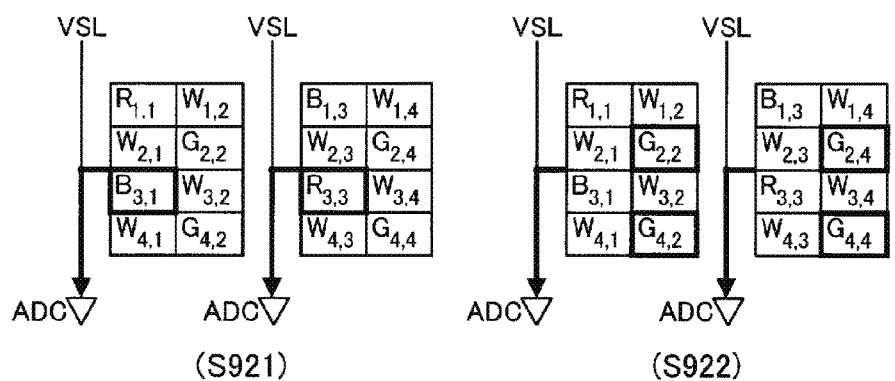

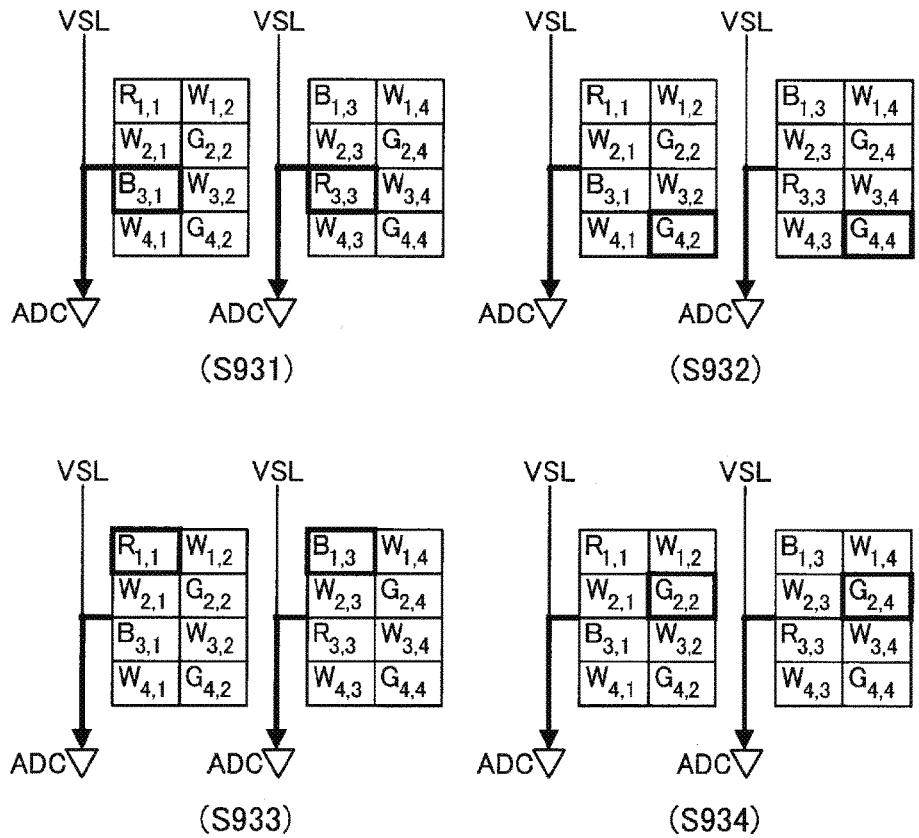

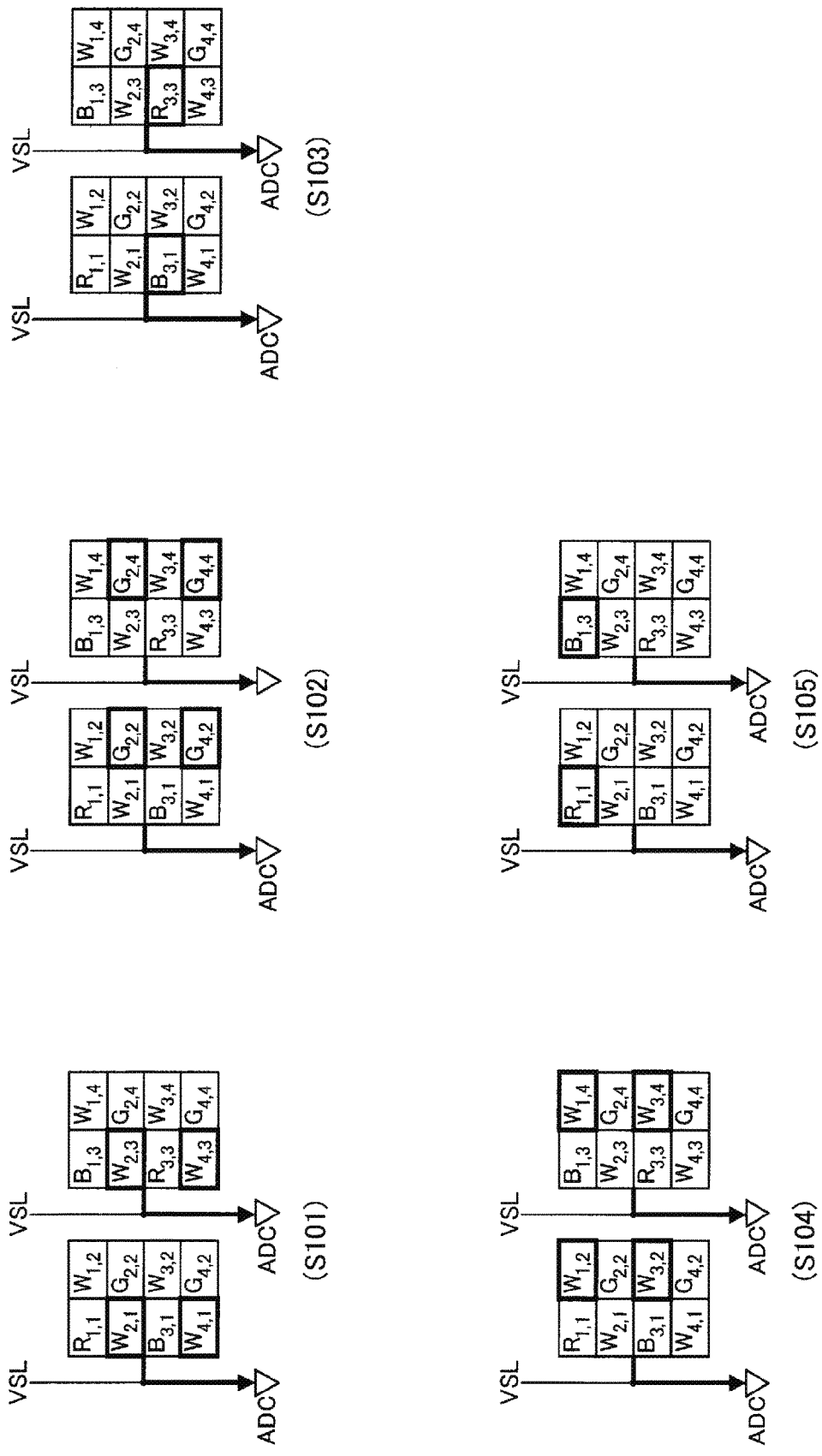

FIG. 13

| | | | |
|---|---|---|---|
| $R_{1,1}$ | | $B_{1,3}$ | |
| $B_{3,1}$ | $W_{1,2}+W_{3,2}$ | $R_{3,3}$ | $W_{1,4}+W_{3,4}$ |
| $W_{2,1}+W_{4,1}$ | $G_{2,2}+G_{4,2}$ | $W_{2,3}+W_{4,3}$ | $G_{2,4}+G_{4,4}$ |

FIG. 14

| | | | |
|---|---|---|---|
| $R_{1,1}$ | | $B_{1,3}$ | |
| $B_{3,1}$ | $W_{1,2}+W_{3,2}$ | $R_{3,3}$ | $W_{1,4}+W_{3,4}$ |
| $W_{2,1}+W_{4,1}$ | $G_{2,2}+G_{4,2}$ | $W_{2,3}+W_{4,3}$ | $G_{2,4}+G_{4,4}$ |
| | | | |
| $R_{5,1}$ | | $B_{5,3}$ | |
| $B_{7,1}$ | $W_{5,2}+W_{7,2}$ | $R_{7,3}$ | $W_{5,4}+W_{7,4}$ |
| $W_{6,1}+W_{8,1}$ | $G_{6,2}+G_{8,2}$ | $W_{6,3}+W_{8,3}$ | $G_{6,4}+G_{8,4}$ |
| | | | |
| $R_{9,1}$ | | $B_{9,3}$ | |
| $B_{11,1}$ | $W_{9,2}+W_{11,2}$ | $R_{11,3}$ | $W_{9,4}+W_{11,4}$ |
| $W_{10,1}+W_{12,1}$ | $G_{10,2}+G_{12,2}$ | $W_{10,3}+W_{12,3}$ | $G_{10,4}+G_{12,4}$ |

BEFORE INTEGRATION

| | | | |
|---|---|---|---|
| $R_{C1}$ | | $B_{C1}$ | |
| | $W_{1,2}+W_{3,2}$ | | $W_{1,4}+W_{3,4}$ |
| $W_{2,1}+W_{4,1}$ | $G_{2,2}+G_{4,2}$ | $W_{2,3}+W_{4,3}$ | $G_{2,4}+G_{4,4}$ |
| | | | |
| | | | |
| $B_{C2}$ | $W_{5,2}+W_{7,2}$ | $R_{C2}$ | $W_{5,4}+W_{7,4}$ |
| $W_{6,1}+W_{8,1}$ | $G_{6,2}+G_{8,2}$ | $W_{6,3}+W_{8,3}$ | $G_{6,4}+G_{8,4}$ |
| | | | |
| $R_{C3}$ | | $B_{C3}$ | |
| | $W_{9,2}+W_{11,2}$ | | $W_{9,4}+W_{11,4}$ |
| $W_{10,1}+W_{12,1}$ | $G_{10,2}+G_{12,2}$ | $W_{10,3}+W_{12,3}$ | $G_{10,4}+G_{12,4}$ |

AFTER INTEGRATION

BEFORE INTEGRATION          AFTER INTEGRATION

FIG. 19

| $R_{C1}$ | $W_{C4}$ | $B_{C2}$ | $W_{C10}$ |
|---|---|---|---|

| $W_{C1}$ | $G_{C1}$ | $W_{C7}$ | $G_{C4}$ |
|---|---|---|---|

| $B_{C1}$ | $W_{C5}$ | $R_{C3}$ | $W_{C11}$ |
|---|---|---|---|

| $W_{C2}$ | $G_{C2}$ | $W_{C8}$ | $G_{C5}$ |
|---|---|---|---|

| $R_{C2}$ | $W_{C6}$ | $B_{C3}$ | $W_{C12}$ |
|---|---|---|---|

| $W_{C3}$ | $G_{C3}$ | $W_{C9}$ | $G_{C6}$ |
|---|---|---|---|

AFTER INTEGRATION

FIG. 20

| | | | |
|---|---|---|---|
| $R_{1,1}$ | | $B_{1,3}$ | |
| $B_{3,1}$ | $W_{1,2}+W_{3,2}$ | $R_{3,3}$ | $W_{1,4}+W_{3,4}$ |
| $W_{2,1}+W_{4,1}$ | $G_{2,2}+G_{4,2}$ | $W_{2,3}+W_{4,3}$ | $G_{2,4}+G_{4,4}$ |
| | | | |
| $R_{5,1}$ | | $B_{5,3}$ | |
| $B_{7,1}$ | $W_{5,2}+W_{7,2}$ | $R_{7,3}$ | $W_{5,4}+W_{7,4}$ |
| $W_{6,1}+W_{8,1}$ | $G_{6,2}+G_{8,2}$ | $W_{6,3}+W_{8,3}$ | $G_{6,4}+G_{8,4}$ |
| | | | |
| $R_{9,1}$ | | $B_{9,3}$ | |
| $B_{11,1}$ | $W_{9,2}+W_{11,2}$ | $R_{11,3}$ | $W_{9,4}+W_{11,4}$ |
| $W_{10,1}+W_{12,1}$ | $G_{10,2}+G_{12,2}$ | $W_{10,3}+W_{12,3}$ | $G_{10,4}+G_{12,4}$ |

BEFORE INTEGRATION

| | | | |
|---|---|---|---|
| $R_{C1}$ | | $B_{C2}$ | |
| | $W_{C4}$ | | $W_{C10}$ |
| $W_{C1}$ | $G_{C1}$ | $W_{C7}$ | $G_{C4}$ |
| | | | |
| $B_{C1}$ | $W_{C5}$ | $R_{C3}$ | $W_{C11}$ |
| $W_{C2}$ | $G_{C2}$ | $W_{C8}$ | $G_{C5}$ |
| | | | |
| $R_{C2}$ | | $B_{C3}$ | |
| | $W_{C6}$ | | $W_{C12}$ |
| $W_{C3}$ | $G_{C3}$ | $W_{C9}$ | $G_{C6}$ |

AFTER INTEGRATION

FIG. 23

| | | | | | | | | |
|---|---|---|---|---|---|---|---|---|
| $B_{3,1}$ | $W_{1,2}$ $+W_{3,2}$ | $R_{3,3}$ | $W_{1,4}$ $+W_{3,4}$ | | $R_{3,3}$ | $W_{1,2}$ $+W_{3,2}$ | $B_{3,1}$ | $W_{1,4}$ $+W_{3,4}$ |
| $W_{2,1}$ $+W_{4,1}$ | $G_{2,2}$ $+G_{4,2}$ | $W_{2,3}$ $+W_{4,3}$ | $G_{2,4}$ $+G_{4,4}$ | | $W_{2,1}$ $+W_{4,1}$ | $G_{2,2}$ $+G_{4,2}$ | $W_{2,3}$ $+W_{4,3}$ | $G_{2,4}$ $+G_{4,4}$ |
| $B_{7,1}$ | $W_{5,2}$ $+W_{7,2}$ | $R_{7,3}$ | $W_{5,4}$ $+W_{7,4}$ | | $B_{7,1}$ | $W_{5,2}$ $+W_{7,2}$ | $R_{7,3}$ | $W_{5,4}$ $+W_{7,4}$ |
| $W_{6,1}$ $+W_{8,1}$ | $G_{6,2}$ $+G_{8,2}$ | $W_{6,3}$ $+W_{8,3}$ | $G_{6,4}$ $+G_{8,4}$ | | $W_{6,1}$ $+W_{8,1}$ | $G_{6,2}$ $+G_{8,2}$ | $W_{6,3}$ $+W_{8,3}$ | $G_{6,4}$ $+G_{8,4}$ |
| $B_{11,1}$ | $W_{9,2}$ $+W_{11,2}$ | $R_{11,3}$ | $W_{9,4}$ $+W_{11,4}$ | | $R_{11,3}$ | $W_{9,2}$ $+W_{11,2}$ | $B_{11,1}$ | $W_{9,4}$ $+W_{11,4}$ |
| $W_{10,1}$ $+W_{12,1}$ | $G_{10,2}$ $+G_{12,2}$ | $W_{10,3}$ $+W_{12,3}$ | $G_{10,4}$ $+G_{12,4}$ | | $W_{10,1}$ $+W_{12,1}$ | $G_{10,2}$ $+G_{12,2}$ | $W_{10,3}$ $+W_{12,3}$ | $G_{10,4}$ $+G_{12,4}$ |

BEFORE REPLACEMENT            AFTER REPLACEMENT

AFTER INTERPOLATION AND
BEFORE INTEGRATION

AFTER INTEGRATION

FIG. 29

| | | | |
|---|---|---|---|
| | | | |
| | | | |
| | | | |
| | | | |
| $R_{1,1}+R_{3,3}$ | $W_{1,2}+W_{3,2}$ | $R_{5,1}+R_{7,3}$ | $W_{1,4}+W_{3,4}$ |
| $W_{2,1}+W_{4,1}$ | $G_{2,2}+G_{4,2}$ | $W_{2,3}+W_{4,3}$ | $G_{2,4}+G_{4,4}$ |
| $B_{1,3}+B_{3,1}$ | $W_{5,2}+W_{7,2}$ | $B_{5,3}+B_{7,1}$ | $W_{5,4}+W_{7,4}$ |
| $W_{6,1}+W_{8,1}$ | $G_{6,2}+G_{8,2}$ | $W_{6,3}+W_{8,3}$ | $G_{6,4}+G_{8,4}$ |

FIG. 30

| | | | |
|---|---|---|---|
| | | | |
| | | | |
| | | | |
| | | | |
| $R_{1,1}$ $+R_{3,3}$ | $W_{1,2}$ $+W_{3,2}$ | $R_{5,1}$ $+R_{7,3}$ | $W_{1,4}$ $+W_{3,4}$ |
| $W_{2,1}$ $+W_{4,1}$ | $G_{2,2}$ $+G_{4,2}$ | $W_{2,3}$ $+W_{4,3}$ | $G_{2,4}$ $+G_{4,4}$ |
| $B_{1,3}$ $+B_{3,1}$ | $W_{5,2}$ $+W_{7,2}$ | $B_{5,3}$ $+B_{7,1}$ | $W_{5,4}$ $+W_{7,4}$ |
| $W_{6,1}$ $+W_{8,1}$ | $G_{6,2}$ $+G_{8,2}$ | $W_{6,3}$ $+W_{8,3}$ | $G_{6,4}$ $+G_{8,4}$ |
| | | | |
| | | | |
| | | | |
| | | | |
| $R_{9,1}$ $+R_{11,3}$ | $W_{9,2}$ $+W_{11,2}$ | $R_{13,1}$ $+R_{15,3}$ | $W_{9,4}$ $+W_{11,4}$ |
| $W_{10,1}$ $+W_{12,1}$ | $G_{10,2}$ $+G_{12,2}$ | $W_{10,3}$ $+W_{12,3}$ | $G_{10,4}$ $+G_{12,4}$ |
| $B_{9,3}$ $+B_{11,1}$ | $W_{13,2}$ $+W_{15,2}$ | $B_{13,3}$ $+B_{15,1}$ | $W_{13,4}$ $+W_{15,4}$ |
| $W_{14,1}$ $+W_{16,1}$ | $G_{14,2}$ $+G_{16,2}$ | $W_{14,3}$ $+W_{16,3}$ | $G_{14,4}$ $+G_{16,4}$ |

BEFORE REPLACEMENT

| | | | |
|---|---|---|---|
| | | | |
| | | | |
| | | | |
| | | | |
| $R_{1,1}$ $+R_{3,3}$ | $W_{1,2}$ $+W_{3,2}$ | $B_{5,3}$ $+B_{7,1}$ | $W_{1,4}$ $+W_{3,4}$ |
| $W_{2,1}$ $+W_{4,1}$ | $G_{2,2}$ $+G_{4,2}$ | $W_{2,3}$ $+W_{4,3}$ | $G_{2,4}$ $+G_{4,4}$ |
| $B_{1,3}$ $+B_{3,1}$ | $W_{5,2}$ $+W_{7,2}$ | $R_{5,1}$ $+R_{7,3}$ | $W_{5,4}$ $+W_{7,4}$ |
| $W_{6,1}$ $+W_{8,1}$ | $G_{6,2}$ $+G_{8,2}$ | $W_{6,3}$ $+W_{8,3}$ | $G_{6,4}$ $+G_{8,4}$ |
| | | | |
| | | | |
| | | | |
| | | | |
| $R_{9,1}$ $+R_{11,3}$ | $W_{9,2}$ $+W_{11,2}$ | $B_{13,3}$ $+B_{15,1}$ | $W_{9,4}$ $+W_{11,4}$ |
| $W_{10,1}$ $+W_{12,1}$ | $G_{10,2}$ $+G_{12,2}$ | $W_{10,3}$ $+W_{12,3}$ | $G_{10,4}$ $+G_{12,4}$ |
| $B_{9,3}$ $+B_{11,1}$ | $W_{13,2}$ $+W_{15,2}$ | $R_{13,1}$ $+R_{15,3}$ | $W_{13,4}$ $+W_{15,4}$ |
| $W_{14,1}$ $+W_{16,1}$ | $G_{14,2}$ $+G_{16,2}$ | $W_{14,3}$ $+W_{16,3}$ | $G_{14,4}$ $+G_{16,4}$ |

AFTER REPLACEMENT

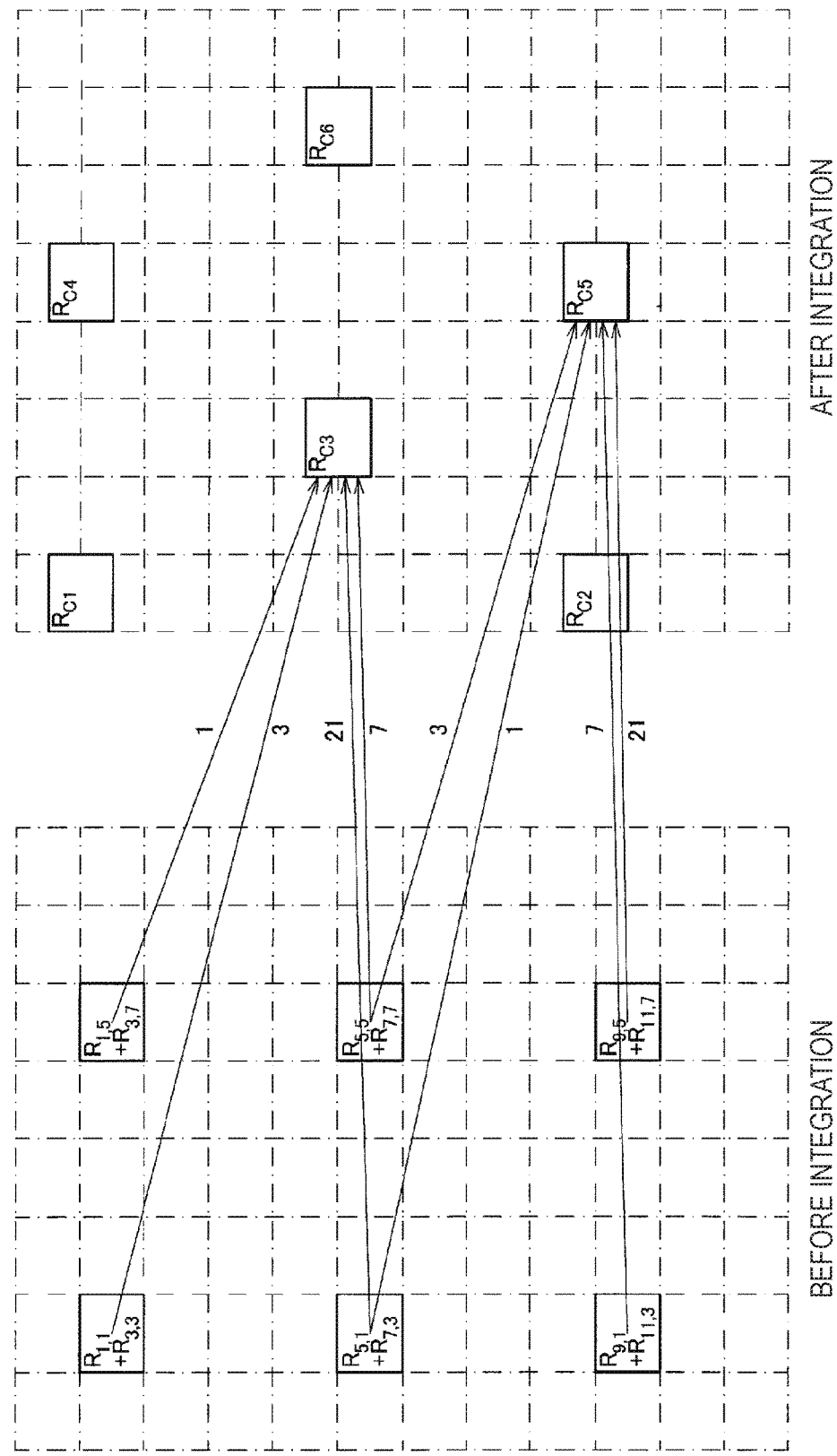

FIG. 35

| $R_{C1}$ | $W_{C4}$ | $B_{C2}$ | $W_{C10}$ | $R_{C4}$ | $W_{C16}$ | $B_{C5}$ | $W_{C22}$ |
|---|---|---|---|---|---|---|---|
| $W_{C1}$ | $G_{C1}$ | $W_{C7}$ | $G_{C4}$ | $W_{C13}$ | $G_{C7}$ | $W_{C19}$ | $G_{C10}$ |
| $B_{C1}$ | $W_{C5}$ | $R_{C3}$ | $W_{C11}$ | $B_{C4}$ | $W_{C17}$ | $R_{C6}$ | $W_{C23}$ |
| $W_{C2}$ | $G_{C2}$ | $W_{C8}$ | $G_{C5}$ | $W_{C14}$ | $G_{C8}$ | $W_{C20}$ | $G_{C11}$ |
| $R_{C2}$ | $W_{C6}$ | $B_{C3}$ | $W_{C12}$ | $R_{C5}$ | $W_{C18}$ | $B_{C6}$ | $W_{C24}$ |
| $W_{C3}$ | $G_{C3}$ | $W_{C9}$ | $G_{C6}$ | $W_{C15}$ | $G_{C9}$ | $W_{C21}$ | $G_{C12}$ |

AFTER INTEGRATION

FIG. 39

| | | | |
|---|---|---|---|
| | | | |
| | | | |
| | | | |
| | | | |
| $R_{1,1}+R_{3,3}$ | $W_{1,2}+W_{3,2}$ | $R_{5,1}+R_{7,3}$ | $W_{1,4}+W_{3,4}$ |
| $W_{2,1}+W_{4,1}$ | $G_{2,2}+G_{4,2}$ | $W_{2,3}+W_{4,3}$ | $G_{2,4}+G_{4,4}$ |
| $B_{3,1}+B_{5,3}$ | $W_{5,2}+W_{7,2}$ | $B_{7,1}+B_{9,3}$ | $W_{5,4}+W_{7,4}$ |
| $W_{6,1}+W_{8,1}$ | $G_{6,2}+G_{8,2}$ | $W_{6,3}+W_{8,3}$ | $G_{6,4}+G_{8,4}$ |

# SIGNAL PROCESSING DEVICE AND SIGNAL PROCESSING METHOD

CROSS REFERENCE TO RELATED APPLICATIONS

This application is a U.S. National Phase of International Patent Application No. PCT/JP2015/072574 filed on Aug. 7, 2015, which claims priority benefit of Japanese Patent Application No. JP 2014-222769 filed in the Japan Patent Office on Oct. 31, 2014. Each of the above-referenced applications is hereby incorporated herein by reference in its entirety.

TECHNICAL FIELD

The present disclosure relates to a signal processing device and a signal processing method.

BACKGROUND ART

In recent years, imaging devices such as digital still cameras and digital video cameras that capture images of subjects such as landscapes or persons and create image data have become widespread. Such an imaging device generally has a function as a signal processing device that performs, for example, a process of reading pixel signals obtained from pixels.

For example, Patent Document 1 discloses a signal processing device that includes pixels arranged in a Bayer array, and adds and reads pixel signals obtained from a row of pixels and pixel signals obtained from a row of pixels arranged at an interval of one line from the row of pixels in a column direction.

CITATION LIST

Patent Literature

Patent Document 1: JP 2004-147093A

DISCLOSURE OF INVENTION

Technical Problem

However, it is difficult to apply the technique disclosed in Patent Document 1 to a signal processing device in which rows of pixels having different pixel arrays are arranged at intervals of one line. For example, if the technique disclosed in Patent Document 1 is applied to the signal processing device in which rows of pixels having different pixel arrays are arranged at intervals of one line, color mixing may occur. Further, in the signal processing device in which rows of pixels having different pixel arrays are arranged at intervals of one line, it is necessary to increase the speed of the reading process of the pixel signals obtained from the pixels.

In this regard, the present disclosure proposes a signal processing device and a signal processing method, which are novel and improved and capable of improving reading efficiency of pixel signals in a signal processing device in which rows of pixels having different pixel arrays are arranged at intervals of one line.

Solution to Problem

According to the present disclosure, there is provided a signal processing device, including: a pixel array unit configured to include first pixels, second pixels, third pixels, and fourth pixels which have different spectral sensitivity characteristics and are arranged in a matrix form; and a pixel signal reading unit configured to read pixel signals obtained from the plurality of pixels arranged in the pixel array unit. The first pixels are adjacent to the second pixels in a row direction and a column direction, the second pixels are arranged at a two-pixel pitch in the row direction and the column direction, the third pixels are adjacent to the second pixels in one diagonal direction, the fourth pixels are adjacent to the second pixels in the other diagonal direction, and the pixel signal reading unit adds and reads the pixel signals obtained from the plurality of first pixels.

According to the present disclosure, there is provided a signal processing method, including: reading, by a signal processing device, pixel signals obtained from first pixels, second pixels, third pixels, and fourth pixels which have different spectral sensitivity characteristics and are arranged in a matrix form; and adding and reading, by the signal processing device, the pixel signals obtained from the plurality of first pixels. The first pixels are adjacent to the second pixels in a row direction and a column direction, the second pixels are arranged at a two-pixel pitch in the row direction and the column direction, the third pixels are adjacent to the second pixels in one diagonal direction, and the fourth pixels are adjacent to the second pixels in the other diagonal direction.

Advantageous Effects of Invention

As described above, according to the present disclosure, it is possible to improve reading efficiency of pixel signals in a signal processing device in which rows of pixels having different pixel arrays are arranged at intervals of one line.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a block diagram illustrating a schematic functional configuration of a signal processing device according to an embodiment of the present disclosure.

FIG. 2 is an explanatory diagram illustrating an overview of an array of pixels according to an embodiment of the present disclosure.

FIG. 3 is an explanatory diagram illustrating a specific example of an array of pixels according to an embodiment of the present disclosure.

FIG. 7 is an explanatory diagram illustrating a specific example of an array of pixel signals read in the reading process performed by the signal processing device according to the first comparative example.

FIG. 8 is an explanatory diagram illustrating a specific example of a flow of a reading process performed by a signal processing device according to a second comparative example.

FIG. 9 is an explanatory diagram illustrating a specific example of an array of pixel signals read in the reading process performed by the signal processing device according to the second comparative example.

FIG. 10 is an explanatory diagram illustrating a specific example of a flow of a reading process performed by a signal processing device according to a third comparative example.

FIG. 11 is an explanatory diagram illustrating a specific example of an array of pixel signals read in the reading process performed by the signal processing device according to the third comparative example.

FIG. 12 is an explanatory diagram illustrating a specific example of a flow of a reading process in a first process performed by a signal processing device according to an embodiment of the present disclosure.

FIG. 13 is an explanatory diagram illustrating a specific example of an array of pixel signals read in a first process performed by a signal processing device according to an embodiment of the present disclosure.

FIG. 14 is an explanatory diagram illustrating a specific example of arrays of pixel signals before and after a correction process in a first process performed by a signal processing device according to an embodiment of the present disclosure.

FIG. 19 is an explanatory diagram illustrating a specific example of center-of-gravity positions of pixel signals after a correction process in a second process performed by a signal processing device according to an embodiment of the present disclosure.

FIG. 20 is an explanatory diagram illustrating a specific example of arrays of pixel signals before and after a correction process in a second process performed by a signal processing device according to an embodiment of the present disclosure.

FIG. 23 is an explanatory diagram illustrating a specific example of arrays of pixel signals before and after a correction process in a third process performed by a signal processing device according to an embodiment of the present disclosure.

FIG. 29 is an explanatory diagram illustrating a specific example of an array of pixel signals read in a fifth process performed by a signal processing device according to an embodiment of the present disclosure.

FIG. 30 is an explanatory diagram illustrating a specific example of arrays of pixel signals before and after a correction process in a fifth process performed by a signal processing device according to an embodiment of the present disclosure.

FIG. 31 is an explanatory diagram illustrating a specific example of center-of-gravity positions of pixel signals obtained from R pixels before and after a correction process in a sixth process performed by a signal processing device according to an embodiment of the present disclosure.

FIG. 35 is an explanatory diagram illustrating a specific example of center-of-gravity positions of pixel signals after a correction process in a sixth process performed by a signal processing device according to an embodiment of the present disclosure.

FIG. 39 is an explanatory diagram illustrating a specific example of an array of pixel signals read in a seventh process performed by a signal processing device according to an embodiment of the present disclosure.

MODE(S) FOR CARRYING OUT THE INVENTION

Figures 4, 5:
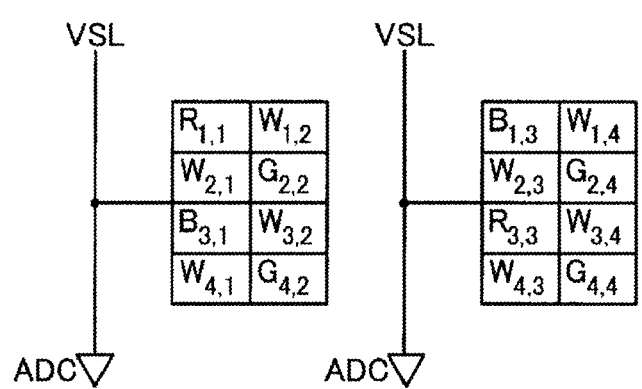
FIG. 4 is an explanatory diagram illustrating a specific example of an array of pixels according to an embodiment of the present disclosure.
FIG. 5 is an explanatory diagram illustrating an overview of a configuration of a pixel array unit according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Configuration of signal processing device
2. First process performed by signal processing device
2-1. Comparative examples
2-2. Reading process
2-3. Correction process
3. Second process performed by signal processing device
4. Third process performed by signal processing device
4-1. Reading process
4-2. Correction process
5. Fourth process performed by signal processing device
6. Fifth process performed by signal processing device
6-1. Reading process
6-2. Correction process
7. Sixth process performed by signal processing device
8. Seventh process performed by signal processing device
9. Hardware configuration
10. Conclusion

1. Configuration of Signal Processing Device

First, an overview of a signal processing device 100 according to the present disclosure will be described with reference to FIG. 1. FIG. 1 is a block diagram illustrating a schematic functional configuration of the signal processing device 100 according to an embodiment of the present disclosure.

As illustrated in FIG. 1, the signal processing device 100 according to the embodiment of the present disclosure includes a pixel array unit 10, a pixel signal reading unit 30, an AD converting unit 50, a correcting unit 70, and a signal processing unit 90.

The pixel array unit 10 includes a plurality of pixels, and the plurality of pixels receive incident light and perform photoelectric conversion to generate pixel signals. Specifically, first pixels C1, second pixels C2, third pixels C3, and fourth pixels C4 having different spectral sensitivity characteristics are arranged in a matrix form in the pixel array unit 10. Further, as illustrated in FIG. 2, in the pixel array unit 10, the first pixels C1 are adjacent to the second pixels C2 in a row direction and a column direction, the second pixels C2 are arranged at a two-pixel pitch in the row direction and the column direction, the third pixels C3 are adjacent to the second pixels C2 in one diagonal direction, and the fourth pixels C4 are adjacent to the second pixels C2 in the other diagonal direction. Therefore, in the pixel array unit 10 according to the embodiment of the present disclosure, rows of pixels having different pixel arrays are arranged at intervals of one line.

Further, in the embodiment of the present disclosure, the first pixels C1 have a sensitivity region in a wavelength region including a green region, a red region, and a blue region, the second pixels C2 have a sensitivity region in the green region, the third pixels C3 have a sensitivity region in the red region, and the fourth pixels C4 have a sensitivity region in the blue region. Hereinafter, in the description of the embodiment of the present disclosure, it is assumed that the first pixels C1, the second pixels C2, the third pixels C3, and the fourth pixels C4 are indicated as W pixels, G pixels, R pixels, and B pixels or by a combination of W and a symbol, a combination of G and a symbol, a combination of R and a symbol, and a combination of B and a symbol. The symbol indicates an array of pixels in the pixel array unit 10. Further, as illustrated in FIG. 3, a name corresponding to each pixel is written inside a rectangle indicating the pixel. In the present disclosure, the spectral sensitivity characteristics of the first pixels, the second pixels, the third pixels, and the fourth pixels are not limited to the specific example illustrated in FIG. 3. For example, as illustrated in FIG. 4, the first pixels C1 may be IR pixels having a sensitivity region in an infrared region.

FIG. 5 is an explanatory diagram illustrating an overview of a configuration of the pixel array unit 10 according to the embodiment of the present disclosure. In the signal processing device 100 according to the embodiment of the present disclosure, a floating diffusion (FD) may be shared by a plurality of pixels. For example, in the signal processing device 100 according to the embodiment of the present disclosure, the FD may be shared by eight pixels in which two pixels are arranged in the row direction, and four pixels are arranged in the column direction. Specifically, as illustrated in FIG. 5, in the signal processing device 100 according to the embodiment of the present disclosure, the FD is shared by $R_{1,1}$, $W_{2,1}$, $B_{3,1}$, $W_{4,1}$, $W_{1,2}$, $G_{2,2}$, $W_{3,2}$, and $G_{4,2}$ and by $B_{1,3}$, $W_{2,3}$, $R_{3,3}$, $W_{4,3}$, $W_{1,4}$, $G_{2,4}$, $W_{3,4}$, and $G_{4,4}$. As illustrated in FIG. 5, the plurality of pixels sharing the FD may be connected to an analog-digital converter (ADC) via a vertical signal line (VSL).

The pixel signal reading unit 30 reads the pixel signals obtained from the plurality of pixels arranged in the pixel array unit 10. Further, the pixel signal reading unit 30 adds and reads the pixel signals obtained from the plurality of first pixels C1. For example, in the embodiment of the present disclosure, the pixel signal reading unit 30 reads the pixel signals obtained from the plurality of W pixels, the plurality of G pixels, the plurality of R pixels, and the plurality of B pixels arranged in the pixel array unit 10. Further, the pixel signal reading unit 30 adds and reads the pixel signals obtained from the plurality of W pixels.

Specifically, the pixel signal reading unit 30 adds and reads the pixel signals obtained from the plurality of first pixels C 1 arranged in the same column, and adds and reads the pixel signals obtained from the plurality of second pixels C2 arranged in the same column. For example, the pixel signal reading unit 30 adds and reads the pixel signals obtained from the plurality of W pixels arranged in the same column, and adds and reads the pixel signals obtained from the plurality of G pixels arranged in the same column. The pixel signals read by the pixel signal reading unit 30 are output to the AD converting unit 50. For example, in FIG. 5, the pixel signals read by the pixel signal reading unit 30 are output to the ADC via the VSL.

The AD converting unit 50 performs analog/digital conversion on the pixel signals read by the pixel signal reading unit 30. For example, the AD converting unit 50 may include the ADC illustrated in FIG. 5. The pixel signals that have undergone the analog/digital conversion by the AD converting unit 50 are output to the correcting unit 70.

The correcting unit 70 corrects the pixel signals so that the array of pixel signals read by the pixel signal reading unit 30 becomes the same as the pixel array in the pixel array unit 10. Specifically, the correcting unit 70 corrects the pixel signals so that the array of pixel signals output from the AD converting unit 50 becomes the same as the pixel array in the pixel array unit 10. The pixel signals corrected by the correcting unit 70 are output to the signal processing unit 90.

The signal processing unit 90 performs predetermined signal processing such as a re-mosaic process, interpolation of each color, white balance, a YCbCr conversion process, compression, filing, and the like on the pixel signals corrected by the correcting unit 70.

2. First Process Performed by Signal Processing Device

The overview of the signal processing device 100 according to the embodiment of the present disclosure has been described above. Next, in order to clarify the technical significance of the signal processing device 100 according to the embodiment of the present disclosure, a reading process performed by a signal processing device according to a comparative example will be described with reference to FIGS. 6 to 11, and then a reading process in a first process performed by the signal processing device 100 according to the embodiment of the present disclosure will be described.

2-1. Comparative Examples

Figure 6:
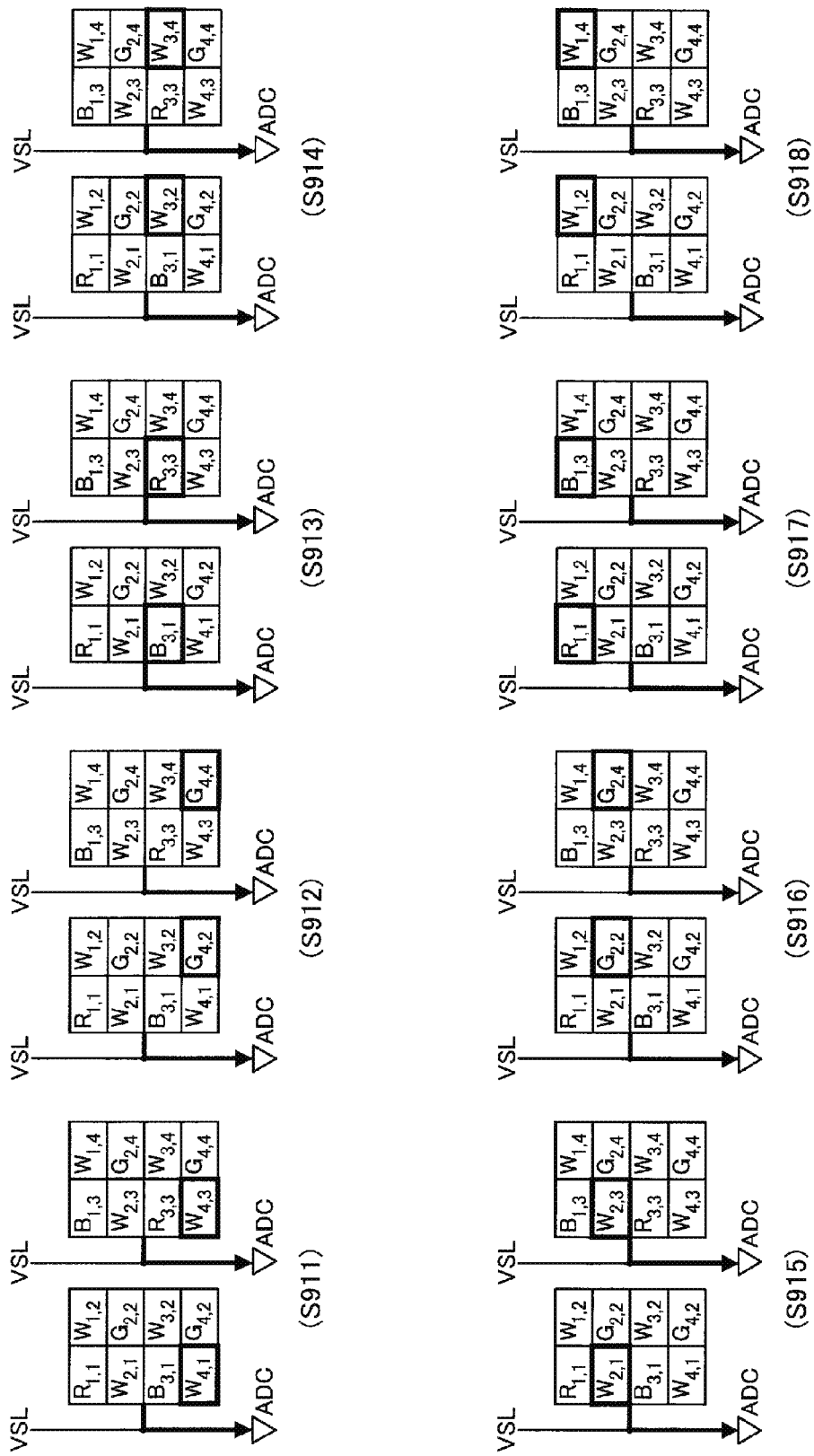
FIG. 6 is an explanatory diagram illustrating a specific example of a flow of a reading process performed by a signal processing device according to a first comparative example.

FIG. 6 is an explanatory diagram illustrating a specific example of a flow of a reading process performed by a signal processing device according to a first comparative example. In the reading process of S911 to S918 illustrated in FIG. 6, the signal processing device according to the first comparative example does not perform the process of adding and reading the pixel signals obtained from a plurality of pixels, unlike the signal processing device 100 according to the embodiment of the present disclosure.

In FIG. 6, first, the signal processing device reads the pixel signals obtained from $W_{4,1}$ and $W_{4,3}$ (S911). Then, the signal processing device reads the pixel signals obtained from $G_{4,2}$ and $G_{4,4}$ (S912). Then, the signal processing device reads the pixel signals obtained from $B_{3,1}$ and $R_{3,3}$ (S913). Thereafter, the pixel signals obtained from $W_{3,2}$ and $W_{3,4}$, $W_{2,1}$ and $W_{2,3}$, $G_{2,2}$ and $G_{2,4}$, $R_{1,1}$ and $B_{1,3}$, and $W_{1,2}$ and $W_{1,4}$ are sequentially read (S914 to S918).

FIG. 7 is an explanatory diagram illustrating a specific example of an array of pixel signals read in the reading process of S911 to S918 performed by the signal processing device according to the first comparative example. In FIG. 7, each rectangle indicates a pixel signal, and a symbol written in each rectangle indicates a pixel corresponding to the pixel signal. Hereinafter, in the explanatory diagram illustrating the array of pixel signals, information indicated by each rectangle is the same as information indicated by each rectangle in FIG. 7. The pixel signals read by the signal processing device are sequentially arranged in columns corresponding to columns in which pixels corresponding to the pixel signals are arranged in the pixel array unit.

For example, in S911, the pixel signals obtained from $W_{4,1}$ and $W_{4,3}$ read by the signal processing device are arranged in columns corresponding to first and third columns in which $W_{4,1}$ and $W_{4,3}$ are arranged in the pixel array unit. Then, in S912, the pixel signals obtained from $G_{4,2}$ and $G_{4,4}$ read by the signal processing device are arranged in columns corresponding to second and fourth columns in which $G_{4,2}$ and $G_{4,4}$ are arranged in the pixel array unit. Then, in S913, the pixel signals obtained from $B_{3,1}$ and $R_{3,3}$ read by the signal processing device are arranged in columns corresponding to first and third columns in which $B_{3,1}$ and $R_{3,3}$ are arranged in the pixel array unit. Thereafter, in S914 to S918, the pixel signals from $W_{3,2}$ and $W_{3,4}$, $W_{2,1}$ and $W_{2,3}$, $G_{2,2}$ and $G_{2,4}$, $R_{1,1}$ and $B_{1,3}$, and $W_{1,2}$ and $W_{1,4}$ are arranged in order. Hereinafter, a correspondence relation between the flow of the reading process and the array of pixel signals is the same as a correspondence relation between the flow of the reading process illustrated in FIG. 6 and the array of pixel signals illustrated in FIG. 7.

In the reading process of S911 to S918 of the pixel signal performed by the signal processing device according to the first comparative example described above, the number of readings is eight.

FIG. 8 is an explanatory diagram illustrating a specific example of a flow of a reading process performed by a signal processing device according to a second comparative example. In a reading process of S921 and S922 in FIG. 8, the signal processing device according to the second comparative example does not read the pixel signal obtained from the W pixel, unlike the signal processing device 100 according to the embodiment of the present disclosure.

In FIG. 8, first, the signal processing device reads the pixel signals obtained from $B_{3,1}$ and $R_{3,3}$ (S921). Then, the signal processing device performs adding and reading of the pixel signals obtained from $G_{2,2}$ and $G_{4,2}$ and adding and reading of the pixel signals obtained from $G_{2,4}$ and $G_{4,4}$ (S922).

FIG. 9 is an explanatory diagram illustrating a specific example of an array of pixel signals read in the reading process of S921 and S922 performed by the signal processing device according to the second comparative example. As illustrated in FIG. 9, in the reading process of S921 and S922 performed by the signal processing device according to the second comparative example, the array of read pixel signals is different from the array of pixels in the pixel array unit. Therefore, in the reading process of S921 and S922 performed by the signal processing device according to the second comparative example, a signal processing circuit at a subsequent stage may be complicated.

Further, in the reading process of S921 and S922 of the pixel signals performed by the signal processing device according to the second comparative example, the signal processing device according to the second comparative example does not perform the process of reading the pixel signal obtained from the W pixel having the larger sensitivity region than the R element, the G element, or the B element in the visible light region, and thus it is difficult to improve the S/N ratio.

FIG. 10 is an explanatory diagram illustrating a specific example of a flow of a reading process performed by a signal processing device according to a third comparative example. In the reading process of S931 to S934 in FIG. 10, the signal processing device according to the third comparative example does not perform the process of adding and reading the pixel signals obtained from a plurality of pixels and the process of reading the pixel signal obtained from the W pixel, unlike the signal processing device 100 according to the embodiment of the present disclosure.

In FIG. 10, first, the signal processing device reads the pixel signals obtained from $B_{3,1}$ and $R_{3,3}$ (S931). Then, the signal processing device reads the pixel signals obtained from $G_{4,2}$ and $G_{4,4}$ (S932). Then, the signal processing device reads the pixel signals obtained from $R_{1,1}$ and $B_{1,3}$ (S933). Then, the signal processing device reads the pixel signals obtained from $G_{2,2}$ and $G_{2,4}$ (S934).

FIG. 11 is an explanatory diagram illustrating a specific example of an array of pixel signals read in the reading process of S931 to S934 performed by the signal processing device according to the third comparative example. As illustrated in FIG. 11, the array of pixel signals read by the signal processing device according to the third comparative example is different from the array of pixels in the pixel array unit. Therefore, in the reading process of S931 to S934 performed by the signal processing device according to the third comparative example, the signal processing circuit at the subsequent stage may be complicated.

Further, in the reading processes of S931 to S934 of the pixel signal performed by the signal processing device according to the third comparative example, the signal processing device according to the third comparative example does not perform the process of reading the pixel signal obtained from the W pixel having the larger sensitivity region than the R element, the G element, or the B element in the visible light region, and thus it is difficult to improve the S/N ratio.

2-2. Reading Process

A flow of a reading process in a first process performed by the signal processing device 100 according to the embodiment of the present disclosure will be described below in detail with reference to FIGS. 12 and 13.

FIG. 12 is an explanatory diagram illustrating a specific example of a flow of a reading process in a first process performed by the signal processing device 100 according to the embodiment of the present disclosure.

In the first process performed by the signal processing device 100 according to the embodiment of the present disclosure, first, the pixel signal reading unit 30 performs adding and reading of the pixel signals obtained from $W_{2,1}$ and $W_{4,1}$ and adding and reading of the pixel signals obtained from $W_{2,3}$ and $W_{4,3}$ (S101). Then, the pixel signal reading unit 30 performs adding and reading of the pixel signals obtained from $G_{2,2}$ and $G_{4,2}$ and adding and reading of the pixel signals obtained from $G_{2,4}$ and $G_{4,4}$ (S102). Then, the pixel signal reading unit 30 reads the pixel signals obtained from $B_{3,1}$ and $R_{3,3}$ (S103). Then, the pixel signal reading unit 30 performs adding and reading of the pixel signals obtained from $W_{1,2}$ and $W_{3,2}$ and adding and reading of the pixel signals obtained from $W_{1,4}$ and $W_{3,4}$ (S104). Then, the pixel signal reading unit 30 reads the pixel signals obtained from $R_{1,1}$ and $B_{1,3}$ (S105).

FIG. 13 is an explanatory diagram illustrating a specific example of an array of pixel signals read in the first process performed by the signal processing device 100 according to the embodiment of the present disclosure. As illustrated in FIG. 13, an information amount of the pixel signals read in the first process performed by the signal processing device 100 according to the embodiment of the present disclosure is larger than an information amount of the pixel signals read in the reading process of S921 and S922 performed by the signal processing device according to the second comparative example illustrated in FIG. 9 and an information amount of the pixel signals read in the reading process of S931 to S934 performed by the signal processing device according to the third comparative example illustrated in FIG. 11. Further, in the reading process in the first process performed by the signal processing device 100 according to the embodiment of the present disclosure, the pixel signal obtained from the W pixel having a larger sensitivity region than the R element, the G element, or the B element in the visible light region is read.

In the reading process of S101 to S105 in the first process performed by the signal processing device 100 according to the embodiment of the present disclosure described above, it is possible to reduce the number of readings by adding and reading the pixel signals obtained from a plurality of W pixels. Specifically, in the reading process of S101 to S105 in the first process performed by the signal processing device 100 according to the embodiment of the present disclosure, since the number of reads is 5, it is possible to increase the speed of the reading process to be faster than the reading process of S911 to S911 performed by the signal processing device according to the first comparative example. Therefore, according to the reading process of S101 to S105 in the first process performed by the signal processing device 100 according to the embodiment of the present disclosure, it is possible to improve the reading efficiency of the pixel signals in the signal processing device 100 in which rows of pixels having different pixel arrays are arranged at intervals of one line.

Further, in the reading process of S101 to S105 in the first process performed by the signal processing device 100 according to the embodiment of the present disclosure, the pixel signal obtained from the W pixel having a larger sensitivity region than the R element, the G element, and the B element in the visible light region is read, and thus it is possible to improve the S/N ratio to be better than the reading processes of S921 and S922 performed by the signal processing device according to the second comparative example and the reading processes of S931 to S934 performed by the signal processing device according to the third comparative example.

2-3. Correction Process

A correction process in the first process performed by the signal processing device 100 according to the embodiment of the present disclosure will be described below in detail with reference to FIG. 14.

In the first process performed by the signal processing device 100 according to the embodiment of the present disclosure, the correcting unit 70 corrects the pixel signals so that the array of pixel signals read by the pixel signal reading unit 30 becomes the same as the pixel array in the pixel array unit 10. Specifically, the correcting unit 70 performs the correction by integrating the pixel signals obtained from a plurality of pixels having the same spectral sensitivity characteristic. More specifically, the correcting unit 70 performs the integration by performing weighted-averaging of the pixel signals obtained from the plurality of pixels having the same spectral sensitivity characteristic.

For example, the correcting unit 70 performs the weighted-averaging on each of the R pixels and the B pixels. The weighted-averaging for each of the R pixels and the B pixels will be sequentially described below in detail.

FIG. 14 is an explanatory diagram illustrating a specific example of arrays of pixel signals before and after the correction process in the first process performed by the signal processing device 100 according to the embodiment of the present disclosure. The array of pixel signals before the integration in FIG. 14 is an array of pixel signals obtained by sequentially performing the reading process of S101 to S105 at intervals of four rows for a pixel region including 48 pixels in which 4 pixels are arranged in the row direction, and 12 pixels are arranged in the column direction.

For example, the correcting unit 70 integrates pixel data by weighted-averaging two pixel signals obtained from the R pixels or two pixel signals obtained from the B pixels at a ratio of 1:1. Specifically, the correcting unit 70 integrates the pixel data by weighted-averaging the two pixel signals obtained from $R_{1,1}$ and $R_{3,3}$ at a ratio of 1:1 and obtains a pixel signal $R_{C1}$. Similarly, the correcting unit 70 integrates the pixel data by weighted-averaging the two pixel signals obtained from $B_{1,3}$ and $B_{3,1}$, the two pixel signals obtained from $R_{5,1}$ and $R_{7,3}$, the two pixel signals obtained from $B_{5,3}$ and $B_{7,1}$, the two pixel signals obtained from $R_{9,1}$ and $R_{11,3}$, and the two pixel signals obtained from $B_{9,3}$ and $B_{11,1}$ at a ratio of 1:1 and obtains pixel signals $B_{C1}$, $R_{C2}$, $B_{C2}$, $R_{C3}$, and $B_{C3}$. In the first process performed by the signal processing device 100 according to the embodiment of the present disclosure, one pixel signal obtained from the R pixel or one pixel signal obtained from the B pixel is used for one integration, and thus the number of pixel signals obtained from the R pixels or the B pixels is halved by the integration.

Here, for example, as illustrated in FIG. 14, the pixel signals $R_{C1}$, $B_{C1}$, $R_{C2}$, $B_{C2}$, $R_{C3}$, and $B_{C3}$ after the integration are arranged at positions at which the pixel signals $R_{1,1}$, $B_{1,3}$, $R_{7,3}$, $B_{7,1}$, $R_{9,1}$, and $B_{9,3}$ are arranged before the integration. Therefore, as illustrated in FIG. 14, in the array of pixel signals after the integration by the correcting unit 70, an array of pixel signals in a first column includes R, W, B, W, R, W, ..., an array of pixel signals in a second column includes W, G, W, G, W, G, ..., an array of pixel signals in a third column includes B, W, R, W, B, W, ..., and an array of pixel signals in a fourth column includes W, G, W, G, W, G, .... Therefore, the array of pixel signals after the integration by the correcting unit 70 becomes the same as the pixel array in the pixel array unit 10 illustrated in FIG. 7.

As described above, the correcting unit 70 corrects the pixel signals so that the array of pixel signals before the integration becomes the same as the pixel array in the pixel array unit 10 illustrated in FIG. 7 through the integration. Therefore, in the correction process in the first process performed by the signal processing device 100 according to the embodiment of the present disclosure, since the array of pixel signals read by the pixel signal reading unit 30 becomes the same as the pixel array in the pixel array unit 10, it is possible to simplify a processing circuit at a subsequent stage.

In the correction process in the first process performed by the signal processing device 100 according to the embodiment of the present disclosure, the process performed by the correcting unit 70 is simpler than that in the correction process in the second process performed by the signal processing device 100 according to the embodiment of the present disclosure, and thus it is possible to reduce the circuit size and the power consumption.

3. Second Process Performed by Signal Processing Device

Next, a second process performed by the signal processing device 100 according to the embodiment of the present disclosure will be described with reference to FIGS. 15 to 20. The second process performed by the signal processing device 100 according to the embodiment of the present disclosure differs from the first process performed by the signal processing device 100 according to the embodiment of the present disclosure in the correction process performed by the correcting unit 70. Thus, description of the reading process in the second process performed by the signal processing device 100 according to the embodiment of the present disclosure is omitted.

The reading process in the second process performed by the signal processing device 100 according to the embodiment of the present disclosure differs from the first process performed by the signal processing device 100 according to the embodiment of the present disclosure in the weighted-averaging process. Specifically, when compared with the first process performed by the signal processing device 100 according to the embodiment of the present disclosure, in the reading process in the second process performed by the signal processing device 100 according to the embodiment of the present disclosure, the correcting unit 70 further performs the weighted-averaging so that center-of-gravity positions of the pixel signals read by the pixel signal reading unit are arranged at equal intervals in a straight line form in each of the row direction and the column direction.

For example, the correcting unit 70 performs the weighted-averaging on each of the R pixels, the B pixels, the G pixels, and the W pixels. The weighted-averaging for the R pixels, the B pixels, the G pixels, and the W pixels will be sequentially described below in detail.

Figure 15:
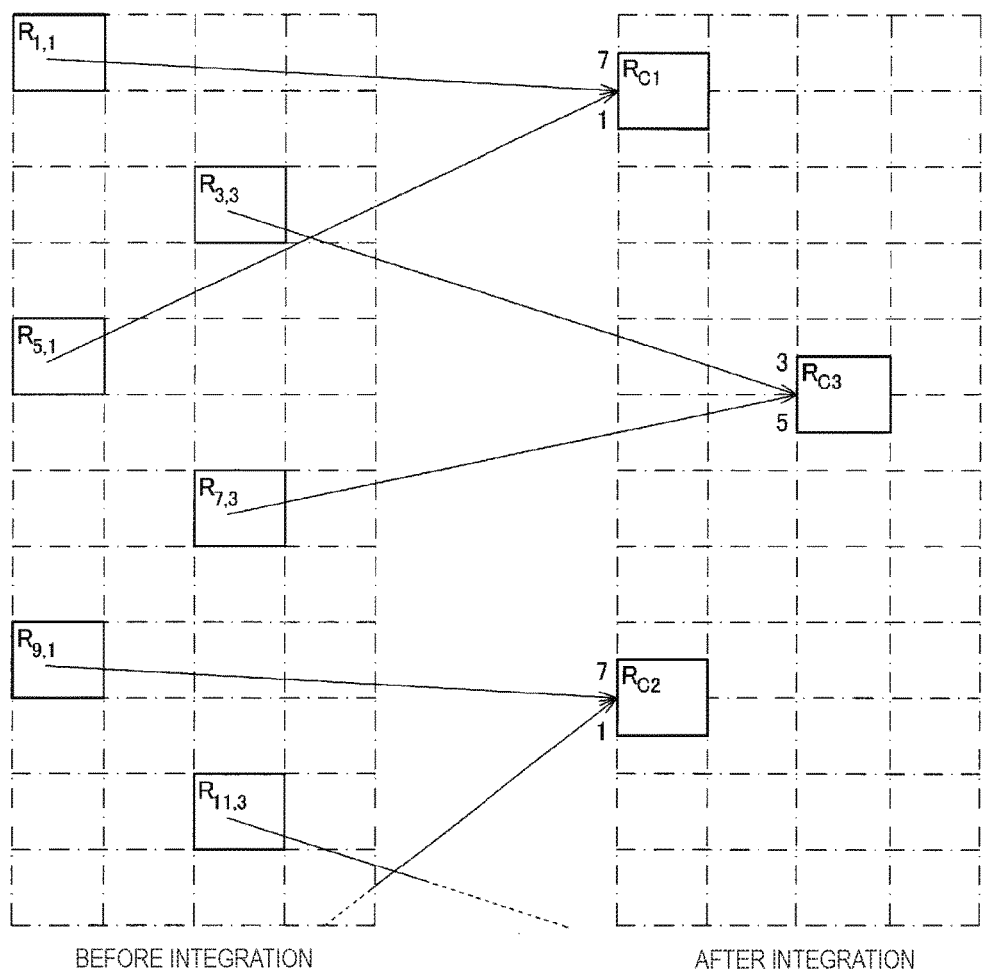
FIG. 15 is an explanatory diagram illustrating a specific example of center-of-gravity positions of pixel signals obtained from R pixels before and after a correction process in a second process performed by a signal processing device according to an embodiment of the present disclosure.

FIG. 15 is an explanatory diagram illustrating a specific example of center-of-gravity positions of the pixel signals obtained from the R pixels before and after the correction process in the second process performed by the signal processing device 100 according to the embodiment of the present disclosure. In FIG. 15, a solid line rectangle indicates a pixel signal, and a symbol written in each solid line rectangle indicates a pixel corresponding to a pixel signal. In FIG. 15, positions of solid rectangles in a dashed line grid area of 48 squares in which 4 squares are arranged in the column direction and 12 squares are arranged in the column direction indicate center-of-gravity positions of the pixel signals in the pixel region including 48 pixels in which 4 pixels are arranged in the column direction and 12 pixels are arranged in the row direction.

For example, the correcting unit 70 integrates the pixel data by weighted-averaging two pixel signals which are obtained from the R pixel and have a center-of-gravity position in a (4n+1)-th column (n is an integer) at a ratio of 7:1. More specifically, the correcting unit 70 integrates the pixel data by weighted-averaging pixel signals obtained from $R_{8m+1,4n+1}$ (m and n are integers) and $R_{8m+5,4n+1}$ (m and n are integers) at a ratio of 7:1. More specifically, the correcting unit 70 integrates the pixel data by weighted-averaging the pixel signals obtained from $R_{1,1}$ and $R_{5,1}$ at a ratio of 7:1 and obtains the pixel signal $R_{C1}$. Similarly, in FIG. 15, the pixel signal $R_{C2}$ is obtained by the integration process performed by the correcting unit 70.

For example, the correcting unit 70 integrates the pixel data by weighted-averaging two pixel signals which are obtained from the R pixel and have the center-of-gravity position in a (4n+3)-th column (n is an integer) at a ratio of 3:5. Specifically, the correcting unit 70 integrates the pixel data by weighted-averaging the pixel signals obtained from $R_{8m+3,4n+3}$ (m and n are integers) and $R_{8m+7,4n+3}$ (m and n are integers) at a ratio of 3:5. More specifically, the correcting unit 70 integrates the pixel data by weighted-averaging the pixel signals obtained from $R_{3,3}$ and $R_{7,3}$ at a ratio of 3:5 and obtain the pixel signal $R_{C3}$. In the second process performed by the signal processing device 100 according to the embodiment of the present disclosure, since one pixel signal obtained from the R pixel is used for one integration, the number of pixel signals obtained from the R pixels is halved by the integration.

Hereinafter, in the explanatory diagram illustrating the center-of-gravity positions of the pixel signals, information indicated by solid line rectangles and information indicated by positions of solid line rectangles in a dashed line grid area are similar to the information indicated by the solid line rectangles and the information indicated by the positions of the solid line rectangles in a dashed line grid area in FIG. 15.

Figure 16:
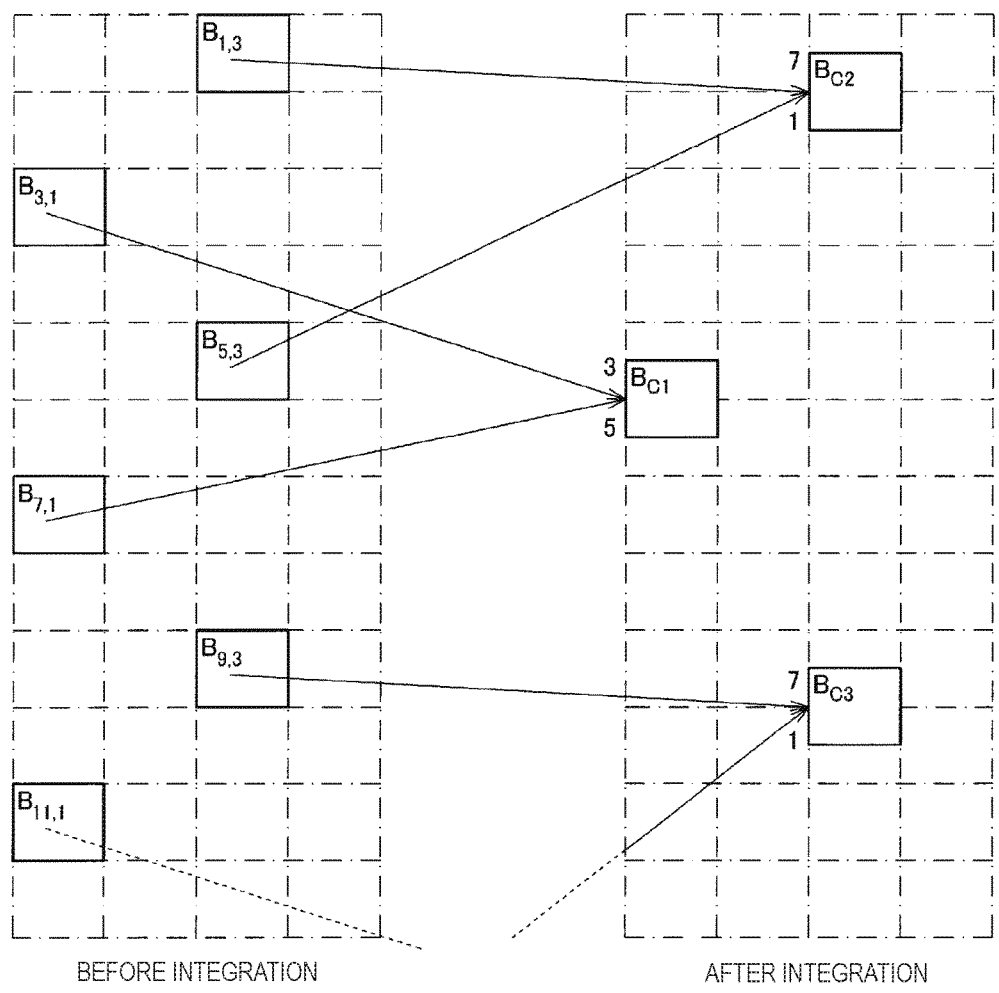
FIG. 16 is an explanatory diagram illustrating a specific example of center-of-gravity positions of pixel signals obtained from B pixels before and after a correction process in a second process performed by a signal processing device according to an embodiment of the present disclosure.

FIG. 16 is an explanatory diagram illustrating a specific example of center-of-gravity positions of the pixel signals obtained from the B pixels before and after the correction process in the second process performed by the signal processing device 100 according to the embodiment of the present disclosure.

For example, the correcting unit 70 integrates the pixel data by weighted-averaging two pixel signals which are obtained from the B pixel and have a center-of-gravity position in a (4n+1)-th column (n is an integer) at a ratio of 3:5. More specifically, the correcting unit 70 integrates the pixel data by weighted-averaging pixel signals obtained from $B_{8m+3,4n+1}$ (m and n are integers) and $B_{8m+7,4n+1}$ (m and n are integers) at a ratio of 3:5. More specifically, the correcting unit 70 integrates the pixel data by weighted-averaging the pixel signals obtained from $B_{3,1}$ and $B_{7,1}$ at a ratio of 3:5 and obtains the pixel signal $B_{C1}$.

For example, the correcting unit 70 integrates the pixel data by weighted-averaging two pixel signals which are obtained from the B pixel and have the center-of-gravity position in a (4n+3)-th column (n is an integer) at a ratio of 7:1. Specifically, the correcting unit 70 integrates the pixel data by weighted-averaging the pixel signals obtained from $B_{8m+1,4n+3}$ (m and n are integers) and $B_{8m+5,4n+3}$ (m and n are integers) at a ratio of 7:1. More specifically, the correcting unit 70 integrates the pixel data by weighted-averaging the pixel signals obtained from $B_{1,3}$ and $B_{5,3}$ at a ratio of 7:1 and obtain the pixel signal $B_{C2}$. Similarly, in FIG. 16, the pixel signal $B_{C3}$ is obtained by the integration process performed by the correcting unit 70. In the second process performed by the signal processing device 100 according to the embodiment of the present disclosure, since one pixel signal obtained from the B pixels is used for one integration, the number of pixel signals obtained from the B pixels is halved by the integration.

Figure 17:
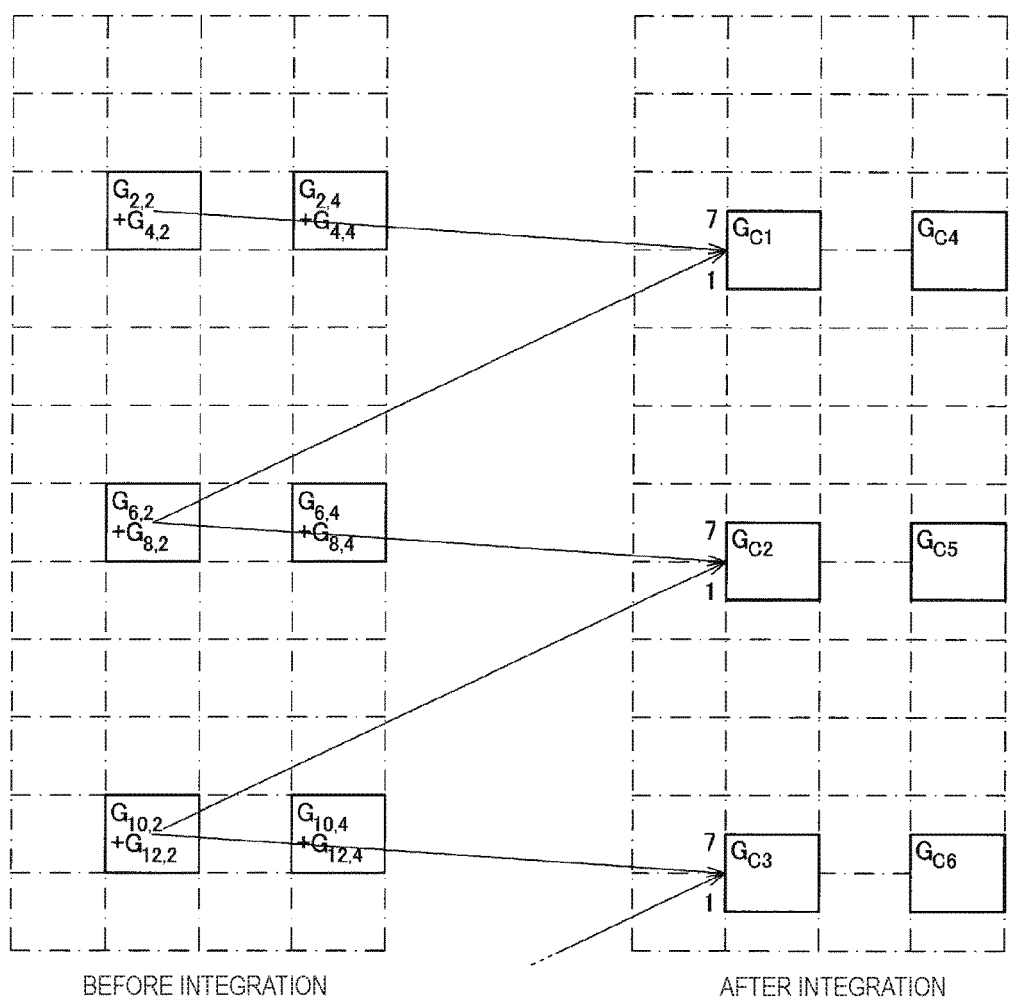
FIG. 17 is an explanatory diagram illustrating a specific example of center-of-gravity positions of pixel signals obtained from G pixels before and after a correction process in a second process performed by a signal processing device according to an embodiment of the present disclosure.

FIG. 17 is an explanatory diagram illustrating a specific example of the center-of-gravity positions of the pixel signals obtained from the G pixels before and after the correction process in the second process performed by the signal processing device 100 according to the embodiment of the present disclosure.

For example, the correcting unit 70 integrates the pixel data by weighted-averaging two pixel signals which are obtained from the G pixels and have the center-of-gravity position in a 2n-th column (n is an integer) at a ratio of 7:1. Specifically, the correcting unit 70 integrates the pixel data by weighted-averaging the pixel signal obtained by adding the pixel signals obtained from $G_{4m+2,2n}$ (m and n are integers) and $G_{4m+4,2n}$ (m and n are integers) and the pixel signal obtained by adding the pixel signals obtained from $G_{4m+6,2n}$ (m and n are integers) and $G_{4m+8,2n}$ (m and n are integers) at a ratio of 7:1. More specifically, the correcting unit 70 integrates the pixel data by weighted-averaging the pixel signal obtained by adding the pixel signals obtained from $G_{2,2}$ and $G_{4,2}$ and the pixel signal obtained by adding the pixel signals obtained from $G_{6,2}$ and $G_{8,2}$ at a ratio of 7:1, and obtains the pixel signal $G_{C1}$. Similarly, in FIG. 17, the pixel signals $G_{C2}$, $G_{C3}$, $G_{C4}$, $G_{C5}$, and $G_{C6}$ are obtained by the integration process performed by the correcting unit 70. In the second process performed by the signal processing device 100 according to the embodiment of the present disclosure, since one pixel signal obtained from the G pixels is used for two integrations, the number of pixel signals obtained from the G pixels is not changed by the integration.

Figure 18:
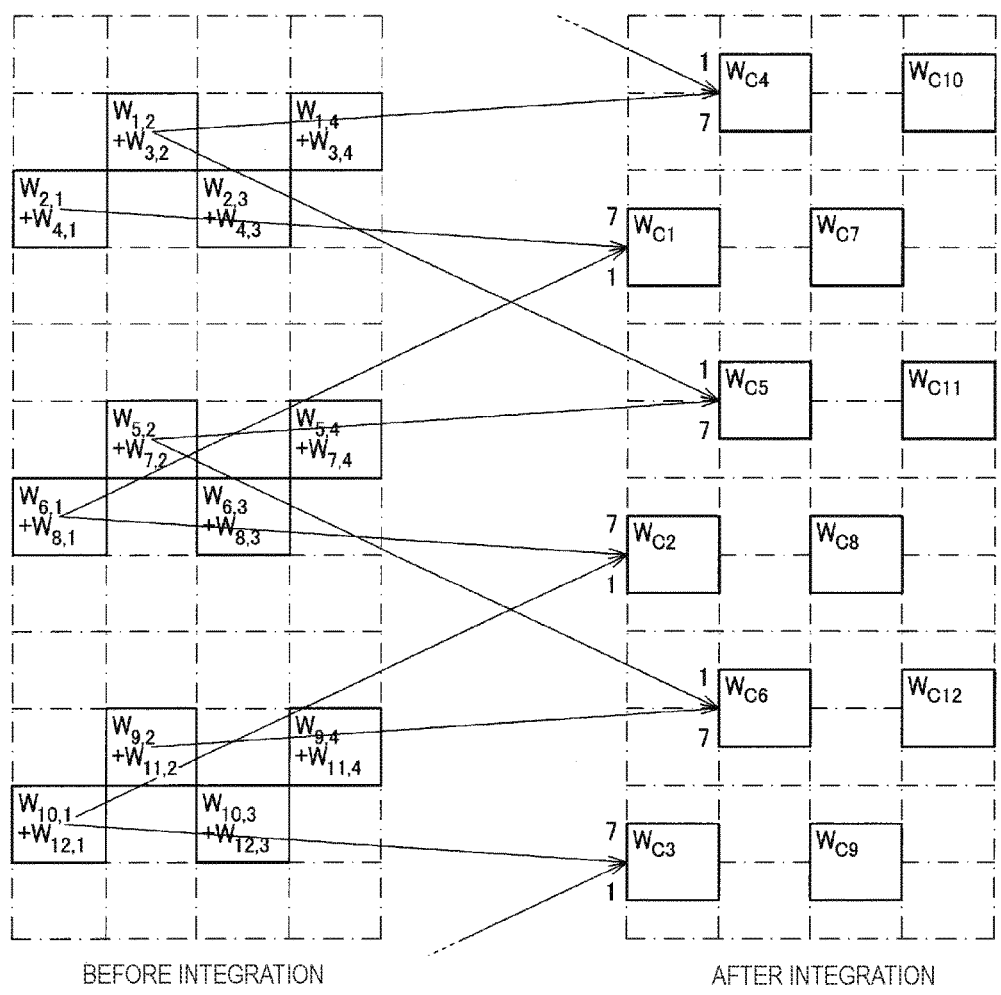
FIG. 18 is an explanatory diagram illustrating a specific example of center-of-gravity positions of pixel signals obtained from W pixels before and after a correction process in a second process performed by a signal processing device according to an embodiment of the present disclosure.

FIG. 18 is an explanatory diagram illustrating a specific example of the center-of-gravity positions of the pixel signals obtained from the W pixels before and after the correction process in the second process performed by the signal processing device 100 according to the embodiment of the present disclosure.

For example, the correcting unit 70 integrates the pixel data by weighted-averaging two pixel signals which are obtained from the W pixels and have the center-of-gravity position in a (2n+1)-th column (n is an integer) at a ratio of 7:1. Specifically, the correcting unit 70 integrates the pixel data by weighted-averaging the pixel signal obtained by adding the pixel signals obtained from $W_{4m+2,2n+1}$ (m and n are integers) and $W_{4m+4,2n+1}$ (m and n are integers) and the pixel signal obtained by adding the pixel signals obtained from $W_{4m+6,2n+1}$ (m and n are integers) and $W_{4m+8,2n+1}$ (m and n are integers) at a ratio of 7:1. More specifically, the correcting unit 70 integrates the pixel data by weighted-averaging the pixel signal obtained by adding the pixel signals obtained from $W_{2,1}$ and $W_{4,1}$ and the pixel signal obtained by adding the pixel signals obtained from $W_{6,1}$ and $W_{8,1}$ at a ratio of 7:1, and obtains the pixel signal $W_{C1}$. Similarly, in FIG. 18, the pixel signals $W_{C2}$, $W_{C3}$, $W_{C7}$, $W_{C8}$, and $W_{C9}$ are obtained by the integration process performed by the correcting unit 70.

For example, the correcting unit 70 integrates the pixel data by weighted-averaging two pixel signals which are obtained from the W pixels and have the center-of-gravity position in a 2n-th column (n is an integer) at a ratio of 1:7. Specifically, the correcting unit 70 integrates the pixel data by weighted-averaging the pixel signal obtained by adding the pixel signals obtained from $W_{4m+1,2n}$ (m and n are integers) and $W_{4m+3,2n}$ (m and n are integers) and the pixel signal obtained by adding the pixel signals obtained from $W_{4m+5,2n}$ (m and n are integers) and $W_{4m+7,2n}$ (m and n are integers) at a ratio of 1:7. More specifically, the correcting unit 70 integrates the pixel data by weighted-averaging the pixel signal obtained by adding the pixel signals obtained from $W_{1,2}$ and $W_{3,2}$ and the pixel signal obtained by adding the pixel signals obtained from $W_{5,2}$ and $W_{7,2}$ at a ratio of 1:7, and obtains the pixel signal $W_{C5}$. Similarly, in FIG. 18, the pixel signals $W_{C4}$, $W_{C6}$, $W_{C10}$, $W_{C11}$, and $W_{C12}$ are obtained by the integration process performed by the correcting unit 70. In the second process performed by the signal processing device 100 according to the embodiment of the present disclosure, since one pixel signal obtained from the W pixels is used for two integrations, the number of pixel signals obtained from the W pixels is not changed by the integration.

FIG. 19 is an explanatory diagram illustrating a specific example of the center-of-gravity positions of the pixel signals after the correction process in the second process performed by the signal processing device 100 according to the embodiment of the present disclosure. Specifically, in FIG. 19, the center-of-gravity position of the pixel signal obtained from the R pixels after the integration in FIG. 15, the center-of-gravity position of the pixel signal obtained from the B pixels after the integration in FIG. 16, the center-of-gravity position of the pixel signal obtained from the G pixels after the integration in FIG. 17, and the center-of-gravity position of the pixel signal obtained from the W pixels after the integration in FIG. 18 are illustrated as overlapping.

As illustrated in FIG. 19, the center-of-gravity positions of the pixel signals after the integration by the correcting unit 70 are arranged at equal intervals in a straight line form in each of the row direction and the column direction.

As described above, the correcting unit 70 performs the weighted averaging so that the center-of-gravity positions of the pixel signals read by the pixel signal reading unit 30 are arranged at equal intervals in the straight line form in each of the row direction and the column direction. Hence, in the correction process in the second process performed by the signal processing device 100 according to the embodiment of the present disclosure, the center-of-gravity positions of the pixel signals read by the pixel signal reading unit 30 are arranged at equal intervals in the straight line form in each of the row direction and the column direction, and thus it is possible to prevent the occurrence of image distortion, false color, and jaggies due to deviation of the center of gravity. Therefore, in the correction process in the second process performed by the signal processing device 100 according to the embodiment of the present disclosure, it is possible to improve the image quality.

Further, similarly to the first process performed by the signal processing device 100 according to the embodiment of the present disclosure, in the second process performed by the signal processing device 100 according to the embodiment of the present disclosure, the correcting unit 70 corrects the pixel signals so that the array of pixel signals before the integration becomes the same as the pixel array in the pixel array unit 10 illustrated in FIG. 7 through the integration.

FIG. 20 is an explanatory diagram illustrating a specific example of arrays of pixel signals before and after the correction process in the second process performed by the signal processing device 100 according to the embodiment of the present disclosure.

In the correction process in the second process performed by the signal processing device 100 according to the embodiment of the present disclosure, for example, as illustrated in FIG. 20, the pixel signals $R_{C1}$, $B_{C1}$, $R_{C2}$, $B_{C2}$, $R_{C3}$, and $B_{C3}$ after the integration are arranged at positions at which the pixel signals $R_{1,1}$, $B_{7,1}$, $R_{9,1}$, $B_{1,3}$, $R_{7,3}$, and $B_{9,3}$ are arranged before the integration. Therefore, as illustrated in FIG. 20, in the array of pixel signals after the integration by the correcting unit 70, an array of pixel signals in a first column includes R, W, B, W, R, W, . . . , an array of pixel signals in a second column includes W, G, W, G, W, G, . . . , an array of pixel signals in a third column includes B, W, R, W, B, W, . . . , and an array of pixel signals in a fourth column includes W, G, W, G, W, G, . . . . Therefore, the array of pixel signals after the integration by the correcting unit 70 becomes the same as the pixel array in the pixel array unit 10 illustrated in FIG. 7.

As described above, the correcting unit 70 corrects the pixel signals so that the array of pixel signals before the integration becomes the same as the pixel array in the pixel array unit 10 illustrated in FIG. 7 through the integration. Therefore, in the correction process in the second process performed by the signal processing device 100 according to the embodiment of the present disclosure, since the array of pixel signals read by the pixel signal reading unit 30 becomes the same as the pixel array in the pixel array unit 10, it is possible to simplify a processing circuit at a subsequent stage.

4. Third Process Performed by Signal Processing Device

Next, a third process performed by the signal processing device 100 according to the embodiment of the present disclosure will be described. The third process performed by the signal processing device 100 according to the embodiment of the present disclosure differs from the first process performed by the signal processing device 100 according to the embodiment of the present disclosure in the reading process performed by the pixel signal reading unit 30 and the correction process performed by the correcting unit 70.

(4-1. Reading Process)

A flow of a reading process in a third process performed by the signal processing device 100 according to the embodiment of the present disclosure will be described below in detail with reference to FIGS. 21 and 22.

Unlike the first process performed by the signal processing device 100 according to the embodiment of the present disclosure, in the third process performed by the signal processing device 100 according to the embodiment of the present disclosure, the pixel signal reading unit 30 thins out and reads the third pixels C3 and the fourth pixels C4 in the column direction. For example, the pixel signal reading unit 30 thins out and reads the R pixels and the B pixels in the column direction.

Figure 21:
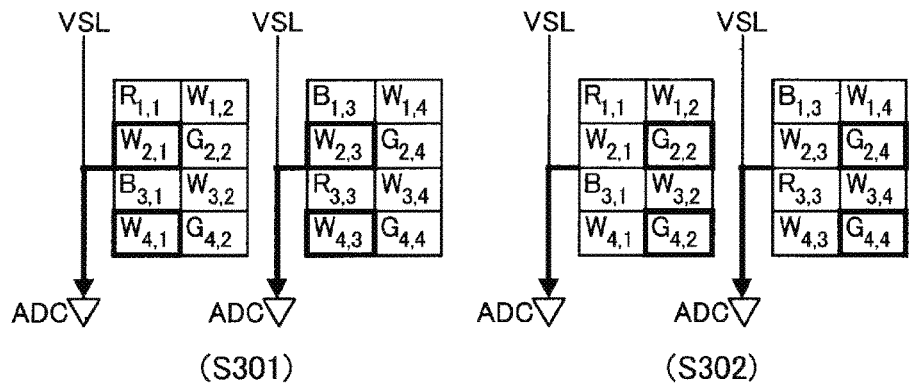
FIG. 21 is an explanatory diagram illustrating a specific example of a flow of a reading process in a third process performed by a signal processing device according to an embodiment of the present disclosure.

FIG. 21 is an explanatory diagram illustrating a specific example of a flow of a reading process in the third process performed by the signal processing device 100 according to the embodiment of the present disclosure.

In the third process performed by the signal processing device 100 according to the embodiment of the present disclosure, first, the pixel signal reading unit 30 performs adding and reading of the pixel signals obtained from $W_{2,1}$ and $W_{4,1}$ and adding and reading of the pixel signals obtained from $W_{2,3}$ and $W_{4,3}$ (S301). Then, the pixel signal reading unit 30 performs adding and reading of the pixel signals obtained from $G_{2,2}$ and $G_{4,2}$ and adding and reading of the pixel signals obtained from $G_{2,4}$ and $G_{4,4}$ (S302). Then, the pixel signal reading unit 30 reads the pixel signals obtained from $B_{3,1}$ and $R_{3,3}$ (S303). Then, the pixel signal reading unit 30 performs adding and reading of the pixel signals obtained from $W_{1,2}$ and $W_{3,2}$ and adding and reading of the pixel signals obtained from $W_{1,4}$ and $W_{3,4}$ (S304).

Figure 22:
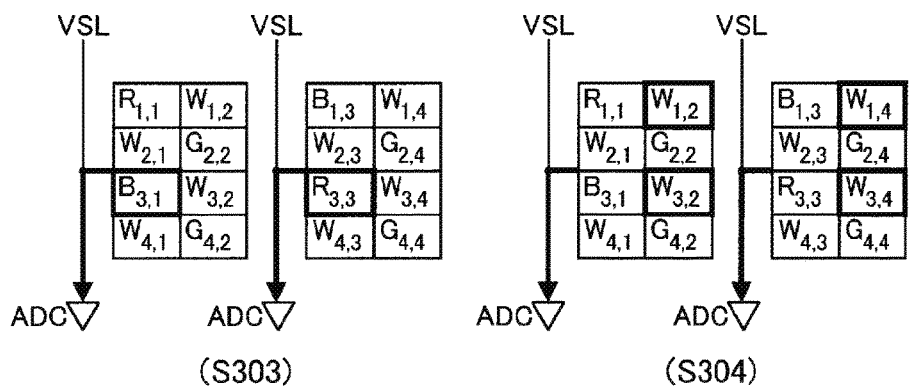
FIG. 22 is an explanatory diagram illustrating a specific example of an array of pixel signals read in a third process performed by a signal processing device according to an embodiment of the present disclosure.

FIG. 22 is an explanatory diagram illustrating a specific example of an array of pixel signals read in the third process performed by the signal processing device 100 according to the embodiment of the present disclosure. In the reading process in the third process performed by the signal processing device 100 according to the embodiment of the present disclosure, the pixel signal obtained from the W pixel having a larger sensitivity region than the R element, the G element, and the B element in the visible light region is read.

In the reading process of S301 to S304 in the third process performed by the signal processing device 100 according to the embodiment of the present disclosure described above, it is possible to reduce the number of readings by thinning out and reading out the R pixels and the B pixels in the column direction. Specifically, in the reading process of S301 to S304 in the third process performed by the signal processing device 100 according to the embodiment of the present disclosure, since the number of readings is four, it is possible to further increase the speed of the reading process to be faster than the first process performed by the signal processing device 100 according to the embodiment of the present disclosure embodiment. Therefore, according to the reading process of S301 to S304 in the third process performed by the signal processing device 100 according to the embodiment of the present disclosure, in the signal processing device 100 in which rows of pixels having different pixel arrays are arranged at intervals of one line, it is possible to improve the reading efficiency of the pixel signals.

Furthermore, in the reading process of S301 to S304 in the third process performed by the signal processing device 100 according to the embodiment of the present disclosure, since the pixel signal obtained from the W pixels having a larger sensitivity region than that of the R element, the G element, and the B element in the visible light region is read, it is possible to improve the S/N ratio, similarly to the first process performed by the signal processing device 100 according to the embodiment of the present disclosure.

(4-2. Correction Process)

A correction process in the third process performed by the signal processing device 100 according to the embodiment of the present disclosure will be described below in detail with reference to FIG. 23.

Unlike the first process performed by the signal processing device 100 according to the embodiment of the present disclosure, in the third process performed by the signal processing device 100 according to the embodiment of the present disclosure, the correcting unit 70 corrects the pixel signals so that the array of pixel signals read by the pixel signal reading unit 30 becomes the same as the pixel array in the pixel array unit 10 by replacing the pixel signals obtained from a plurality of pixels having different spectral sensitivity characteristics.

Specifically, the correcting unit 70 replaces the pixel signals obtained from the R pixels and the B pixels. The replacement of the R pixels and the B pixels will be sequentially described below in detail.

FIG. 23 is an explanatory diagram illustrating a specific example of arrays of pixel signals before and after the correction process in the third process performed by the signal processing device 100 according to the embodiment of the present disclosure. The array of pixel signals before the replacement in FIG. 23 is an array of pixel signals obtained by sequentially performing the reading process of S301 to S304 at intervals of four rows for a pixel region including 48 pixels in which 4 pixels are arranged in the row direction, and 12 pixels are arranged in the column direction.

For example, the correcting unit 70 replaces the pixel signals obtained from the R pixels and the B pixels arranged at intervals of two columns in the same row. Specifically, the correcting unit 70 replaces the pixel signals obtained from $R_{3,3}$ and $B_{3,1}$. Similarly, the correcting unit 70 replaces the pixel signals obtained from $R_{11,3}$ and $B_{11,1}$. Therefore, as illustrated in FIG. 23, in an array of pixel signals after the replacement by the correcting unit 70, an array of pixel signals in a first column includes R, W, B, W, R, W, . . . , an array of pixel signals in a second column includes W, G, W, G, W, G, . . . , an array of pixel signals in a third column includes B, W, R, W, B, W, . . . , and an array of pixel signals in a fourth column includes W, G, W, G, W, G, . . . . Therefore, an array of pixel signals after the replacement by the correcting unit 70 becomes the same as the pixel array in the pixel array unit 10 illustrated in FIG. 7. As described above, the correcting unit 70 corrects the pixel signals so that an array of pixel signals before the replacement becomes the same as the pixel array in the pixel array unit 10 illustrated in FIG. 7 through the replacement.

In the correction process in the third process performed by the signal processing device 100 according to the embodiment of the present disclosure described above, since the array of pixel signals read by the pixel signal reading unit 30 becomes the same as the pixel array in the pixel array unit 10, it is possible to simplify a signal processing circuit at a subsequent stage.

In the correction process in the third process performed by the signal processing device 100 according to the embodiment of the present disclosure, the process performed by the correcting unit 70 is simpler than that in the correction process in the fourth process performed by the signal processing device 100 according to the embodiment of the present disclosure, and thus it is possible to reduce the circuit size and the power consumption.

5. Fourth Process Performed by Signal Processing Device

Next, a fourth process performed by the signal processing device 100 according to the embodiment of the present disclosure will be described with reference to FIGS. 24 to 26. The fourth process performed by the signal processing device 100 according to the embodiment of the present disclosure differs from the third process performed by the signal processing device 100 according to the embodiment of the present disclosure in the correction process performed by the correcting unit 70. Thus, description of the reading process in the fourth process performed by the signal processing device 100 according to the embodiment of the present disclosure is omitted.

The correction process in the fourth process performed by the signal processing device 100 according to the embodiment of the present disclosure differs from the second process performed by the signal processing device 100 according to the embodiment of the present disclosure in the presence or absence of a process performed before the weighted-averaging. Specifically, in the correction process in the fourth process performed by the signal processing device 100 according to the embodiment of the present disclosure, the correcting unit 70 interpolates the pixel signal in accordance with the pixel signal read by the pixel signal reading unit 30 and then performs the weighted-averaging.

More specifically, the correcting unit 70 interpolates the pixel signal corresponding to the R pixel and the pixel signal corresponding to the B pixel in accordance with the pixel signal read by the pixel signal reading unit 30 and then performs the weighted-averaging for each of the R pixel, the B pixel, the G pixel, and the W pixel. The interpolation and the weighted-averaging will be sequentially described below in detail.

Figure 24:
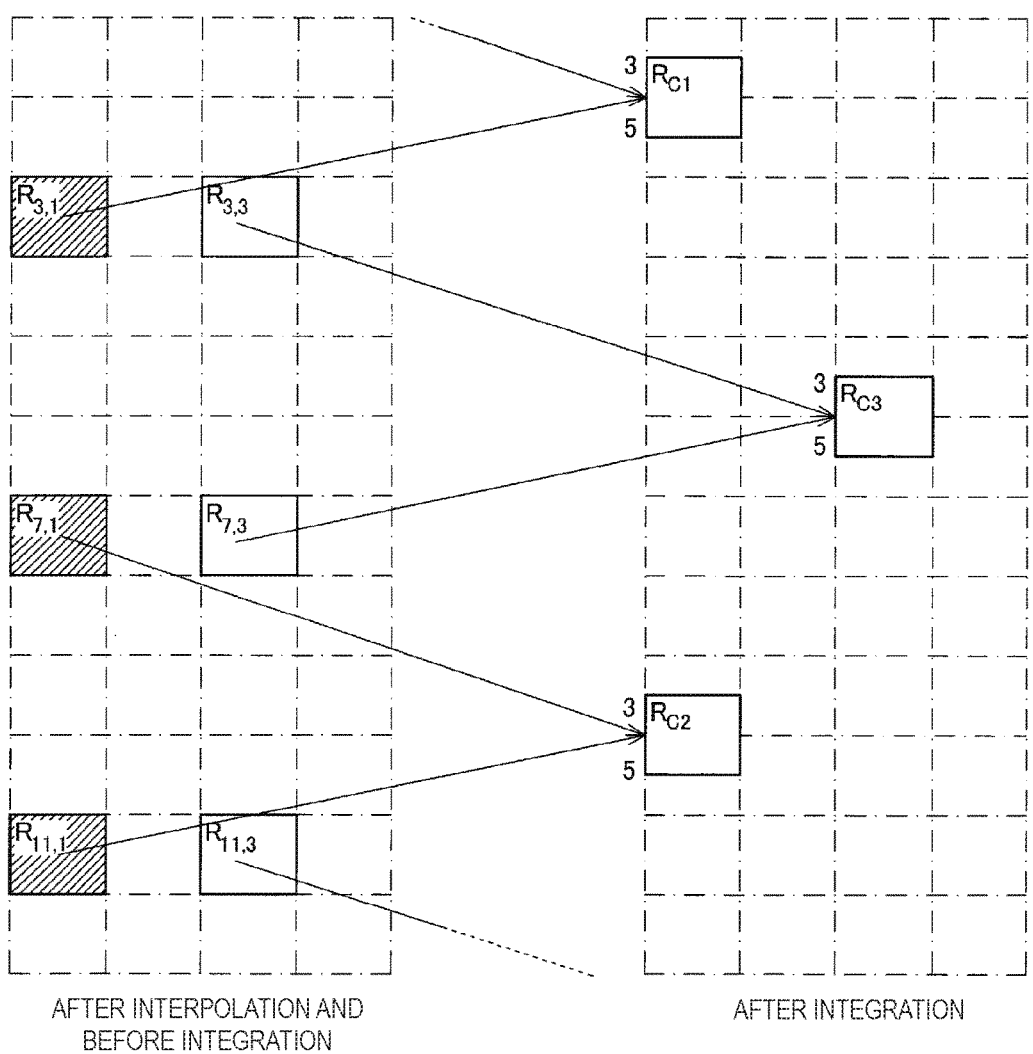
FIG. 24 is an explanatory diagram illustrating a specific example of center-of-gravity positions of pixel signals obtained from R pixels before and after a correction process in a fourth process performed by a signal processing device according to an embodiment of the present disclosure.

FIG. 24 is an explanatory diagram illustrating a specific example of the center-of-gravity positions of the pixel signals obtained from the R pixels before and after the correction process in the fourth process performed by the signal processing device 100 according to the embodiment of the present disclosure. Further, in FIG. 24, hatched rectangles indicate the pixel signals interpolated by the correcting unit 70.

The correcting unit 70 interpolates the pixel signals obtained from the R pixels when the R pixels are assumed to be arranged in a (4n+1)-th column (n is an integer). For example, the correcting unit 70 interpolates the pixel signals obtained from the R pixels when the R pixels are assumed to be arranged at the center-of-gravity positions of the pixel signals obtained from the W pixels in the (4n+1)-th column (n is an integer). Specifically, the correcting unit 70 interpolates the pixel signal obtained from $R_{4m+3,4n+1}$ (m and n are integers) when $R_{4m+3,4n+1}$ (m and n are integers) is assumed to be arranged at the center-of-gravity position of the pixel signal obtained by adding the pixel signals obtained from $W_{4m+2,4n+1}$ (m and n are integers) and $W_{4m+4,4n+1}$ (m and n are integers). More specifically, the correcting unit 70 interpolates the pixel signal obtained from $R_{3,1}$ when $R_{3,1}$ is assumed to be arranged at the center-of-gravity position of the pixel signal obtained by adding the pixel signals obtained from $W_{2,1}$ and $W_{4,1}$. For example, the correcting unit 70 decides a value $R_i$ of the pixel signal obtained from $R_{3,1}$ by using a value $W_{a1}$ of the pixel signal obtained by adding the pixel signals obtained from $W_{2,1}$ and $W_{4,1}$, an average value $W_{DC1}$ of signals obtained from the W pixels around the center-of-gravity position of the pixel signal obtained by adding the pixel signals obtained from $W_{2,1}$ and $W_{4,1}$, an average value $R_{DC}$ of signals obtained from the R pixels around the center-of-gravity position of the pixel signal obtained by adding the pixel signals obtained from $W_{2,1}$ and $W_{4,1}$, and Formula $R_i = W_{a1} \times R_{DC}/W_{DC1}$. Here, a region around the center-of-gravity position of the pixel signal obtained by adding the pixel signals obtained from $W_{2,1}$ and $W_{4,1}$ may be a pixel region including 9 pixels in which 3 pixels are arranged in each of the row direction and the column direction centering on the center-of-gravity position of the pixel signal obtained by adding the pixel signals obtained from $W_{2,1}$ and $W_{4,1}$ or may be a pixel region including 25 pixels in which 5 pixels are arranged in each of the row direction and the column direction centering on the center-of-gravity position of the pixel signal obtained by adding the pixel signals obtained from $W_{2,1}$ and $W_{4,1}$.

Similarly, the correcting unit 70 interpolates the pixel signal obtained from $R_{7,1}$ when $R_{7,1}$ is assumed to be arranged at the center-of-gravity position of the pixel signal obtained by adding the pixel signals obtained from $W_{6,1}$ and $W_{8,1}$, and interpolates the pixel signal obtained from $R_{11,1}$ when $R_{11,1}$ is assumed to be arranged at the center-of-gravity position of the pixel signal obtained by adding the pixel signals obtained from $W_{10,1}$ and $W_{12,1}$.

After the interpolation, for example, the correcting unit 70 integrates the pixel data by weighted-averaging the two pixel signals corresponding to the R pixels obtained by the interpolation at a ratio of 3:5. Specifically, the correcting unit 70 integrates the pixel data by weighted-averaging the pixel signals corresponding to $R_{8m+7,4n+1}$ (m and n are integers) and $R_{8m+11,4n+1}$ (m and n are integers) obtained by the interpolation at a ratio of 3:5. More specifically, the correcting unit 70 integrates the pixel data by weighted-averaging the pixel signals corresponding to $R_{7,1}$ and $R_{11,1}$ at a ratio of 3:5, and obtains the pixel signal $R_{C2}$. Similarly, in FIG. 24, the pixel signal $R_{C1}$ is obtained by the integration process performed by the correcting unit 70.

For example, the correcting unit 70 integrates the pixel data by weighted-averaging two pixel signals which are obtained from the R pixel and have the center-of-gravity position in a (4n+3)-th column (n is an integer) at a ratio of 3:5. Specifically, the correcting unit 70 integrates the pixel data by weighted-averaging the pixel signals obtained from $R_{8m+3,4n+3}$ (m and n are integers) and $R_{8m+7,4n+3}$ (m and n are integers) at a ratio of 3:5. More specifically, the correcting unit 70 integrates the pixel data by weighted-averaging the pixel signals obtained from $R_{3,3}$ and $R_{7,3}$ at a ratio of 3:5 and obtain the pixel signal $R_{C3}$. In the fourth process performed by the signal processing device 100 according to the embodiment of the present disclosure, since one pixel signal obtained from the R pixel is used for one integration, the number of pixel signals obtained from the R pixels is halved by the integration.

Figure 25:
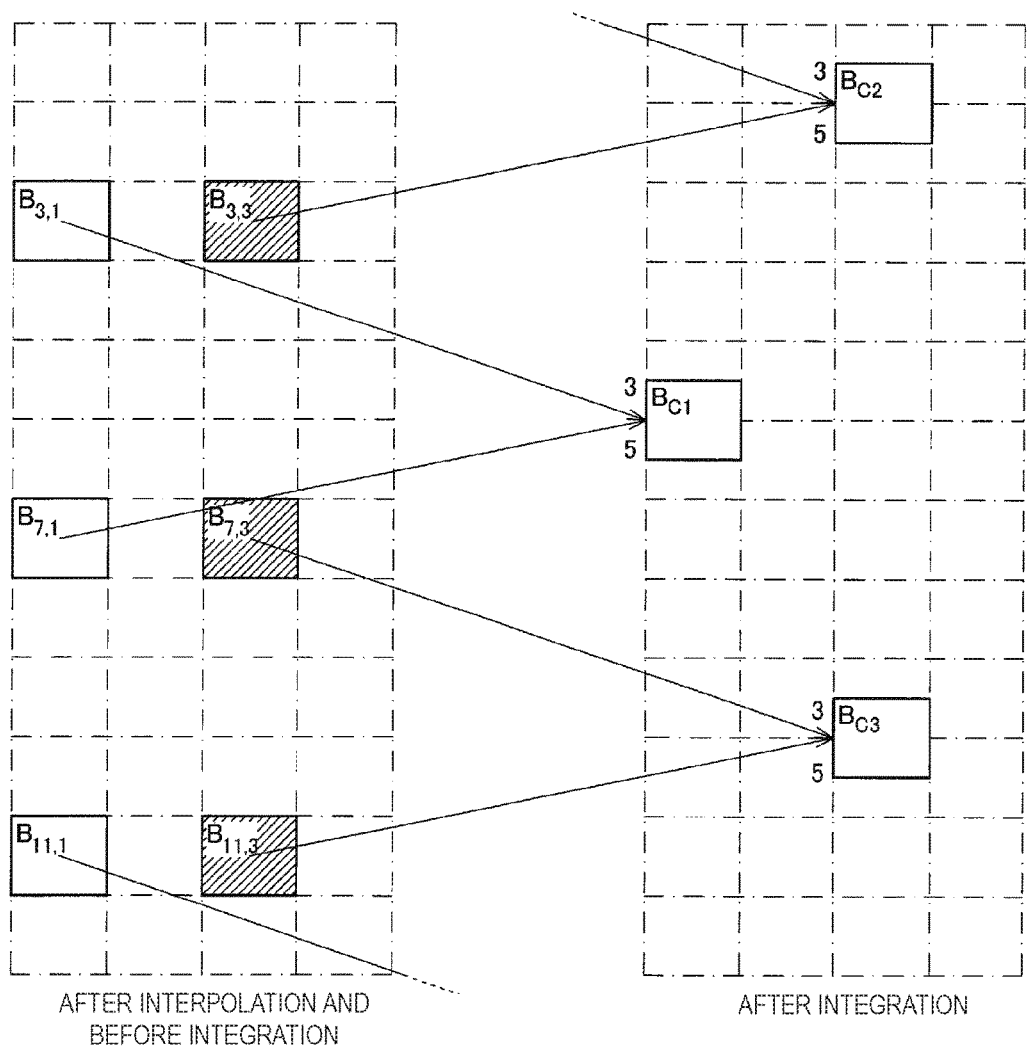
FIG. 25 is an explanatory diagram illustrating a specific example of center-of-gravity positions of pixel signals obtained from B pixels before and after a correction process in a fourth process performed by a signal processing device according to an embodiment of the present disclosure.

FIG. 25 is an explanatory diagram illustrating a specific example of the center-of-gravity positions of the pixel signals obtained from the B pixels before and after the correction process in the fourth process performed by the signal processing device 100 according to the embodiment of the present disclosure. Further, in FIG. 25, hatched rectangles indicate the pixel signals interpolated by the correcting unit 70, as in FIG. 24.

The correcting unit 70 interpolates the pixel signals obtained from the B pixels when the B pixels are assumed to be arranged in the center-of-gravity positions of a (4n+3)-th column (n is an integer). For example, the correcting unit 70 interpolates the pixel signals obtained from the B pixels when the B pixels are assumed to be arranged at the center-of-gravity positions of the pixel signals obtained from the W pixels in the (4n+3)-th column (n is an integer). Specifically, the correcting unit 70 interpolates the pixel signal obtained from $B_{4m+3,4n+3}$ (m and n are integers) when $B_{4m+3,4n+3}$ (m and n are integers) is assumed to be arranged at the center-of-gravity position of the pixel signal obtained by adding the pixel signals obtained from $W_{4m+2,4n+3}$ (m and n are integers) and $W_{4m+4,4n+3}$ (m and n are integers). More specifically, the correcting unit 70 interpolates the pixel signal obtained from $B_{3,3}$ when $B_{3,3}$ is assumed to be arranged at the center-of-gravity position of the pixel signal obtained by adding the pixel signals obtained from $W_{2,3}$ and $W_{4,3}$. For example, the correcting unit 70 decides a value $B_i$ of the pixel signal obtained from $B_{3,3}$ by using a value $W_{a2}$ of the pixel signal obtained by adding the pixel signals obtained from $W_{2,3}$ and $W_{4,3}$, an average value $W_{DC2}$ of signals obtained from the W pixels around the center-of-gravity position of the pixel signal obtained by adding the pixel signals obtained from $W_{2,3}$ and $W_{4,3}$, an average value $B_{DC}$ of signals obtained from the B pixels around the center-of-gravity position of the pixel signal obtained by adding the pixel signals obtained from $W_{2,3}$ and $W_{4,3}$, and Formula $B_i = W_{a2} \times B_{DC}/W_{DC2}$. Here, a region around the center-of-gravity position of the pixel signal obtained by adding the pixel signals obtained from $W_{2,3}$ and $W_{4,3}$ may be a pixel region including 9 pixels in which 3 pixels are arranged in each of the row direction and the column direction centering on the center-of-gravity position of the pixel signal obtained by adding the pixel signals obtained from $W_{2,3}$ and $W_{4,3}$ or may be a pixel region including 25 pixels in which 5 pixels are arranged in each of the row direction and the column direction centering on the center-of-gravity position of the pixel signal obtained by adding the pixel signals obtained from $W_{2,3}$ and $W_{4,3}$.

Similarly, the correcting unit 70 interpolates the pixel signal obtained from $B_{7,3}$ when $B_{7,3}$ is assumed to be arranged at the center-of-gravity position of the pixel signal obtained by adding the pixel signals obtained from $W_{6,3}$ and $W_{8,3}$, and interpolates the pixel signal obtained from $B_{11,3}$ when $B_{11,3}$ is assumed to be arranged at the center-of-gravity position of the pixel signal obtained by adding the pixel signals obtained from $W_{10,3}$ and $W_{12,3}$.

After the interpolation, for example, the correcting unit 70 integrates the pixel data by weighted-averaging the two pixel signals corresponding to the B pixels obtained by the interpolation at a ratio of 3:5. Specifically, the correcting unit 70 integrates the pixel data by weighted-averaging the pixel signals corresponding to $B_{8m+7,4n+3}$ (m and n are integers) and $B_{8m+11,4n+3}$ (m and n are integers) obtained by the interpolation at a ratio of 3:5. More specifically, the correcting unit 70 integrates the pixel data by weighted-averaging the pixel signals obtained from $B_{7,3}$ and $B_{11,3}$ at a ratio of 3:5, and obtains the pixel signal $B_{C3}$. Similarly, in FIG. 25, the pixel signal $B_{C2}$ is obtained by the integration process performed by the correcting unit 70.

For example, the correcting unit 70 integrates the pixel data by weighted-averaging two pixel signals which are obtained from the B pixel and have the center-of-gravity position in a (4n+1)-th column (n is an integer) at a ratio of 3:5. Specifically, the correcting unit 70 integrates the pixel data by weighted-averaging the pixel signals obtained from $B_{8m+3,4n+1}$ (m and n are integers) and $B_{8m+7,4n+1}$ (m and n are integers) at a ratio of 3:5. More specifically, the correcting unit 70 integrates the pixel data by weighted-averaging the pixel signals obtained from $B_{3,1}$ and $B_{7,1}$ at a ratio of 3:5 and obtain the pixel signal $B_{C1}$. In the fourth process performed by the signal processing device 100 according to the embodiment of the present disclosure, since one pixel signal obtained from the B pixel is used for one integration, the number of pixel signals obtained from the B pixels is halved by the integration.

The weighted-averaging processing for the pixel signals obtained from the G pixels and the W pixels in the fourth process performed by the signal processing device 100 according to the embodiment of the present disclosure is similar to the weighted-averaging processing for the pixel signals obtained from the G pixels and the W pixels in the second process performed by the signal processing device 100 according to the embodiment of the present disclosure described above with reference to FIGS. 17 and 18.

The center-of-gravity position of the pixel signal after the correction process is similar to the specific example of the center-of-gravity position of the pixel signal after the correction process in the second process performed by the signal processing device 100 according to the embodiment of the present disclosure illustrated in FIG. 19. Specifically, in the center-of-gravity position of the pixel signal after the correction process, the center-of-gravity position of the pixel signal obtained from the R pixels after the integration in FIG. 24, the center-of-gravity position of the pixel signal obtained from the B pixels after the integration in FIG. 25, the center-of-gravity position of the pixel signal obtained from the G pixels after the integration in FIG. 17, and the center-of-gravity position of the pixel signal obtained from the W pixels after the integration in FIG. 18 are arranged to overlap.

As illustrated in FIG. 19, the center-of-gravity positions of the pixel signals after the integration by the correcting unit 70 are arranged at equal intervals in a straight line form in each of the row direction and the column direction.

As described above, the correcting unit 70 performs the weighted averaging so that the center-of-gravity positions of the pixel signals read by the pixel signal reading unit 30 are arranged at equal intervals in the straight line form in each of the row direction and the column direction. Hence, in the correction process in the fourth process performed by the signal processing device 100 according to the embodiment of the present disclosure, the center-of-gravity positions of the pixel signals read by the pixel signal reading unit 30 are arranged at equal intervals in the straight line form in each of the row direction and the column direction, and thus it is possible to prevent the occurrence of image distortion, false color, and jaggies due to deviation of the center of gravity. Therefore, in the correction process in the fourth process performed by the signal processing device 100 according to the embodiment of the present disclosure, it is possible to improve the image quality.

Further, similarly to the first process performed by the signal processing device 100 according to the embodiment of the present disclosure, in the fourth process performed by the signal processing device 100 according to the embodiment of the present disclosure, the correcting unit 70 corrects the pixel signals so that the array of pixel signals before the integration becomes the same as the pixel array in the pixel array unit 10 illustrated in FIG. 7 through the integration.

Figure 26:
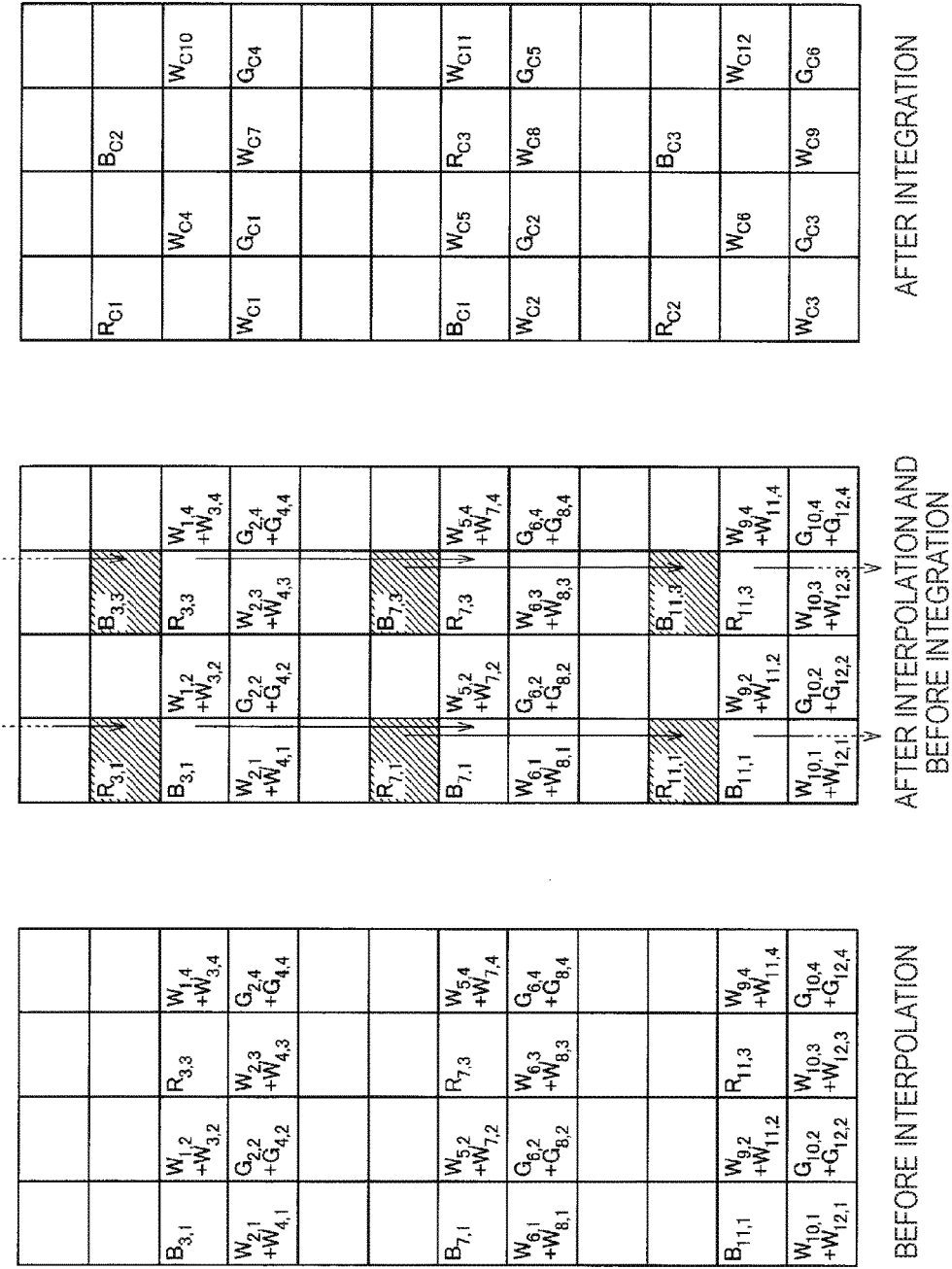
FIG. 26 is an explanatory diagram illustrating a specific example of arrays of pixel signals before and after a correction process in a fourth process performed by a signal processing device according to an embodiment of the present disclosure.

FIG. 26 is an explanatory diagram illustrating a specific example of arrays of pixel signals before and after the correction process in the fourth process performed by the signal processing device 100 according to the embodiment of the present disclosure. Specifically, an array of pixel signals before the interpolation process in the fourth process performed by the signal processing device 100 according to the embodiment of the present disclosure, an array of pixel signals before the integration process after the interpolation process, and an array of pixel signals after the integration process are illustrated in FIG. 26.

In the correction process in the fourth process performed by the signal processing device 100 according to the embodiment of the present disclosure, for example, as illustrated in FIG. 26, the pixel signals corresponding to $R_{3,1}$, $R_{7,1}$, $R_{11,1}$, $B_{3,3}$, $B_{7,3}$, and $B_{11,3}$ obtained by the interpolation are arranged to be stacked on the pixel signals obtained from $B_{3,1}$, $B_{7,1}$, $B_{11,1}$, $R_{3,3}$, $R_{7,3}$, and $R_{11,3}$. Further, as illustrated in FIG. 26, for example, the pixel signals $R_{C1}$, $B_{C1}$, $R_{C2}$, $B_{C2}$, $R_{C3}$, and $B_{C3}$ after the integration are arranged at the positions at which the pixel signals obtained from $R_{3,1}$, $B_{7,1}$, $R_{11,1}$, $B_{3,3}$, $R_{7,3}$, and $B_{11,3}$ are arranged after the correction process and before the integration process. Therefore, as illustrated in FIG. 26, in the array of pixel signals after the integration by the correcting unit 70, an array of pixel signals in a first column includes R, W, B, W, R, W, . . . , an array of pixel signals in a second column includes W, G, W, G, W, G, . . . , an array of pixel signals in a third column includes B, W, R, W, B, W, . . . , and an array of pixel signals in a fourth column includes W, G, W, G, W, G, . . . . Therefore, the array of pixel signals after the integration by the correcting unit 70 becomes the same as the pixel array in the pixel array unit 10 illustrated in FIG. 7.

As described above, the correcting unit 70 corrects the pixel signals so that the array of pixel signals before the integration becomes the same as the pixel array in the pixel array unit 10 illustrated in FIG. 7 through the integration. Therefore, in the correction process in the fourth process performed by the signal processing device 100 according to the embodiment of the present disclosure, since the array of pixel signals read by the pixel signal reading unit 30 becomes the same as the pixel array in the pixel array unit 10, it is possible to simplify a processing circuit at a subsequent stage.

6. Fifth Process Performed by Signal Processing Device

Next, a fifth process performed by the signal processing device 100 according to the embodiment of the present disclosure will be described. The fifth process performed by the signal processing device 100 according to the embodiment of the present disclosure differs from the first process performed by the signal processing device 100 according to the embodiment of the present disclosure in the reading process performed by the pixel signal reading unit 30 and the correction process performed by the correcting unit 70.

(6-1. Reading Process)

A flow of a reading process in a fifth process performed by the signal processing device 100 according to the embodiment of the present disclosure will be described below in detail with reference to FIGS. 27 to 29.

Here, in the reading process in the fifth process performed by the signal processing device 100 according to the embodiment of the present disclosure, the pixel reading unit 30 can add and read the pixel signals obtained from a pixel region including 8 pixels sharing an FD, and a pixel region sharing an FD different from the FD. For example, in the reading process in the fifth process performed by the signal processing device 100 according to the embodiment of the present disclosure, the pixel reading unit 30 can perform source follower addition and read the pixel signals obtained from a pixel region including $R_{1,1}$, $W_{2,1}$, $B_{3,1}$, $W_{4,1}$, $W_{1,2}$, $G_{2,2}$, $W_{3,2}$, and $G_{4,2}$ sharing an FD and a pixel region including $B_{5,3}$, $W_{6,3}$, $R_{7,3}$, $W_{8,3}$, $W_{5,4}$, $G_{6,4}$, $W_{7,4}$, and $G_{8,4}$ sharing an FD different from the FD. Further, in the reading process in the fifth process performed by the signal processing device 100 according to the embodiment of the present disclosure, the pixel reading unit 30 can perform source follower addition and read the pixel signals obtained from a pixel region including $B_{1,3}$, $W_{2,3}$, $R_{3,3}$, $W_{4,3}$, $W_{1,4}$, $G_{2,4}$, $W_{3,4}$, and $G_{4,4}$ sharing an FD and a pixel region including $R_{5,1}$, $W_{6,1}$, $B_{7,1}$, $W_{8,1}$, $W_{5,2}$, $G_{6,2}$, $W_{7,2}$ and $G_{8,2}$ sharing an FD different from the FD.

Figure 27:
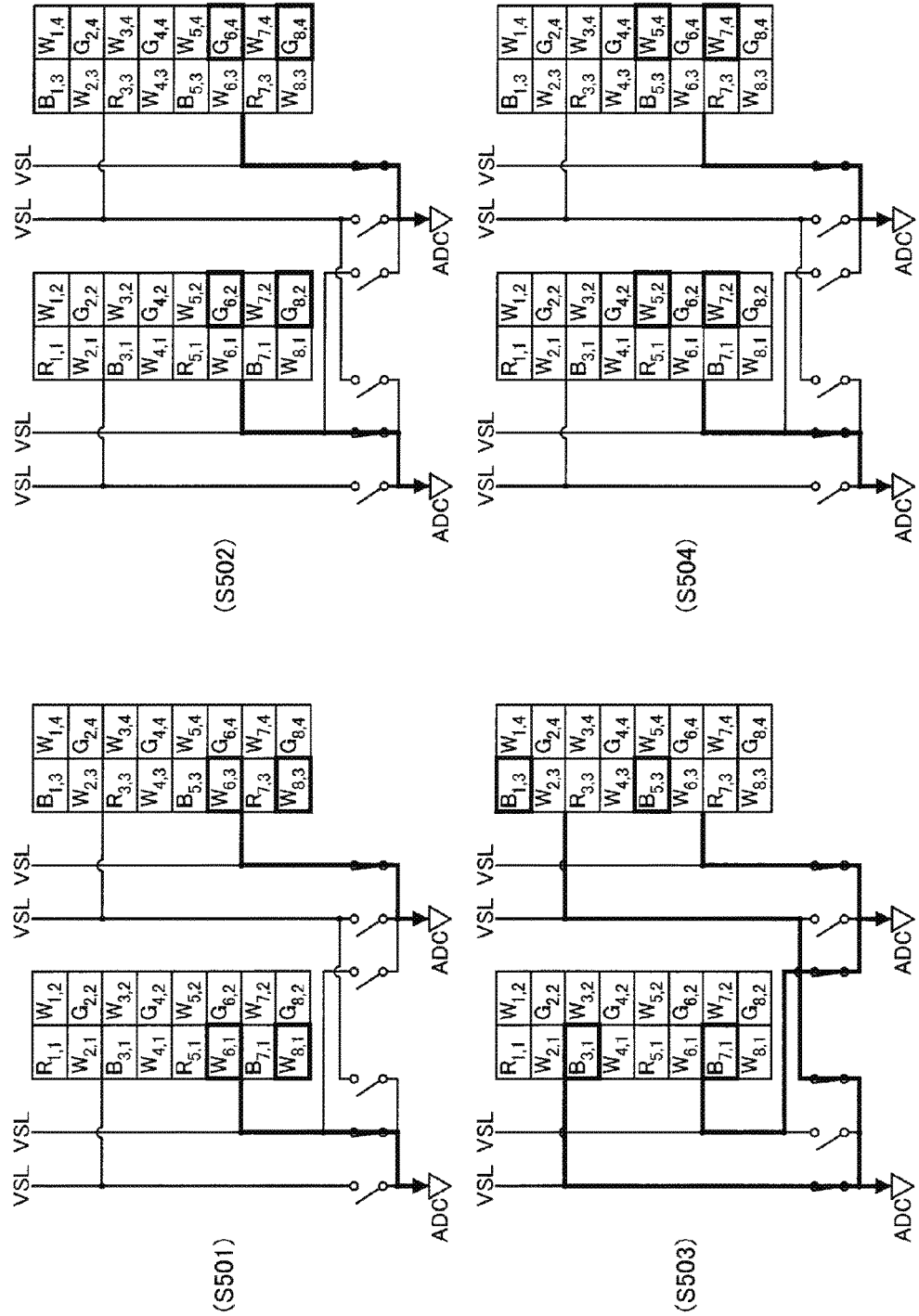
FIG. 27 is an explanatory diagram illustrating a specific example of a flow of a reading process in a fifth process performed by a signal processing device according to an embodiment of the present disclosure.

For example, in the reading process in the fifth process performed by the signal processing device 100 according to the embodiment of the present disclosure, the source follower addition is implemented for four VSLs for the pixel region in which 4 pixels are arranged in the row direction, wirings for connecting the four VSLs, and six switches for the four VSLs as illustrated in FIG. 27. In the reading process in the fifth process performed by the signal processing device 100 according to the embodiment of the present disclosure, the signal processing device 100 has the above circuit configuration and thus can perform the source follower addition. Therefore, it is possible to improve the reading speed in the reading process in the fifth process performed by the signal processing device 100 according to the embodiment of the present disclosure.

Unlike the first process performed by the signal processing device 100 according to the embodiment of the present disclosure, in the fifth process performed by the signal processing device 100 according to the embodiment of the present disclosure, the pixel signal reading unit 30 adds and reads the pixel signals obtained from a plurality of third pixels C3 arranged in different columns, and adds and reads the pixel signals obtained from a plurality of fourth pixels C4 arranged in different columns. For example, the pixel signal reading unit 30 adds and reads the pixel signals obtained from the R pixels in a (4n+1)-th column (n is an integer) and the R pixels in a (4n+3)-th column (n is an integer), and adds and reads the pixel signals obtained from the B pixels in the (4n+1)-th column (n is an integer) and the B pixels in the (4n+3)-th column (n is an integer).

Figure 28:
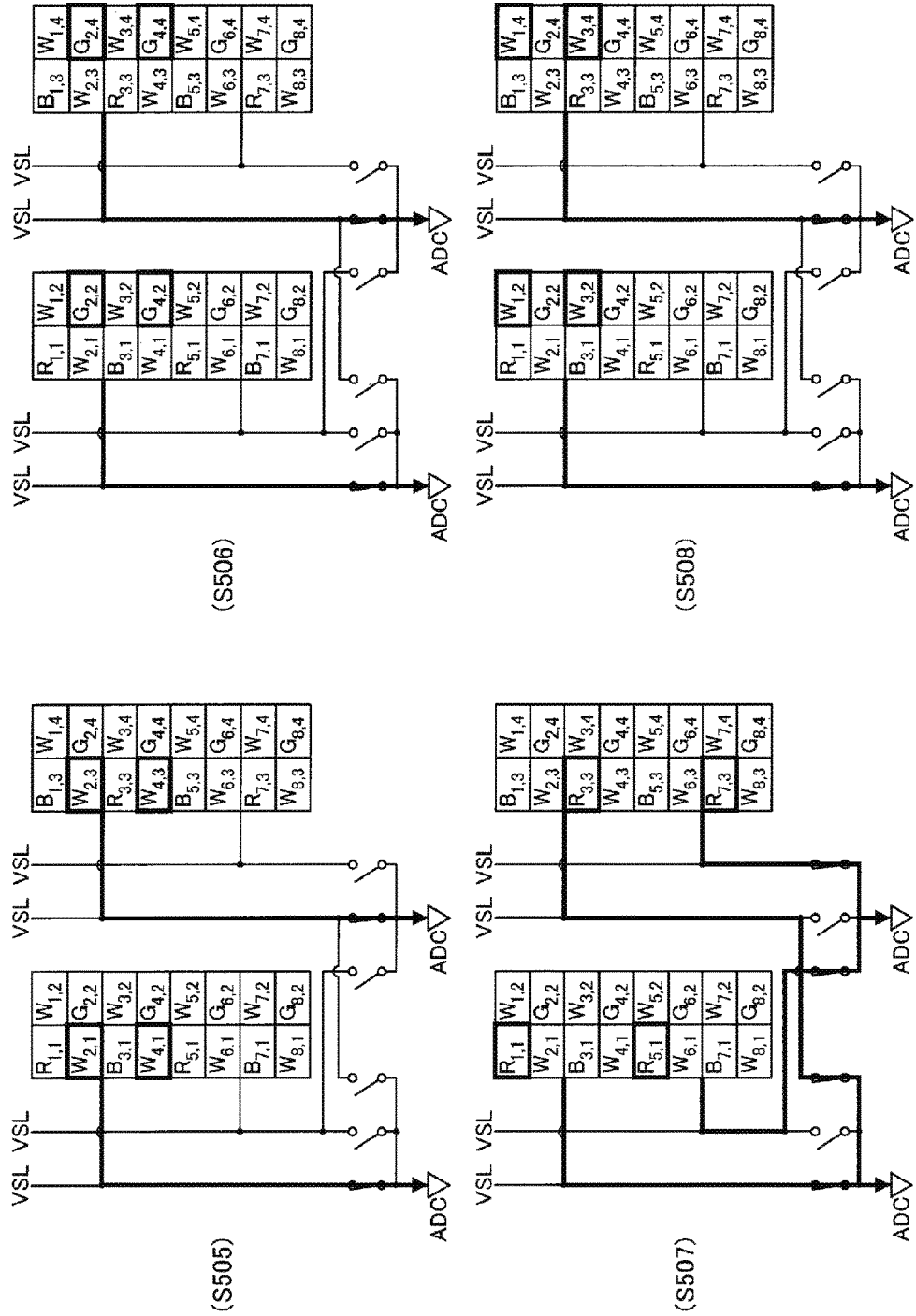
FIG. 28 is an explanatory diagram illustrating a specific example of a reading process flow in a fifth process performed by a signal processing device according to an embodiment of the present disclosure.

FIGS. 27 and 28 are explanatory diagrams illustrating a specific example of a flow of a reading process in the fifth process performed by the signal processing device 100 according to the embodiment of the present disclosure.

In the fifth process performed by the signal processing device 100 according to the embodiment of the present disclosure, first, the pixel signal reading unit 30 performs adding and reading of the pixel signals obtained from $W_{6,1}$ and $W_{8,1}$, and performs adding and reading of the pixel signals obtained from $W_{6,3}$ and $W_{8,3}$ (S501). Then, the pixel signal reading unit 30 performs adding and reading of the pixel signals obtained from $G_{6,2}$ and $G_{8,2}$, and performs adding and reading of the pixel signals obtained from $G_{6,4}$ and $G_{8,4}$ (S502). Then, the pixel signal reading unit 30 performs adding and reading of the pixel signals obtained from $B_{3,1}$ and $B_{1,3}$, and performs adding and reading of the pixel signals obtained from $B_{7,1}$ and $B_{5,3}$ (S503). Then, the pixel signal reading unit 30 performs adding and reading of the pixel signals obtained from $W_{5,2}$ and $W_{7,2}$, and performs adding and reading of the pixel signals obtained from $W_{5,4}$ and $W_{7,4}$ (S504). Then, the pixel signal reading unit 30 performs adding and reading of the pixel signals obtained from $W_{2,1}$ and $W_{4,1}$, and performs adding and reading of the pixel signals obtained from $W_{2,3}$ and $W_{4,3}$ (S505). Then, the pixel signal reading unit 30 performs adding and reading of the pixel signals obtained from $G_{2,2}$ and $G_{4,2}$, and performs adding and reading of the pixel signals obtained from $G_{2,4}$ and $G_{4,4}$ (S506). Then, the pixel signal reading unit 30 performs adding and reading of the pixel signals obtained from $R_{1,1}$ and $R_{3,3}$, and performs adding and reading of the pixel signals obtained from $R_{5,1}$ and $R_{7,3}$ (S507). Then, the pixel signal reading unit 30 performs adding and reading of the pixel signals obtained from $W_{1,2}$ and $W_{3,2}$ and performs adding and reading of the pixel signals obtained from $W_{1,4}$ and $W_{3,4}$ (S508).

FIG. 29 is an explanatory diagram illustrating a specific example of an array of pixel signals read in the fifth process performed by the signal processing device 100 according to the embodiment of the present disclosure. A pixel signal including $R_{8m+1,4n+1}$ (m and n are integers) or $B_{8m+3,4n+1}$ (m and n are integers) is arranged in a (4n+1)-th column in the array of pixel signals, and a pixel signal including $R_{8m+5,4n+1}$ (m and n are integers) or $B_{8m+7,4n+1}$ (m and n are integers) is arranged in a (4n+3)-th column in the array of pixel signals. For example, as illustrated in FIG. 29, the pixel signal obtained by adding the pixel signals obtained from $R_{1,1}$ and $R_{3,3}$ and the pixel signal obtained by adding the pixel signals obtained from $B_{1,3}$ and $B_{3,1}$ are arranged in a first column in the array of pixel signals, and the pixel signal obtained by adding the pixel signals obtained from $R_{5,1}$ and $R_{7,3}$ and the pixel signal obtained by adding the pixel signals obtained from $B_{5,3}$ and $B_{7,1}$ are arranged in a third column in the array of pixel signals.

In the reading process of S501 to S508 in the fifth process performed by the signal processing device 100 according to the embodiment of the present disclosure described above, the number of readings for 32 pixels in which 4 pixels are arranged in the row direction and 8 pixels are arranged in the column direction is 8. On the other hand, when the process of adding and reading the pixel signals obtained from a plurality of pixels is not performed, the number of readings for 32 pixels in which 4 pixels are arranged in the row direction and 8 pixels are arranged in the column direction is 16. Therefore, in the reading process of S501 to S508 in the fifth process performed by the signal processing device 100 according to the embodiment of the present disclosure, similarly to the third process performed by the signal processing device 100 according to the embodiment of the present disclosure, it is possible to increase the speed of the reading process to be faster than the first process performed by the signal processing device 100 according to the embodiment of the present disclosure. Therefore, according to the reading process of S501 to S508 in the first process performed by the signal processing device 100 according to the embodiment of the present disclosure, in the signal processing device 100 in which rows of pixels having different pixel arrays are arranged at intervals of one line, it is possible to improve the reading efficiency of the pixel signals.

Furthermore, in the reading process of S501 to S508 in the fifth process performed by the signal processing device 100 according to the embodiment of the present disclosure, since adding and reading are performed for a plurality of R pixels arranged in different columns and a plurality of B pixels arranged in different columns, it is possible to improve the S/N ratio to be better than in the third process or the fourth process performed by the signal processing device 100 according to the embodiment of the present disclosure.

In addition, in the reading process of S501 to S508 in the fifth process performed by the signal processing device 100 according to the embodiment of the present disclosure, since the pixel signal obtained from the W pixels having a larger sensitivity region than that of the R element, the G element, and the B element in the visible light region is read, it is possible to improve the S/N ratio, similarly to the first process performed by the signal processing device 100 according to the embodiment of the present disclosure.

(6-2. Correction Process)

A correction process in the fifth process performed by the signal processing device 100 according to the embodiment of the present disclosure will be described below in detail with reference to FIG. 30.

Unlike the first process performed by the signal processing device 100 according to the embodiment of the present disclosure, in the fifth process performed by the signal processing device 100 according to the embodiment of the present disclosure, the correcting unit 70 corrects the pixel signals so that the array of pixel signals read by the pixel signal reading unit 30 becomes the same as the pixel array in the pixel array unit 10 by replacing the pixel signals obtained from a plurality of pixels having different spectral sensitivity characteristics.

Specifically, the correcting unit 70 replaces the pixel signals obtained from the R pixels and the B pixels. The replacement of the R pixels and the B pixels will be sequentially described below in detail.

FIG. 30 is an explanatory diagram illustrating a specific example of arrays of pixel signals before and after the correction process in the fifth process performed by the signal processing device 100 according to the embodiment of the present disclosure. The array of pixel signals before the replacement in FIG. 30 is an array of pixel signals obtained by sequentially performing the reading process of S501 to S508 at intervals of eight rows for a pixel region including 64 pixels in which 4 pixels are arranged in the row direction, and 16 pixels are arranged in the column direction.

For example, the correcting unit 70 replaces the pixel signals obtained from the R pixels and the B pixels arranged at intervals of two rows in the same column. Specifically, the correcting unit 70 replaces the pixel signal obtained by adding the pixel signals obtained from $R_{5,1}$ and $R_{7,3}$ with the pixel signal obtained by adding the pixel signals obtained from $B_{5,3}$ and $B_{7,1}$. Similarly, the correcting unit 70 replaces the pixel signal obtained by adding the pixel signals obtained from $R_{13,1}$ and $R_{15,3}$ with the pixel signal obtained by adding the pixel signals obtained from $B_{13,3}$ and $B_{15,1}$. Therefore, as illustrated in FIG. 30, in an array of pixel signals after the replacement by the correcting unit 70, an array of pixel signals in a first column includes R, W, B, W, R, W, B, W, . . . , an array of pixel signals in a second column includes W, G, W, G, W, G, W, G, . . . , an array of pixel signals in a third column includes B, W, R, W, B, W, R, W, . . . , and an array of pixel signals in a fourth column includes W, G, W, G, W, G, W, G, . . . . Therefore, an array of pixel signals after the replacement by the correcting unit 70 becomes the same as the pixel array in the pixel array unit 10 illustrated in FIG. 7. As described above, the correcting unit 70 corrects the pixel signals so that an array of pixel signals before the replacement becomes the same as the pixel array in the pixel array unit 10 illustrated in FIG. 7 through the replacement.

In the correction process in the fifth process performed by the signal processing device 100 according to the embodiment of the present disclosure described above, since the array of pixel signals read by the pixel signal reading unit 30 becomes the same as the pixel array in the pixel array unit 10, it is possible to simplify a signal processing circuit at a subsequent stage.

In the correction process in the fifth process performed by the signal processing device 100 according to the embodiment of the present disclosure, the process performed by the correcting unit 70 is simpler than that in the correction process in the sixth process performed by the signal processing device 100 according to the embodiment of the present disclosure, and thus it is possible to reduce the circuit size and the power consumption.

7. Sixth Process Performed by Signal Processing Device

Next, a sixth process performed by the signal processing device 100 according to the embodiment of the present disclosure will be described with reference to FIGS. 31 to 36. The sixth process performed by the signal processing device 100 according to the embodiment of the present disclosure differs from the fifth process performed by the signal processing device 100 according to the embodiment of the present disclosure in the correction process performed by the correcting unit 70. Thus, description of the reading process in the sixth process performed by the signal processing device 100 according to the embodiment of the present disclosure is omitted.

The reading process in the sixth process performed by the signal processing device 100 according to the embodiment of the present disclosure differs from the first process performed by the signal processing device 100 according to the embodiment of the present disclosure in the weighted-averaging process. Specifically, when compared with the first process performed by the signal processing device 100 according to the embodiment of the present disclosure, in the reading process in the sixth process performed by the signal processing device 100 according to the embodiment of the present disclosure, the correcting unit 70 further performs the weighted-averaging so that center-of-gravity positions of the pixel signals read by the pixel signal reading unit are arranged at equal intervals in a straight line form in each of the row direction and the column direction, similarly to the second process performed by the signal processing device 100 according to the embodiment of the present disclosure.

Specifically, the correcting unit 70 performs the weighted-averaging on each of the R pixels, the B pixels, the G pixels, and the W pixels. The weighted-averaging for the R pixels, the B pixels, the G pixels, and the W pixels will be sequentially described below in detail.

FIG. 31 is an explanatory diagram illustrating a specific example of center-of-gravity positions of the pixel signals obtained from the R pixels before and after the correction process in the sixth process performed by the signal processing device 100 according to the embodiment of the present disclosure.

For example, the correcting unit 70 integrates the pixel data by weighted-averaging the pixel signals obtained from the R pixels having the center-of-gravity position at positions corresponding to four apexes of the pixel region including 25 pixels in which 5 pixels are arranged in each of the row direction and the column direction at a ratio of 1:3:7:21. Specifically, the correcting unit 70 integrates the pixel data by weighted-averaging the pixel signal obtained by adding the pixel signals obtained from $R_{8m+1,4n+5}$ (m and n are integers) and $R_{8m+3,4n+7}$ (m and n are integers), the pixel signal obtained by adding the pixel signals obtained from $R_{8m+1,4n+1}$ (m and n are integers) and $R_{8m+3,4n+3}$ (m and n are integers), the pixel signal obtained by adding the pixel signals obtained from $R_{8m+5,4n+5}$ (m and n are integers) and $R_{8m+7,4n+7}$ and n are integers), and the pixel signal obtained by adding the pixel signals obtained from $R_{8m+5,4n+1}$ (m and n are integers) and $R_{8m+7,4n+3}$ (m and n are integers) at a ratio of 1:3:7:21. More specifically, the correcting unit 70 integrates the pixel data by weighted-averaging the pixel signal obtained by adding the pixel signals obtained from $R_{1,5}$ and $R_{3,7}$, the pixel signal obtained by adding the pixel signals obtained from $R_{1,1}$ and $R_{3,3}$, the pixel signal obtained by adding the pixel signals obtained from $R_{5,5}$ and $R_{7,7}$, and the pixel signal obtained by adding the pixel signals obtained from $R_{5,1}$ and $R_{7,3}$ at a ratio of 1:3:7:21, and obtains a pixel signal $R_{C3}$. Similarly, in FIG. 31, a pixel signal $R_{C6}$ is obtained by the integration process performed by the correcting unit 70.

Specifically, the correcting unit 70 integrates the pixel data by weighted-averaging the pixel signal obtained by adding the pixel signals obtained from $R_{8m+5,4n+1}$ (m and n are integers) and $R_{8m+7,4n+3}$ (m and n are integers), the pixel signal obtained by adding the pixel signals obtained from $R_{8m+5,4n+5}$ (m and n are integers) and $R_{8m+7,4n+7}$ (m and n are integers), the pixel signal obtained by adding the pixel signals obtained from $R_{8m+9,4n+1}$ (m and n are integers) and $R_{8m+11,4n+3}$ (m and n are integers), and the pixel signal obtained by adding the pixel signals obtained from $R_{8m+9,4n+5}$ (m and n are integers) and $R_{8m+11,4n+7}$ (m and n are integers) at a ratio of 1:3:7:21. More specifically, the correcting unit 70 integrates the pixel signals by weighted-averaging the pixel signal obtained by adding the pixel signals obtained from $R_{5,1}$ and $R_{7,3}$, the pixel signal obtained by adding the pixel signals obtained from $R_{5,5}$ and $R_{7,7}$, the pixel signal obtained by adding the pixel signals obtained from $R_{9,1}$ and $R_{11,3}$, and the pixel signal obtained by adding the pixel signals obtained from $R_{9,5}$ and $R_{11,7}$ at a ratio of 1:3:7:21, and obtains a pixel signal $R_{C5}$. Similarly, pixel signals $R_{C1}$, $R_{C2}$, and $R_{C4}$ are obtained by the integration process performed by the correcting unit 70. In the sixth process performed by the signal processing device 100 according to the embodiment of the present disclosure, since one pixel signal obtained from the R pixel is used for four integrations, the number of pixel signals obtained from the R pixel is not changed by the integration.

Figure 32:
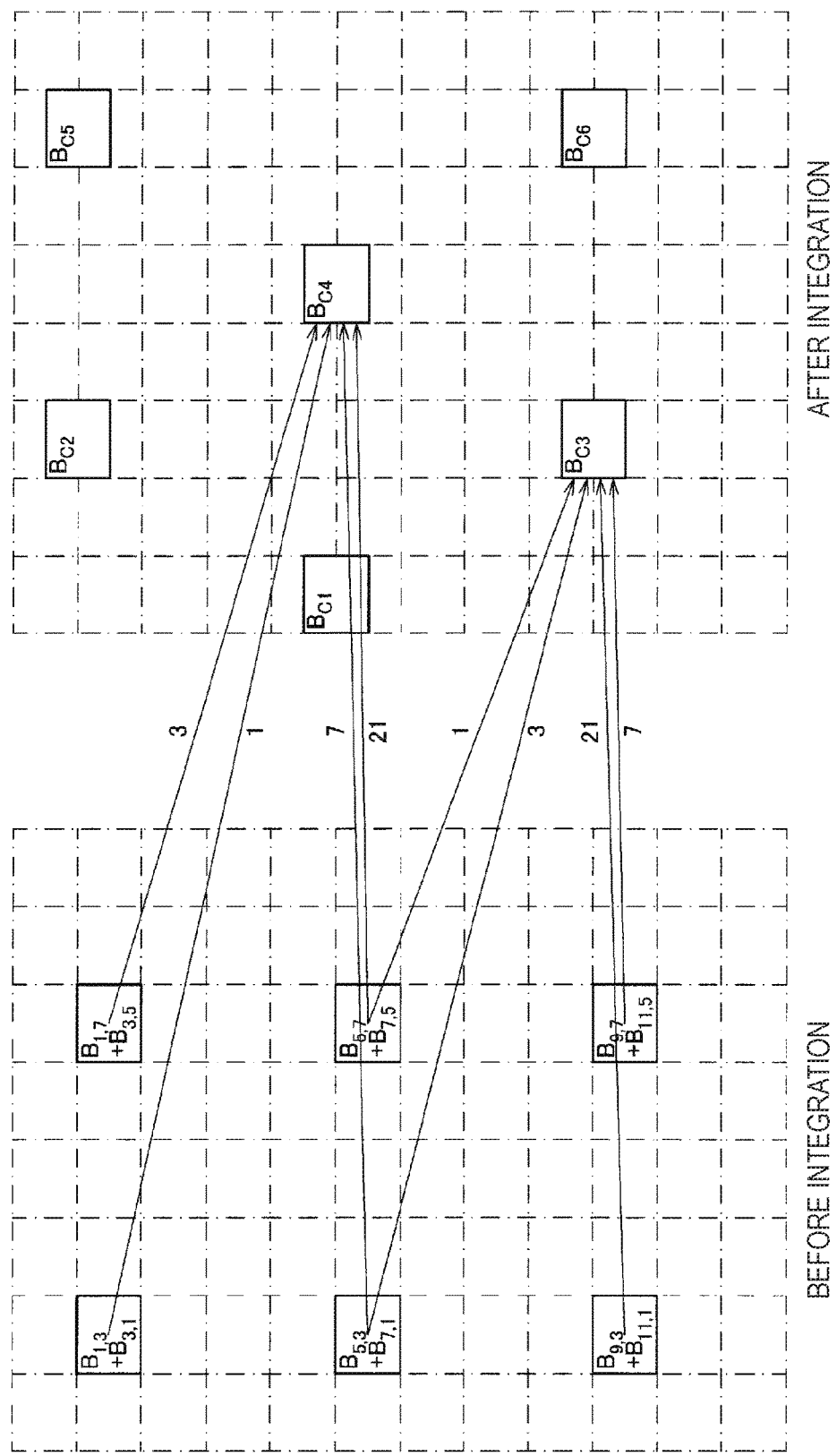
FIG. 32 is an explanatory diagram illustrating a specific example of center-of-gravity positions of pixel signals obtained from B pixels before and after a correction process in a sixth process performed by a signal processing device according to an embodiment of the present disclosure.

FIG. 32 is an explanatory diagram illustrating a specific example of center-of-gravity positions of the pixel signals obtained from the B pixels before and after the correction process in the sixth process performed by the signal processing device 100 according to the embodiment of the present disclosure.

For example, the correcting unit 70 integrates the pixel data by weighted-averaging the pixel signals obtained from the B pixels having the center-of-gravity position at positions corresponding to four apexes of the pixel region including 25 pixels in which 5 pixels are arranged in each of the row direction and the column direction at a ratio of 1:3:7:21. Specifically, the correcting unit 70 integrates the pixel data by weighted-averaging the pixel signal obtained by adding the pixel signals obtained from $B_{8m+1,4n+3}$ (m and n are integers) and $B_{8m+3,4n+1}$ (m and n are integers), the pixel signal obtained by adding the pixel signals obtained from $B_{8m+1,4n+7}$ (m and n are integers) and $B_{8m+3,4n+5}$ (m and n are integers), the pixel signal obtained by adding the pixel signals obtained from $B_{8m+5,4n+3}$ (m and n are integers) and $B_{8m+7,4n+1}$ (m and n are integers), and the pixel signal obtained by adding the pixel signals obtained from $B_{8m+5,4n+7}$ (m and n are integers) and $B_{8m+7,4n+5}$ (m and n are integers) at a ratio of 1:3:7:21. More specifically, the correcting unit 70 integrates the pixel data by weighted-averaging the pixel signal obtained by adding the pixel signals obtained from $B_{1,3}$ and $B_{3,1}$, the pixel signal obtained by adding the pixel signals obtained from $B_{1,7}$ and $B_{3,5}$, the pixel signal obtained by adding the pixel signals obtained from $B_{5,3}$ and $B_{7,1}$, and the pixel signal obtained by adding the pixel signals obtained from $B_{5,7}$ and $B_{7,5}$ at a ratio of 1:3:7:21, and obtains a pixel signal $B_{C4}$. Similarly, a pixel signal $B_{C1}$ is obtained by the integration process performed by the correcting unit 70.

Specifically, the correcting unit 70 integrates the pixel data by weighted-averaging the pixel signal obtained by adding the pixel signals obtained from $B_{8m+5,4n+7}$ (m and n are integers) and $B_{8m+7,4n+5}$ (m and n are integers), the pixel signal obtained by adding the pixel signals obtained from $B_{8m+5,4n+3}$ (m and n are integers) and $B_{8m+7,4n+1}$ (m and n are integers), the pixel signal obtained by adding the pixel signals obtained from $B_{8m+9,4n+7}$ (m and n are integers) and $B_{8m+11,4n+5}$ (m and n are integers), and the pixel signal obtained by adding the pixel signals obtained from $B_{8m+9,4n+3}$ (m and n are integers) and $B_{8m+11,4n+1}$ (m and n are integers) at a ratio of 1:3:7:21. More specifically, the correcting unit 70 integrates the pixel signals by weighted-averaging the pixel signal obtained by adding the pixel signals obtained from $B_{5,7}$ and $B_{7,5}$, the pixel signal obtained by adding the pixel signals obtained from $B_{5,3}$ and $B_{7,1}$, the pixel signal obtained by adding the pixel signals obtained from $B_{9,7}$ and $B_{11,5}$, and the pixel signal obtained by adding the pixel signals obtained from $B_{9,3}$ and $B_{11,1}$ at a ratio of 1:3:7:21, and obtains a pixel signal $R_{C3}$. Similarly, pixel signals $B_{C2}$, $B_{C5}$, and $B_{C6}$ are obtained by the integration process performed by the correcting unit 70. In the sixth process performed by the signal processing device 100 according to the embodiment of the present disclosure, since one pixel signal obtained from the B pixel is used for four integrations, the number of pixel signals obtained from the B pixel is not changed by the integration.

Figure 33:
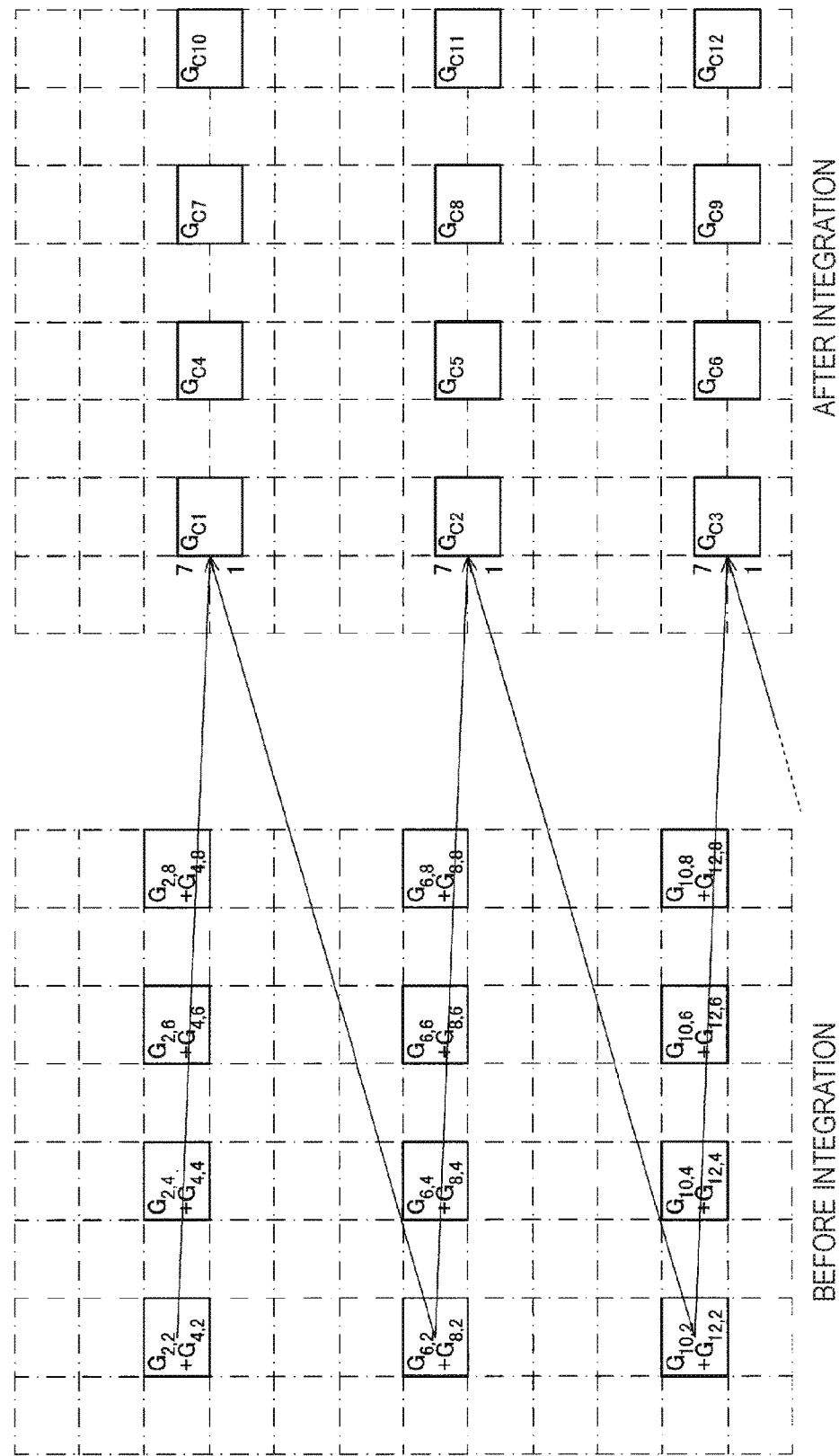
FIG. 33 is an explanatory diagram illustrating a specific example of center-of-gravity positions of pixel signals obtained from G pixels before and after a correction process in a sixth process performed by a signal processing device according to an embodiment of the present disclosure.

FIG. 33 is an explanatory diagram illustrating a specific example of the center-of-gravity positions of the pixel signals obtained from the G pixels before and after the correction process in the sixth process performed by the signal processing device 100 according to the embodiment of the present disclosure.

For example, the correcting unit 70 integrates the pixel data by weighted-averaging two pixel signals which are obtained from the G pixels and have the center-of-gravity position in a 2n-th column (n is an integer) at a ratio of 7:1. Specifically, the correcting unit 70 integrates the pixel data by weighted-averaging the pixel signal obtained by adding the pixel signals obtained from $G_{4m+2,2n}$ (m and n are integers) and $G_{4m+4,2n}$ (m and n are integers) and the pixel signal obtained by adding the pixel signals obtained from $G_{4m+6,2n}$ (m and n are integers) and $G_{4m+8,2n}$ (m and n are integers) at a ratio of 7:1. More specifically, the correcting unit 70 integrates the pixel data by weighted-averaging the pixel signal obtained by adding the pixel signals obtained from $G_{2,2}$ and $G_{4,2}$ and the pixel signal obtained by adding the pixel signals obtained from $G_{6,2}$ and $G_{8,2}$ at a ratio of 7:1, and obtains the pixel signal $G_{C1}$. Similarly, the pixel signals $G_{C2}$, $G_{C3}$, $G_{C4}$, $G_{C5}$, $G_{C6}$, $G_{C7}$, $G_{C8}$, $G_{C9}$, $G_{C10}$, $G_{C11}$, and $G_{C12}$ are obtained by the integration process performed by the correcting unit 70. In the sixth process performed by the signal processing device 100 according to the embodiment of the present disclosure, since one pixel signal obtained from the G pixels is used for two integrations, the number of pixel signals obtained from the G pixels is not changed by the integration.

Figure 34:
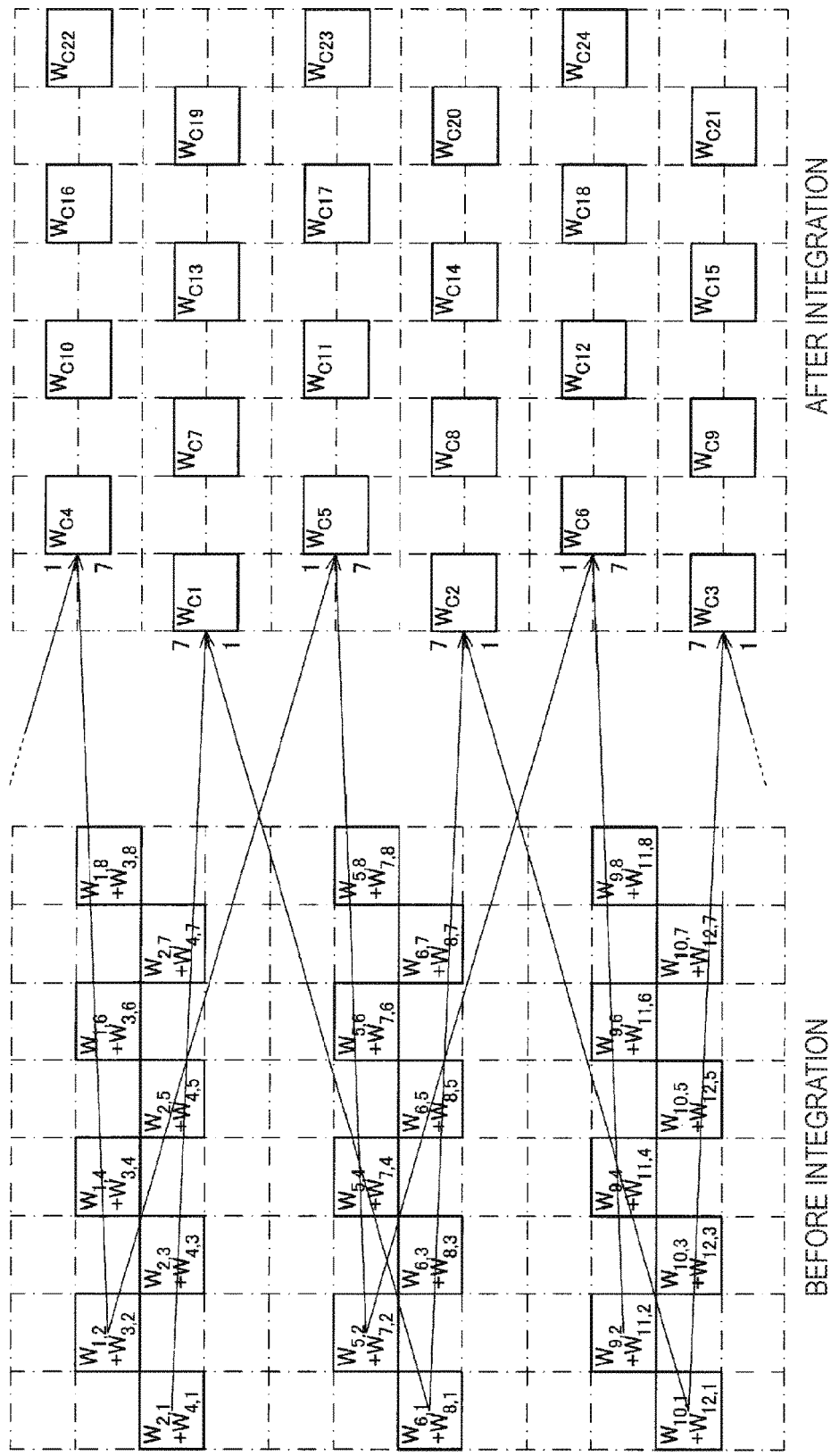
FIG. 34 is an explanatory diagram illustrating a specific example of center-of-gravity positions of pixel signals obtained from W pixels before and after a correction process in a sixth process performed by a signal processing device according to an embodiment of the present disclosure.

FIG. 34 is an explanatory diagram illustrating a specific example of the center-of-gravity positions of the pixel signals obtained from the W pixels before and after the correction process in the sixth process performed by the signal processing device 100 according to the embodiment of the present disclosure.

For example, the correcting unit 70 integrates the pixel data by weighted-averaging two pixel signals which are obtained from the W pixels and have the center-of-gravity position in a (2n+1)-th column (n is an integer) at a ratio of 7:1. Specifically, the correcting unit 70 integrates the pixel data by weighted-averaging the pixel signal obtained by adding the pixel signals obtained from $W_{4m+2,2n+1}$ (m and n are integers) and $W_{4m+4,2n+1}$ (m and n are integers) and the pixel signal obtained by adding the pixel signals obtained from $W_{4m+6,2n+1}$ (m and n are integers) and $W_{4m+8,2n+1}$ (m and n are integers) at a ratio of 7:1. More specifically, the correcting unit 70 integrates the pixel data by weighted-averaging the pixel signal obtained by adding the pixel signals obtained from $W_{2,1}$ and $W_{4,1}$ and the pixel signal obtained by adding the pixel signals obtained from $W_{6,1}$ and $W_{8,1}$ at a ratio of 7:1, and obtains the pixel signal $W_{C1}$. Similarly, the pixel signals $W_{C2}$, $W_{C3}$, $W_{C7}$, $W_{C8}$, $W_{C9}$, $W_{C13}$, $W_{C14}$, $W_{C15}$, $W_{C19}$, $W_{C20}$, and $W_{C21}$ are obtained by the integration process performed by the correcting unit 70.

For example, the correcting unit 70 integrates the pixel data by weighted-averaging two pixel signals which are obtained from the W pixels and have the center-of-gravity position in a 2n-th column (n is an integer) at a ratio of 1:7. Specifically, the correcting unit 70 integrates the pixel data by weighted-averaging the pixel signal obtained by adding the pixel signals obtained from $W_{4m+1,2n}$ (m and n are integers) and $W_{4m+3,2n}$ (m and n are integers) and the pixel signal obtained by adding the pixel signals obtained from $W_{4m+5,2n}$ (m and n are integers) and $W_{4m+7,2n}$ (m and n are integers) at a ratio of 1:7. More specifically, the correcting unit 70 integrates the pixel data by weighted-averaging the pixel signal obtained by adding the pixel signals obtained from $W_{1,2}$ and $W_{3,2}$ and the pixel signal obtained by adding the pixel signals obtained from $W_{5,2}$ and $W_{7,2}$ at a ratio of 1:7, and obtains the pixel signal $W_{C5}$. Similarly, the pixel signals $W_{C4}$, $W_{C6}$, $W_{C10}$, $W_{C11}$, $W_{C12}$, $W_{C16}$, $W_{C17}$, $W_{C18}$, $W_{C22}$, $W_{C23}$, and $W_{C24}$ are obtained by the integration process performed by the correcting unit 70. In the sixth process performed by the signal processing device 100 according to the embodiment of the present disclosure, since one pixel signal obtained from the W pixels is used for two integrations, the number of pixel signals obtained from the W pixels is not changed by the integration.

FIG. 35 is an explanatory diagram illustrating a specific example of the center-of-gravity positions of the pixel signals after the correction process in the sixth process performed by the signal processing device 100 according to the embodiment of the present disclosure. Specifically, in FIG. 35, the center-of-gravity position of the pixel signal obtained from the R pixels after the integration in FIG. 31, the center-of-gravity position of the pixel signal obtained from the B pixels after the integration in FIG. 32, the center-of-gravity position of the pixel signal obtained from the G pixels after the integration in FIG. 33, and the center-of-gravity position of the pixel signal obtained from the W pixels after the integration in FIG. 34 are illustrated as overlapping.

As illustrated in FIG. 35, the center-of-gravity positions of the pixel signals after the integration by the correcting unit 70 are arranged at equal intervals in a straight line form in each of the row direction and the column direction.

As described above, the correcting unit 70 performs the weighted averaging so that the center-of-gravity positions of the pixel signals read by the pixel signal reading unit 30 are arranged at equal intervals in the straight line form in each of the row direction and the column direction. Hence, in the correction process in the sixth process performed by the signal processing device 100 according to the embodiment of the present disclosure, the center-of-gravity positions of the pixel signals read by the pixel signal reading unit 30 are arranged at equal intervals in the straight line form in each of the row direction and the column direction, and thus it is possible to prevent the occurrence of image distortion, false color, and jaggies due to deviation of the center of gravity. Therefore, in the correction process in the sixth process performed by the signal processing device 100 according to the embodiment of the present disclosure, it is possible to improve the image quality.

Further, similarly to the first process performed by the signal processing device 100 according to the embodiment of the present disclosure, in the sixth process performed by the signal processing device 100 according to the embodiment of the present disclosure, the correcting unit 70 corrects the pixel signals so that the array of pixel signals before the integration becomes the same as the pixel array in the pixel array unit 10 illustrated in FIG. 7 through the integration.

Figure 36:
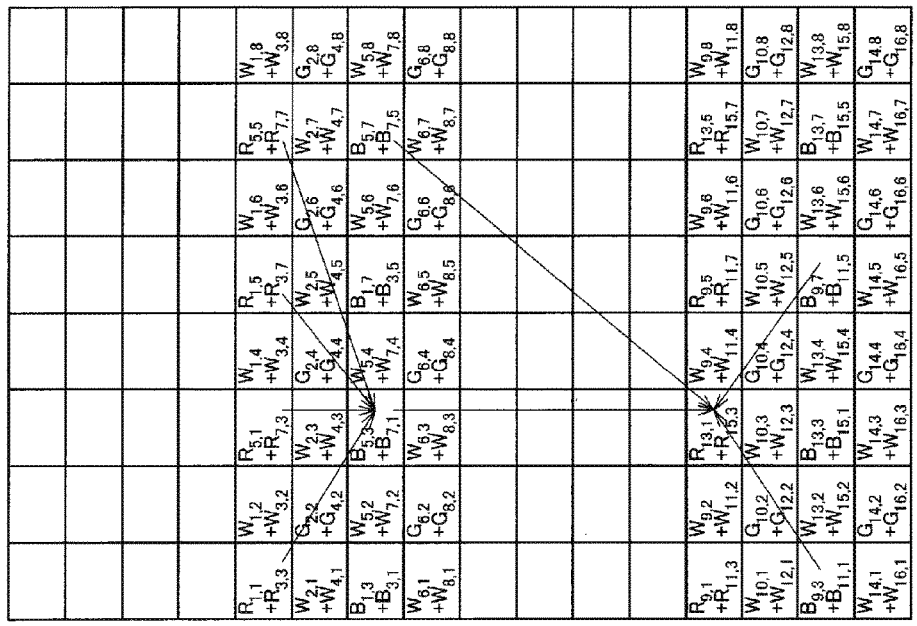
FIG. 36 is an explanatory diagram illustrating a specific example of arrays of pixel signals before and after a correction process in a sixth process performed by a signal processing device according to an embodiment of the present disclosure.

FIG. 36 is an explanatory diagram illustrating a specific example of arrays of pixel signals before and after the correction process in the sixth process performed by the signal processing device 100 according to the embodiment of the present disclosure.

In the correction process in the sixth process performed by the signal processing device 100 according to the embodiment of the present disclosure, for example, as illustrated in FIG. 36, the pixel signal $R_{C3}$ after the integration is arranged at the position at which the pixel signals obtained from $B_{5,3}$ and $B_{7,1}$ are arranged before the integration. Further, as illustrated in FIG. 36, the pixel signal $B_{C3}$ after the integration is arranged at the position at which the pixel signals obtained from $R_{13,1}$ and $R_{15,3}$ are arranged before the integration. Therefore, as illustrated in FIG. 36, in the array of pixel signals after the integration by the correcting unit 70, an array of pixel signals in a first column includes R, W, B, W, R, W, B, W, . . . , an array of pixel signals in a second column includes W, G, W, G, W, G, W, G, . . . , an array of pixel signals in a third column includes B, W, R, W, B, W, R, W, . . . , and an array of pixel signals in a fourth column includes W, G, W, G, W, G, W, G, . . . . Therefore, the array of pixel signals after the integration by the correcting unit 70 becomes the same as the pixel array in the pixel array unit 10 illustrated in FIG. 7. As described above, the correcting unit 70 corrects the pixel signals so that an array of pixel signals before the integration becomes the same as the pixel array in the pixel array unit 10 illustrated in FIG. 7 through the integration.

In the correction process in the sixth process performed by the signal processing device 100 according to the embodiment of the present disclosure described above, since the array of pixel signals read by the pixel signal reading unit 30 becomes the same as the pixel array in the pixel array unit 10, it is possible to simplify a signal processing circuit at a subsequent stage.

Further, in the sixth process performed by the signal processing device 100 according to the embodiment of the present disclosure, the signal processing device 100 may perform a low-pass filter process in the row direction on the pixel signals obtained from the G pixels. For example, the signal processing device 100 may perform the low-pass filter process in the row direction including (1,4,6,4,1) on each of the pixel signals obtained from the G pixels read by the pixel signal reading unit 30. In the sixth process performed by the signal processing device 100 according to the embodiment of the present disclosure, the low-pass filter process in the row direction is performed on the pixel signals obtained from the G pixels, and thus for the G pixels, a plurality of pixel signals obtained from pixels arranged in different columns in the pixel array units are mixed. In the sixth process performed by the signal processing device 100 according to the embodiment of the present disclosure, for the R pixels and the B pixels, pixel signals obtained from a plurality of pixels arranged in different columns in the pixel array units are mixed. Therefore, in the sixth process performed by the signal processing device 100 according to the embodiment of the present disclosure, the low-pass filter process in the row direction is performed on the pixel signals obtained from the G pixels, and addition directions of the pixel signals obtained from the G pixels, the R pixels, and the B pixels are identical to one another. Therefore, in the sixth process performed by the signal processing device 100 according to the embodiment of the present disclosure, it is possible to improve the image quality.

8. Seventh Process Performed by Signal Processing Device

Next, a seventh process performed by the signal processing device 100 according to the embodiment of the present disclosure will be described. The seventh process performed by the signal processing device 100 according to the embodiment of the present disclosure differs from the fifth process performed by the signal processing device 100 according to the embodiment of the present disclosure in the reading process performed by the pixel signal reading unit 30. Thus, description of the correction process in the seventh process performed by the signal processing device 100 according to the embodiment of the present disclosure is omitted. The correction process in the seventh process performed by the signal processing device 100 according to the embodiment of the present disclosure may be similar to the correction process in the sixth process performed by the signal processing device 100 according to the embodiment of the present disclosure.

A flow of a reading process in a seventh process performed by the signal processing device 100 according to the embodiment of the present disclosure will be described below in detail with reference to FIGS. 37 to 39.

Here, in the reading process in the seventh process performed by the signal processing device 100 according to the embodiment of the present disclosure, similarly to the reading process in the fifth process performed by the signal processing device 100 according to the embodiment of the present disclosure, the pixel reading unit 30 can add and read the pixel signals obtained from a pixel region including 8 pixels sharing an FD, and a pixel region sharing an FD different from the FD. On the other hand, in the reading process in the seventh process performed by the signal processing device 100 according to the embodiment of the present disclosure, unlike the reading process in the fifth process performed by the signal processing device 100 according to the embodiment of the present disclosure, the pixel reading unit 30 can further perform source follower addition and read the pixel signals obtained from a pixel region including $R_{1,1}$, $W_{2,1}$, $B_{3,1}$, $W_{4,1}$, $W_{1,2}$, $G_{2,2}$, $W_{3,2}$, and $G_{4,2}$ sharing an FD and a pixel region including $B_{5,3}$, $W_{6,3}$, $R_{7,3}$, $W_{8,3}$, $W_{5,4}$, $G_{6,4}$, $W_{7,4}$, and $G_{8,4}$ sharing an FD different from the FD. Further, the pixel reading unit 30 can perform source follower addition and read the pixel signals obtained from a pixel region including $R_{5,1}$, $W_{6,1}$, $B_{7,1}$, $W_{8,1}$, $W_{5,2}$, $G_{6,2}$, $W_{7,2}$, and $G_{8,2}$ sharing an FD and a pixel region including $B_{9,3}$, $W_{10,3}$, $R_{11,3}$, $W_{12,3}$, $W_{9,4}$, $G_{10,4}$, $W_{11,4}$, and $G_{12,4}$ sharing an FD different from the FD. For example, in the reading process in the seventh process performed by the signal processing device 100 according to the embodiment of the present disclosure, the source follower addition is implemented for four VSLs for the pixel region in which 4 pixels are arranged in the row direction, wirings for connecting the four VSLs, and seven switches for the four VSLs as illustrated in FIG. 37.

In the seventh process performed by the signal processing device 100 according to the embodiment of the present disclosure, similarly to the fifth process performed by the signal processing device 100 according to the embodiment of the present disclosure, the pixel signal reading unit 30 adds and reads the pixel signals obtained from a plurality of third pixels C3 arranged in different columns, and adds and reads the pixel signals obtained from a plurality of fourth pixels C4 arranged in different columns. In addition, in the seventh process performed by the signal processing device 100 according to the embodiment of the present disclosure, unlike the fifth process performed by the signal processing device 100 according to the embodiment of the present disclosure, a direction in which the plurality of third pixels C3 are arranged is parallel to a direction in which the plurality of fourth pixels are arranged. For example, the pixel signal reading unit 30 adds and reads the pixel signals obtained from the B pixels in the (4n+1)-th column (n is an integer) and the B pixels in the (4n+3)-th column (n is an integer), and adds and reads the pixel signals obtained from the R pixels in the (4n+1)-th column (n is an integer) and the R pixels in the (4n+3)-th column (n is an integer) which are arranged in parallel to the direction in which the B pixels in the (4n+1)-th column (n is an integer) and the B pixels in the (4n+3)-th column (n is an integer) are arranged.

Figure 37:
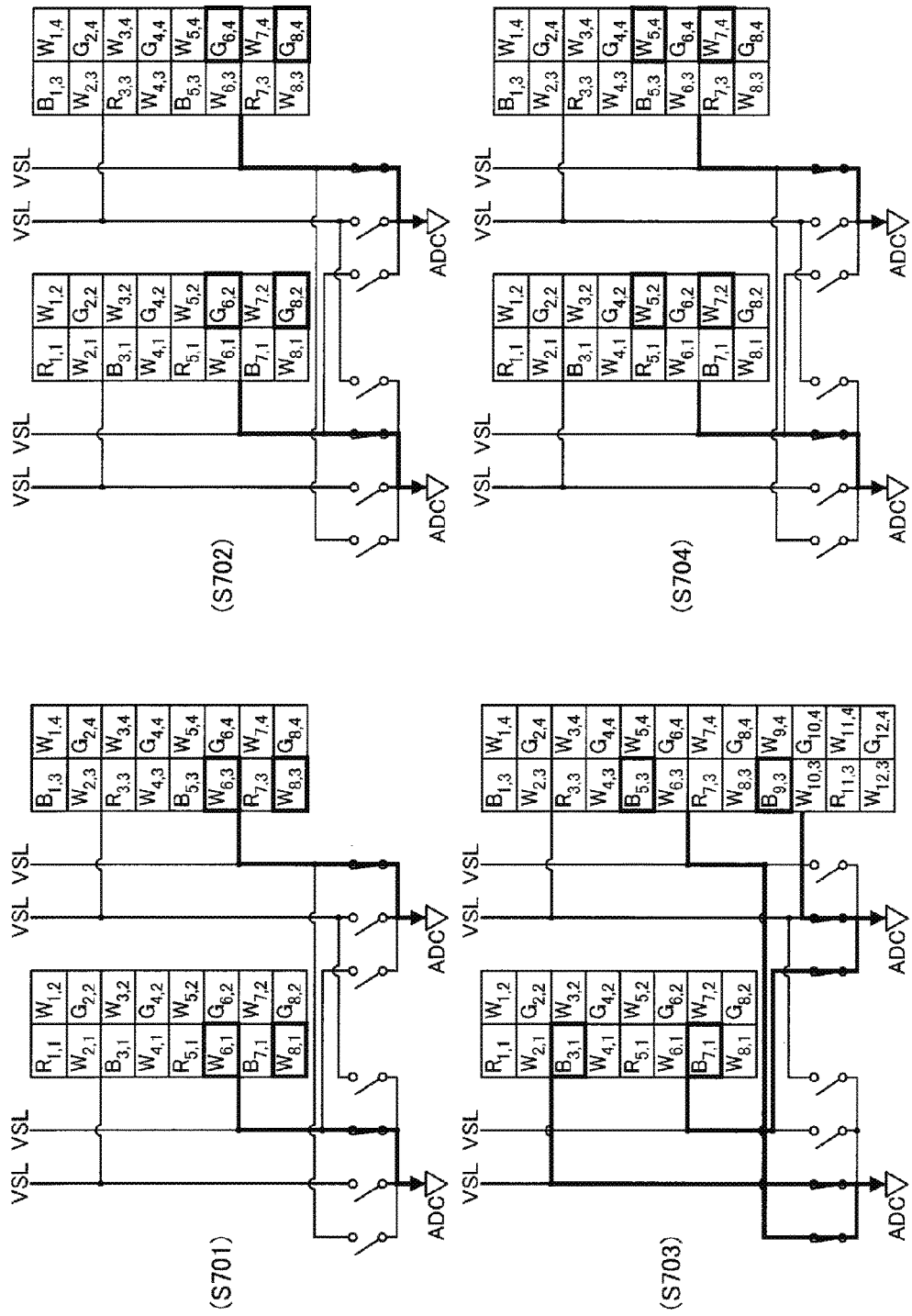
FIG. 37 is an explanatory diagram illustrating a specific example of a flow of a reading process in a seventh process performed by a signal processing device according to an embodiment of the present disclosure.
Figure 38:
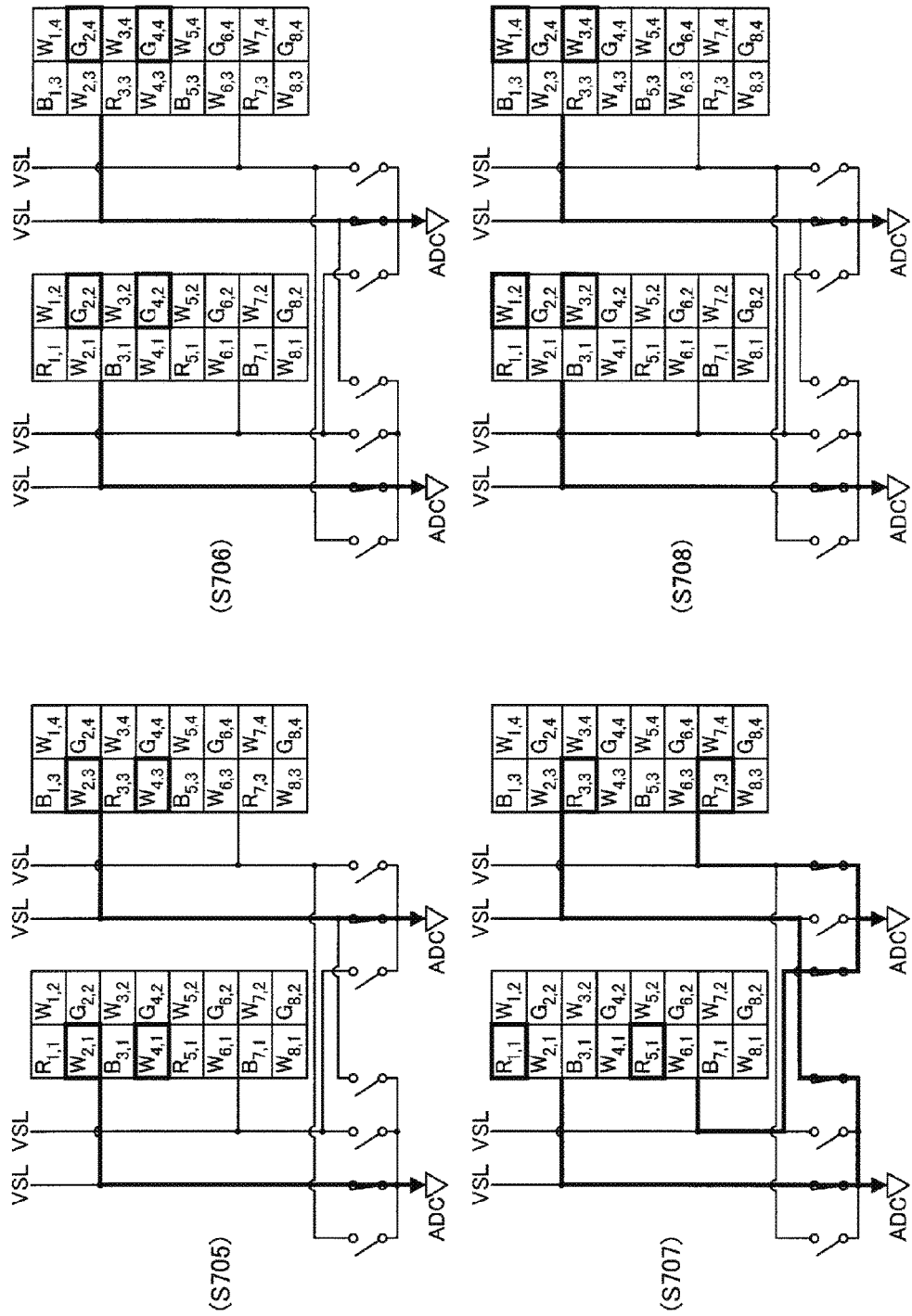
FIG. 38 is an explanatory diagram illustrating a specific example of a flow of a reading process in a seventh process performed by a signal processing device according to an embodiment of the present disclosure.

FIGS. 37 and 38 are explanatory diagrams illustrating a specific example of a flow of a reading process in the seventh process performed by the signal processing device 100 according to the embodiment of the present disclosure.

In the seventh process performed by the signal processing device 100 according to the embodiment of the present disclosure, first, the pixel signal reading unit 30 performs adding and reading of the pixel signals obtained from $W_{6,1}$ and $W_{8,1}$, and performs adding and reading of the pixel signals obtained from $W_{6,3}$ and $W_{8,3}$ (S701). Then, the pixel signal reading unit 30 performs adding and reading of the pixel signals obtained from $G_{6,2}$ and $G_{8,2}$, and performs adding and reading of the pixel signals obtained from $G_{6,4}$ and $G_{8,4}$ (S702). Then, the pixel signal reading unit 30 performs adding and reading of the pixel signals obtained from $B_{3,1}$ and $B_{5,3}$, and performs adding and reading of the pixel signals obtained from $B_{7,1}$ and $B_{9,3}$ (S703). Then, the pixel signal reading unit 30 performs adding and reading of the pixel signals obtained from $W_{5,2}$ and $W_{7,2}$, and performs adding and reading of the pixel signals obtained from $W_{5,4}$ and $W_{7,4}$ (S704). Then, the pixel signal reading unit 30 performs adding and reading of the pixel signals obtained from $W_{2,1}$ and $W_{4,1}$, and performs adding and reading of the pixel signals obtained from $W_{2,3}$ and $W_{4,3}$ (S705). Then, the pixel signal reading unit 30 performs adding and reading of the pixel signals obtained from $G_{2,2}$ and $G_{4,2}$, and performs adding and reading of the pixel signals obtained from $G_{2,4}$ and $G_{4,4}$ (S706). Then, the pixel signal reading unit 30 performs adding and reading of the pixel signals obtained from $R_{1,1}$ and $R_{3,3}$, and performs adding and reading of the pixel signals obtained from $R_{5,1}$ and $R_{7,3}$ (S707). Then, the pixel signal reading unit 30 performs adding and reading of the pixel signals obtained from $W_{1,2}$ and $W_{3,2}$ and performs adding and reading of the pixel signals obtained from $W_{1,4}$ and $W_{3,4}$ (S708).

FIG. 39 is an explanatory diagram illustrating a specific example of an array of pixel signals read in the seventh process performed by the signal processing device 100 according to the embodiment of the present disclosure. As illustrated in FIGS. 29 and 39, the array of pixel signals read in the fifth process performed by the signal processing device 100 according to the embodiment of the present disclosure is the same as the array of pixel signals read in the seventh process performed by the signal processing device 100 according to the embodiment of the present disclosure. However, as illustrated in FIGS. 29 and 39, the pixel signals read in the seventh process performed by the signal processing device 100 according to the embodiment of the present disclosure and the pixel signals read in the fifth process performed by the signal processing device 100 according to the embodiment of the present disclosure are different in the pixel signals obtained from the R pixels and the pixel signals obtained from the B pixels.

More specifically, in the fifth process performed by the signal processing device 100 according to the embodiment of the present disclosure, the center-of-gravity position of the pixel signal obtained from the R pixels overlaps the center-of-gravity position of the pixel signal obtained from the B pixels. More specifically, in the fifth process performed by the signal processing device 100 according to the embodiment of the present disclosure, the center-of-gravity position of the pixel signal obtained by adding the pixel signals obtained from $R_{1,1}$ and $R_{3,3}$ overlaps the center-of-gravity position of the pixel signal obtained by adding the pixel signals obtained from $B_{1,3}$ and $B_{3,1}$. Similarly, in the fifth process performed by the signal processing device 100 according to the embodiment of the present disclosure, the center-of-gravity position of the pixel signal obtained by adding the pixel signals obtained from $R_{5,1}$ and $R_{7,3}$ overlaps the center-of-gravity position of the pixel signal obtained by adding the pixel signals obtained from $B_{5,3}$ and $B_{7,1}$. On the other hand, in the seventh process performed by the signal processing device 100 according to the embodiment of the present disclosure, the center-of-gravity position of the pixel signal obtained from the R pixels does not overlap the center-of-gravity position of the pixel signal obtained from the B pixels.

Unlike the reading process in the fifth process performed by the signal processing device 100 according to the embodiment of the present disclosure, in the reading process in the seventh process performed by the signal processing device 100 according to the embodiment of the present disclosure described above, the pixel signal reading unit 30 adds and reads the pixel signals obtained from the B pixels in the (4n+1)-th column (n is an integer) and the B pixels in the (4n+3)-th column (n is an integer), and adds and reads the pixel signals obtained from the R pixels in the (4n+1)-th column (n is an integer) and the R pixels in the (4n+3)-th column (n is an integer) which are arranged in parallel to the direction in which the B pixels in the (4n+1)-th column (n is an integer) and the B pixels in the (4n+3)-th column (n is an integer) are arranged. Therefore, in the reading process in the seventh process performed by the signal processing device 100 according to the embodiment of the present disclosure, unlike the reading process in the fifth process performed by the signal processing device 100 according to the embodiment of the present disclosure, the center-of-gravity position of the pixel signal obtained from the R pixels does not overlap the center-of-gravity position of the pixel signal obtained from the B pixels. Therefore, in the reading process in the seventh process performed by the signal processing device 100 according to the embodiment of the present disclosure, it is possible to simplify signal processing for the read pixel signals and improve the image quality, compared with the reading process in the fifth process performed by the signal processing device 100 according to the embodiment of the present disclosure.

9. Hardware Configuration

The embodiment of the present disclosure has been described. The process of the signal processing device 100 described above is implemented by collaboration of software and hardware of the signal processing device 100 to be described below.

Figure 40:
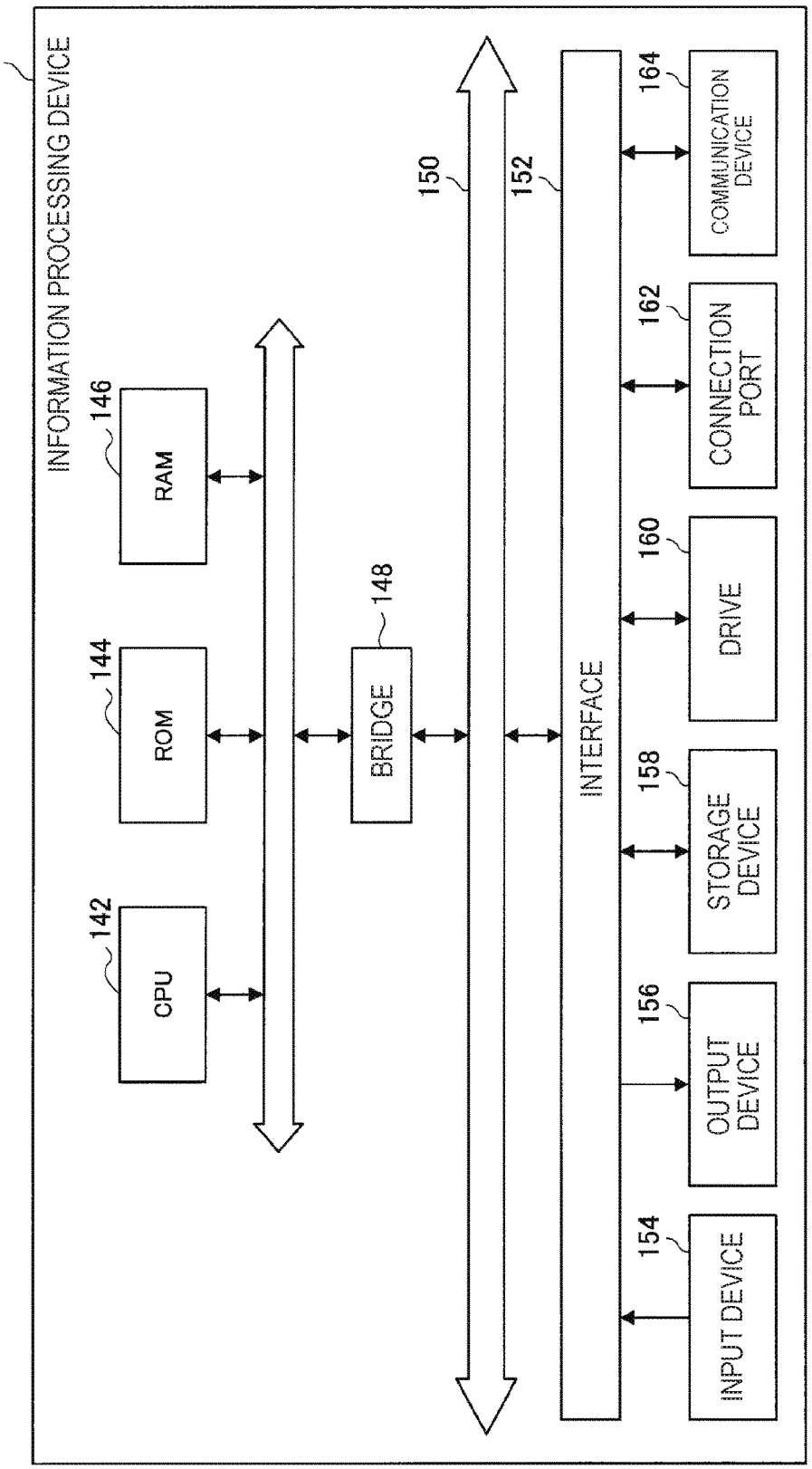
FIG. 40 is an explanatory diagram illustrating a specific example of a hardware configuration of a signal processing device according to the present disclosure.

FIG. 40 is an explanatory diagram illustrating a hardware configuration of the signal processing device 100 according to the present disclosure. As illustrated in FIG. 40, the signal processing device 100 includes a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an operation processing unit and a control unit and collaborates with various kinds of programs to implement the operations of the pixel signal reading unit 30, the AD converting unit 50, the correcting unit 70, and the signal processing unit 90 in the signal processing device 100. The CPU 142 may be a microprocessor. The ROM 144 stores programs, operation parameters, and the like used by the CPU 142. The RAM 146 temporarily stores programs to be used for execution of the CPU 142 or parameters which appropriately change at the time of execution, and the like. The CPU 142, the ROM 144, and the RAM 146 are connected to one another via an internal bus including a CPU bus or the like.

As an example of the pixel array unit 10 of the signal processing device 100, the input device 154 includes an input unit that allows a user to input information such as a mouse, a keyboard, a touch panel, a button, a microphone, a switch, or a lever, an input control circuit that generates an input signal on the basis of reception of incident light by the pixels of the pixel array unit 10 or an input by the user and outputs the input signal to the CPU 142, and the like. By operating the input device 154, the user of the signal processing device 100 can input various kinds of data or give an instruction to perform a processing operation to the signal processing device 100.

The output device 156 performs an output to a device such as a liquid crystal display (LCD) device, an organic light emitting diode (OLED) device, a lamp, or the like. Further, the output device 156 may output sounds like speakers and headphones.

The storage device 158 is a device that stores data. The storage device 158 may include a storage medium, a recording device that records data in a storage medium, a reading device that reads data from a storage medium, a deletion device that deletes data recorded in a storage medium, or the like. The storage device 158 stores programs executed by the CPU 142 and various kinds of data.

The drive 160 is a reader/writer for a storage medium and is mounted inside or outside the signal processing device 100. The drive 160 reads information recorded in a removable storage medium such as a mounted magnetic disk, an optical disc, a magneto-optical disc, or a semiconductor memory and outputs the information to the RAM 144. The drive 160 can also write information in a removable storage medium.

The connection port 162 is, for example, a bus for a connection with an information processing device or a peripheral device outside the signal processing device 100. Further, the connection port 162 may be a Universal Serial Bus (USB).

The communication device 164 is, for example, a communication interface constituted by a communication device for a connection with a network. Further, the communication device 164 may be an infrared communication supporting device, a wireless local area network (LAN) supporting communication device, a Long Term Evolution (LTE) supporting communication device, or a wired communication device that performs wired communication.

10. Conclusion

In the reading processes performed by the signal processing device 100 according to the embodiment of the present disclosure described above, it is possible to reduce the number of readings by adding and reading the pixel signals obtained from a plurality of W pixels. Therefore, according to the reading processes performed by the signal processing device 100 according to the embodiment of the present disclosure, in the signal processing device 100 in which rows of pixels having different pixel arrays are arranged at intervals of one line, it is possible to improve the reading efficiency of the pixel signals.

Further, in the reading processes performed by the signal processing device 100 according to the embodiment of the present disclosure, since the pixel signal obtained from the W pixels having a larger sensitivity region than the R element, the G element, and the B element in the visible light region is read, it is possible to improve the S/N ratio.

Further, in the correction processes performed by the signal processing device 100 according to the embodiment of the present disclosure, since an array of pixel signals read by the pixel signal reading unit 30 is the same as the pixel array in the pixel array unit 10, it is possible to simplify a signal processing circuit at a subsequent stage.

Further, in the correction processes in the second, fourth, and sixth processes performed by the signal processing device 100 according to the embodiment of the present disclosure, the correcting unit 70 performs the weighted-averaging so that the center-of-gravity positions of the pixel signals read by the pixel signal reading unit 30 are arranged at equal intervals in the straight line form in each of the row direction and the column direction. Therefore, in the correction processes in the second, fourth, and sixth processes performed by the signal processing device 100 according to the embodiment of the present disclosure, since the center-of-gravity positions of the pixel signals read by the pixel signal reading unit 30 are arranged at equal intervals in the straight line form in the row direction and the column direction, it is possible to prevent the occurrence of image distortion, false color, and jaggies due to deviation of the center of gravity. Therefore, in the correction processes in the second, fourth and sixth processes performed by the signal processing device 100 according to the embodiment of the present disclosure, it is possible to improve the image quality.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the correction processes in the second, fourth, and sixth processes performed by the signal processing device 100 according to the embodiment of the present disclosure, the weighted-averaging ratio of the pixel signals read by the pixel signal reading unit 30 is not limited to the ratios in the examples described above with reference to the drawings and may be any other ratio in which the center-of-gravity positions of the pixel signals are arranged at equal intervals in the straight line form in each of the row direction and the column direction.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A signal processing device, including:

a pixel array unit configured to include first pixels, second pixels, third pixels, and fourth pixels which have different spectral sensitivity characteristics and are arranged in a matrix form; and a pixel signal reading unit configured to read pixel signals obtained from the plurality of pixels arranged in the pixel array unit, wherein the first pixels are adjacent to the second pixels in a row direction and a column direction, the second pixels are arranged at a two-pixel pitch in the row direction and the column direction, the third pixels are adjacent to the second pixels in one diagonal direction, the fourth pixels are adjacent to the second pixels in the other diagonal direction, and the pixel signal reading unit adds and reads the pixel signals obtained from the plurality of first pixels.

(2)

The signal processing device according to (1), wherein the pixel signal reading unit adds and reads the pixel signals obtained from the plurality of first pixels arranged in the same column, and adds and reads the pixel signals obtained from the plurality of second pixels arranged in the same column.

(3)

The signal processing device according to (1) or (2), wherein the pixel signal reading unit thins out and reads the third pixels and the fourth pixels in the column direction.

(4)

The signal processing device according to any one of (1) to (3), wherein the pixel signal reading unit adds and reads the pixel signals obtained from the plurality of third pixels arranged in different columns, and adds and reads the pixel signals obtained from the plurality of fourth pixels arranged in different columns.

(5)

The signal processing device according to (4), wherein a direction in which the plurality of third pixels are arranged is parallel to a direction in which the plurality of fourth pixels are arranged.

(6)

The signal processing device according to any one of (1) to (5), further including a correcting unit configured to correct the pixel signals so that an array of pixel signals read by the pixel signal reading unit becomes the same as a pixel array in the pixel array unit.

(7)

The signal processing device according to (6), wherein the correcting unit performs the correcting by integrating pixel signals obtained from a plurality of pixels having the same spectral sensitivity characteristic.

(8)

The signal processing device according to (7), wherein the correcting unit performs the integrating by weighted-averaging the pixel signals obtained from the plurality of pixels having the same spectral sensitivity characteristic.

(9)

The signal processing device according to (8), wherein the correcting unit performs the weighted-averaging so that center-of-gravity positions of the pixel signals read by the pixel signal reading unit are arranged at equal intervals in a straight line form in each of the row direction and the column direction.

(10)

The signal processing device according to (9), wherein the correcting unit performs the weighted-averaging after interpolating the pixel signals in accordance with the pixel signals read by the pixel signal reading unit.

(11)

The signal processing device according to any one of (3) to (5), further including a correcting unit configured to correct the pixel signals so that an array of pixel signals read by the pixel signal reading unit becomes the same as a pixel array in the pixel array unit by replacing pixel signals obtained from a plurality of pixels having different spectral sensitivity characteristics.

(12)

The signal processing device according to any one of (1) to (11), wherein the first pixels have a sensitivity region in a wavelength region including a green region, a red region, and a blue region, the second pixels have a sensitivity region in the green region, the third pixels have a sensitivity region in the red region, and the fourth pixels have a sensitivity region in the blue region.

(13)

The signal processing device according to any one of (1) to (11), wherein the first pixels have a sensitivity region in an infrared region.

(14)

A signal processing method, including:

reading, by a signal processing device, pixel signals obtained from first pixels, second pixels, third pixels, and fourth pixels which have different spectral sensitivity characteristics and are arranged in a matrix form; and adding and reading, by the signal processing device, the pixel signals obtained from the plurality of first pixels, wherein the first pixels are adjacent to the second pixels in a row direction and a column direction, the second pixels are arranged at a two-pixel pitch in the row direction and the column direction, the third pixels are adjacent to the second pixels in one diagonal direction, and the fourth pixels are adjacent to the second pixels in the other diagonal direction.

REFERENCE SIGNS LIST 10 pixel array unit
30 pixel signal reading unit
50 converting unit
70 correcting unit
90 signal processing unit
100 signal processing device
142 (central processing unit)
144 (read only memory)
146 (random access memory)
148 bridge
150 bus
152 interface
154 input device
156 output device
158 storage device
160 drive
162 connection port
164 communication device

The invention claimed is:

1. A signal processing device, comprising:
a pixel array unit comprising a plurality of pixels,
wherein the plurality of pixels, in a matrix arrangement, includes a plurality of first pixels, a plurality of second pixels, a plurality of third pixels, and a plurality of fourth pixels,
wherein the plurality of pixels have different spectral sensitivity characteristics; and
circuitry configured to:
obtain a plurality of pixel signals from the plurality of pixels,
wherein a plurality of first pixel signals of the plurality of pixel signals are obtained from the plurality of first pixels;
read the obtained plurality of pixel signals,
wherein:
the plurality of first pixels are adjacent to the plurality of second pixels in a row direction of the matrix arrangement and a column direction of the matrix arrangement,
the plurality of second pixels are at a two-pixel pitch in the row direction of the matrix arrangement and the column direction of the matrix arrangement,
the plurality of third pixels are adjacent to the plurality of second pixels in a first diagonal direction of the matrix arrangement, and
the plurality of fourth pixels are adjacent to the plurality of second pixels in a second diagonal direction of the matrix arrangement;

add, the plurality of first pixel signals obtained from the plurality of first pixels, to determine a first addition result corresponding to the plurality of first pixel signals;

read the first addition result corresponding to the plurality of first pixel signals; and correct the plurality of pixel signals such that a first signal array corresponding to the corrected plurality of pixel signals is equal to a second signal array corresponding to the pixel array unit.

2. The signal processing device according to claim 1, wherein the circuitry is further configured to:

add, the plurality of first pixel signals obtained from the plurality of first pixels that are in a first column of the matrix arrangement, to determine the first addition result;

read the first addition result corresponding to the plurality of first pixel signals;

obtain a plurality of second pixel signals from the plurality of second pixels that are in a second column of the matrix arrangement;

add, the plurality of second pixel signals obtained from the plurality of second pixels that are in the second column of the matrix arrangement, to determine a second addition result corresponding to the plurality of second pixel signals; and read the second addition result corresponding to the plurality of second pixel signals.

3. The signal processing device according to claim 1, wherein the circuitry is further configured to:

thin out the plurality of third pixels and the plurality of fourth pixels, and read, the plurality of third pixels and the plurality of fourth pixels, in the column direction of the matrix arrangement.

4. The signal processing device according to claim 1, wherein the circuitry is further configured to:

obtain a plurality of third pixel signals from the plurality of third pixels that are in a plurality of third columns of the matrix arrangement, add the plurality of third pixel signals obtained from the plurality of third pixels that are in a plurality of third columns of the matrix arrangement, to determine a third addition result, read the third addition result corresponding to the plurality of third pixel signals, obtain a plurality of fourth pixel signals from the plurality of fourth pixels that are in a plurality of fourth columns of the matrix arrangement, add the plurality of fourth pixel signals obtained from the plurality of fourth pixels that are in a plurality of fourth columns of the matrix arrangement, to determine a fourth addition result corresponding to the plurality of fourth pixel signals, and read the fourth addition result corresponding to the plurality of fourth pixel signals.

5. The signal processing device according to claim 4, wherein a first direction of arrangement of the plurality of third pixels in the matrix arrangement is parallel to a second direction of arrangement of the plurality of fourth pixels in the matrix arrangement.

6. The signal processing device according to claim 1, wherein the circuitry is further configured to:

obtain a plurality of fifth pixel signals from a plurality of fifth pixels having a same spectral sensitivity characteristic, and correct the plurality of pixel signals based on an integration operation associated with the obtained plurality of fifth pixel signals.

7. The signal processing device according to claim 6, wherein the circuitry is further configured to correct the plurality of pixel signals based on the integration operation on an output of a weighted-averaging operation on the obtained plurality of fifth pixel signals.

8. The signal processing device according to claim 7, wherein the circuitry is further configured to execute the weighted-averaging operation such that center-of-gravity positions of the plurality of fifth pixel signals is at equal intervals in a straight line form in each of the row direction and the column direction.

9. The signal processing device according to claim 8, wherein the circuitry is further configured to:

interpolate the obtained plurality of fifth pixel signals based on the obtained plurality of pixel signals, and execute the weighted-averaging operation after interpolation of the obtained plurality of fifth pixel signals.

10. The signal processing device according to claim 3, wherein the circuitry is further configured to correct the plurality of pixel signals such that a third signal array corresponding to the corrected plurality of pixel signals is equal to a fourth signal array corresponding to the pixel array unit, based on replacement of the obtained plurality of pixel signals.

11. The signal processing device according to claim 1, wherein:

the plurality of first pixels have a sensitivity region in a wavelength region including a green region, a red region, and a blue region, the plurality of second pixels have a sensitivity region in the green region, the plurality of third pixels have a sensitivity region in the red region, and the plurality of fourth pixels have a sensitivity region in the blue region.

12. The signal processing device according to claim 1, wherein the plurality of first pixels have a sensitivity region in an infrared region.

13. A signal processing method, comprising:

in a signal processing device:

obtaining a plurality of pixel signals from a plurality of pixels, wherein;

the plurality of pixels, in a matrix arrangement, includes a plurality of first pixels, a plurality of second pixels, a plurality of third pixels, and a plurality of fourth pixels, the plurality of pixels have different spectral sensitivity characteristics, and a plurality of first pixel signals are obtained from the plurality of first pixels, the plurality of first pixels are adjacent to the plurality of second pixels in each of a row direction of the matrix arrangement and a column direction of the matrix arrangement, the plurality of second pixels are at a two-pixel pitch in the row direction of the matrix arrangement and the column direction of the matrix arrangement, the plurality of third pixels are adjacent to the plurality of second pixels in a first diagonal direction of the matrix arrangement, and the plurality of fourth pixels are adjacent to the plurality of second pixels in a second diagonal direction of the matrix arrangement;

adding, the plurality of first pixel signals obtained from the plurality of first pixels, to determine an addition result corresponding to the plurality of first pixel signals;

reading the addition result corresponding to the plurality of first pixel signals; and correcting the plurality of pixel signals such that a first signal array corresponding to the corrected plurality of pixel signals is equal to a second signal array corresponding to the pixel array unit.

* * * * *